(12) United States Patent
Hirata

(10) Patent No.: US 12,433,623 B2
(45) Date of Patent: Oct. 7, 2025

(54) TREATMENT INSTRUMENT AND ENDOSCOPE APPARATUS

(71) Applicant: Evident Corporation, Nagano (JP)

(72) Inventor: Yasuo Hirata, Hachioji (JP)

(73) Assignee: Evident Corporation, Nagano (JP)

( * ) Notice: Subject to any disclaimer, the term of this patent is extended or adjusted under 35 U.S.C. 154(b) by 423 days.

(21) Appl. No.: 17/682,272

(22) Filed: Feb. 28, 2022

(65) Prior Publication Data

US 2022/0296263 A1  Sep. 22, 2022

(30) Foreign Application Priority Data

Mar. 22, 2021 (JP) ................................. 2021-047612
Oct. 18, 2021 (JP) ................................. 2021-170411

(51) Int. Cl.
*A61B 17/29* (2006.01)

(52) U.S. Cl.
CPC ...... *A61B 17/29* (2013.01); *A61B 2017/2903* (2013.01); *A61B 2017/2911* (2013.01); *A61B 2017/2913* (2013.01); *A61B 2017/2926* (2013.01); *A61B 2017/2946* (2013.01)

(58) Field of Classification Search
CPC ............ A61B 17/29; A61B 2017/2903; A61B 2017/2911; A61B 2017/2913; A61B 2017/2926; A61B 2017/2946
See application file for complete search history.

(56) References Cited

U.S. PATENT DOCUMENTS

| 4,840,176 A | 6/1989 | Ohno |
| 5,383,886 A * | 1/1995 | Kensey ................ A61B 17/282 606/205 |
| 2008/0269774 A1* | 10/2008 | Garcia ................ A61B 17/221 606/127 |
| 2013/0325049 A1 | 12/2013 | Jang et al. |

FOREIGN PATENT DOCUMENTS

| JP | S63117742 A | 5/1988 |
| JP | H0588095 A | 4/1993 |
| JP | H05208014 A | 8/1993 |
| JP | H08117241 A | 5/1996 |
| JP | H08-308848 A | 11/1996 |
| JP | H1147079 A | 2/1999 |

(Continued)

OTHER PUBLICATIONS

Japanese Office Action dated Apr. 22, 2025 received in 2021-170411.

*Primary Examiner* — Shaun L David
*Assistant Examiner* — Rachael L Geiger
(74) *Attorney, Agent, or Firm* — Scully, Scott, Murphy &n Presser, P.C.

(57) ABSTRACT

A treatment instrument used together with an endoscope includes a distal end grasping portion. The distal end grasping portion includes a distal end movable member capable of moving forward and backward along a longitudinal axis of the distal end grasping portion, and a distal end fixation member including a bending portion provided on a distal end side along the longitudinal axis with respect to a tilt portion of the distal end movable member. The bending portion of the distal end fixation member and the tilt portion of the distal end movable member constitute a grasping portion.

12 Claims, 73 Drawing Sheets

(56) References Cited

FOREIGN PATENT DOCUMENTS

| | | | |
|---|---|---|---|
| JP | 2004-261372 | A | 9/2004 |
| JP | 2004-337422 | A | 12/2004 |
| JP | 2008040018 | A | 2/2008 |
| JP | 2015-049440 | A | 3/2015 |
| WO | 2014050784 | A1 | 4/2014 |
| WO | 2016190190 | A1 | 12/2016 |

* cited by examiner

TREATMENT INSTRUMENT AND ENDOSCOPE APPARATUS

CROSS REFERENCE TO RELATED APPLICATION

This application claims benefit of Japanese Applications No. 202147612 filed in Japan on Mar. 22, 2021, and No. 2021-170411 filed in Japan on Oct. 18, 2021, the entire contents of each of which are incorporated by their reference.

BACKGROUND OF THE INVENTION

1. Field of the Invention

The present invention relates to a treatment instrument and an endoscope apparatus.

2. Description of Related Art

Examples of treatment instruments for collecting an object in an examination target include a grasping forceps, a snare, a grasper, and a hook. Examples of treatment instruments for endoscope are disclosed in Japanese Patent Application Laid-Open Publication No. 2004-261372, Japanese Patent Application Laid-Open Publication No. 2004-337422, and Japanese Patent Application Laid-Open Publication No. 2015-49440.

In many cases of treatment instruments, the position of a distal end of a grasping portion that grasps an object to be grasped changes between an open state in which no object is grasped and a grasping state in which an object is grasped. For example, the grasping portion is open when pulled and closed to grasp an object, and thus the position of the distal end of the grasping portion changes between the open state in which no object is grasped and the grasping state. Thus, it is not easy to position the grasping portion relative to an object.

In a medical field, for example, a stomach wall in a subject is soft, and thus with a treatment instrument including such a grasping portion, the grasping portion can be positioned relative to an object to be collected, such as a lesion portion, by pushing a distal end portion of the treatment instrument against the stomach wall or the like.

SUMMARY OF THE INVENTION

A treatment instrument according to an aspect of the present invention is a treatment instrument used together with an endoscope and includes a distal end grasping portion, the distal end grasping portion includes a movable member including a first distal end portion and capable of moving forward and backward along a longitudinal axis of the distal end grasping portion, and a fixation member including a second distal end portion provided on a distal end side along the longitudinal axis with respect to the first distal end portion of the movable member, and the second distal end portion of the fixation member and the first distal end portion of the movable member constitute a grasping portion.

An endoscope according to an aspect of the present invention includes a treatment instrument according to an aspect of the present invention, and an endoscope.

DETAILED DESCRIPTION OF PREFERRED EMBODIMENTS

For example, a floor surface in a subject is often hard in an industrial field. Thus, in a case in which an object to be collected is hard, a foreign object such as a screw or a metal piece is, for example, flicked when hit by a grasping portion of a treatment instrument being pushed against a floor surface or the like, and thus it is not easy to collect the foreign object.

Embodiments described below can provide a treatment instrument and an endoscope apparatus with which it is easy to position a grasping portion with respect to an object and collect the object.

The embodiments of the present invention will be described below with reference to the accompanying drawings.

First Embodiment

Figure 1:
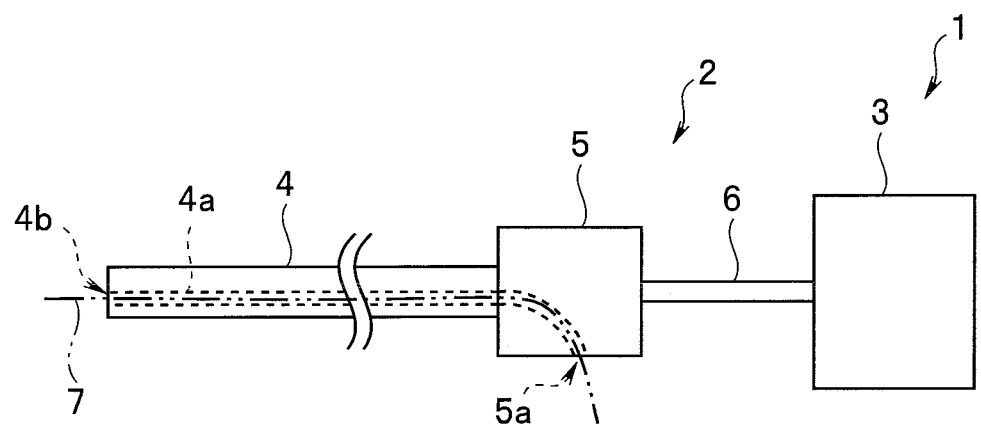
FIG. 1 is a configuration diagram of an endoscope system of a first embodiment.

FIG. 1 is a configuration diagram of an endoscope system according to a first embodiment. This endoscope system 1 includes an endoscope 2 and a main device 3. The endoscope 2 includes an elongated insertion portion 4, an operation portion 5, and a connection cable 6. The connection cable 6 electrically connects the endoscope 2 to the main device 3.

The insertion portion 4 includes, sequentially from a distal end side, a distal end rigid portion, a bending portion, and a flexible tube portion. The insertion portion 4 is insertable into an examination target such as a pipe or an engine.

The insertion portion 4 includes an observation window and an illumination window at the distal end rigid portion. Illumination light is emitted from the illumination window. The observation window receives reflected light from an object illuminated with the illumination light. The reflected light is incident on an objective optical system in a distal end portion and forms an object image on an image pickup surface of an image pickup device (not illustrated). The image pickup device is driven by a drive signal from the main device 3 and outputs an image pickup signal to the main device 3.

Although not illustrated, the operation portion 5 is provided with, for example, a bending operation member for an operation of bending the bending portion of the insertion portion 4, and a release button through which an image pickup timing is instructed.

The main device 3 includes a monitor (not illustrated) and displays an endoscope image obtained through image pickup by the image pickup device. An examiner can examine inside of an examination target by observing the endoscope image.

In an endoscope examination, the examiner can grasp and collect a foreign object or the like in an examination target by using a treatment instrument while observing the endoscope image.

Note that a treatment instrument may be inserted and used in a channel provided to the endoscope. In FIG. 1, for example, the endoscope 2 includes a channel 4a into which an elongated treatment instrument can be inserted. A treatment instrument 7 can be inserted through an opening 5a provided at part of the operation portion 5 and can protrude and retract through an opening 4b provided at a distal end surface of the insertion portion 4. In an endoscope examination using the endoscope 2, the examiner can use the treatment instrument 7 by inserting the treatment instrument 7 (illustrated with a dashed and double-dotted line) into the channel 4a. Thus, an endoscope apparatus is constituted by the endoscope 2 and the treatment instrument 7.

Subsequently, a configuration of the treatment instrument will be described below. Note that each member described below is made of metal such as stainless steel or resin unless otherwise stated.

Figure 2:
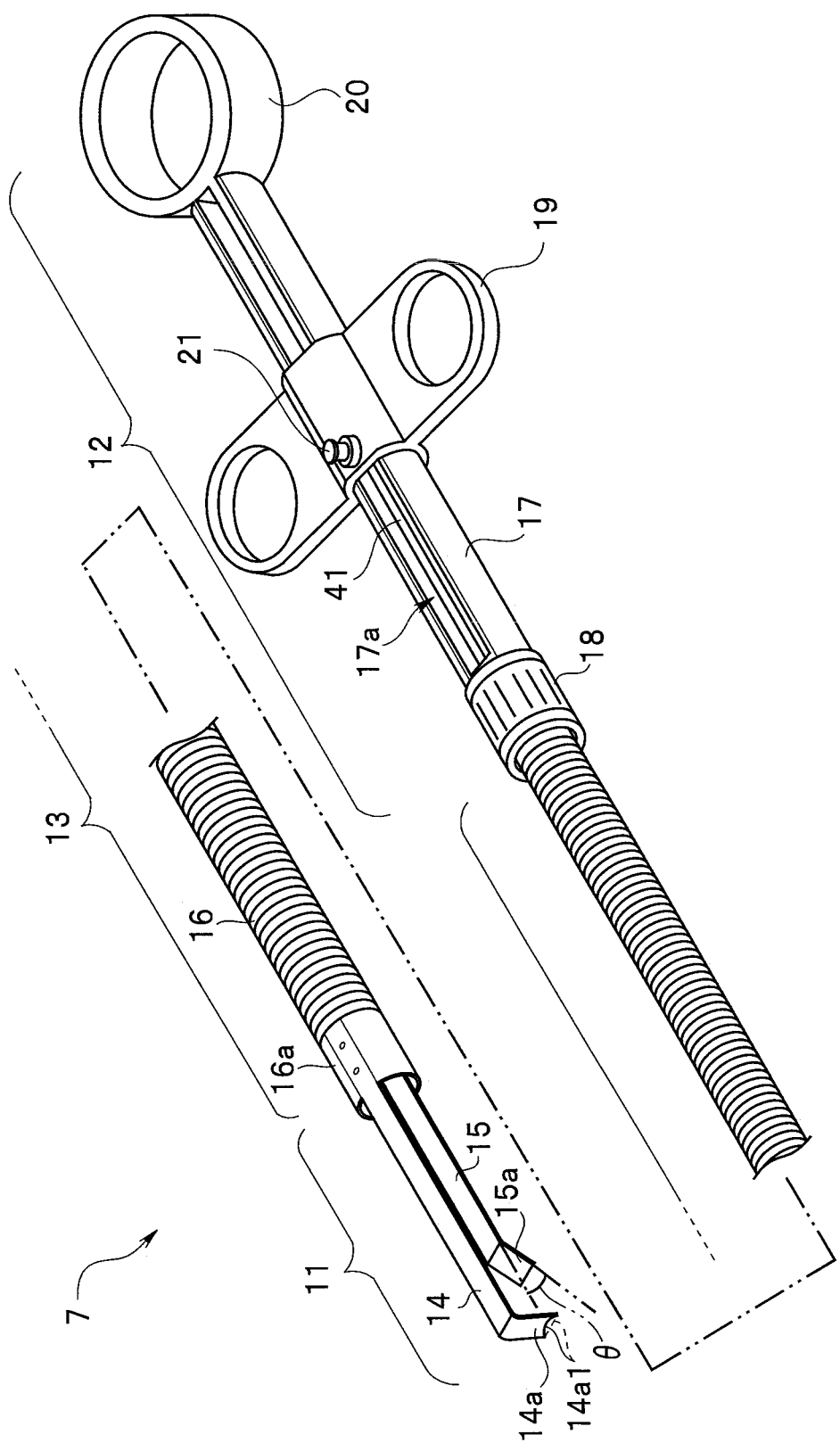
FIG. 2 is a perspective view of a treatment instrument of the first embodiment.

FIG. 2 is a perspective view of the treatment instrument 7. The treatment instrument 7 is used together with the endoscope 2. The treatment instrument 7 includes a distal end grasping portion 11 for grasping a foreign object, an operation portion 12 for operating the grasping portion, and an insertion portion 13 through which the distal end grasping portion 11 and the operation portion 12 are coupled.

The distal end grasping portion 11 is constituted by a distal end fixation member 14 and a distal end movable member 15. The distal end fixation member 14 is a plate member and includes a bending portion 14a at a distal end part. The bending portion 14a is a part positioned on the distal end side of the distal end fixation member 14 and bent by 90° or more relative to a longitudinal axis of the distal end fixation member 14. In FIG. 2, the bending portion 14a is bent by 90° relative to the longitudinal axis of the distal end fixation member 14. A distal end part 14a1 of the bending portion 14a has a shape along a cutout in a circular arc shape, but may have a straight shape parallel to a direction orthogonal to the longitudinal axis of the distal end fixation member 14 as illustrated with a dotted line in the drawing.

The distal end movable member 15 is a plate member and includes a tilt portion 15a obliquely tilted on the distal end side. The tilt portion 15a is provided on the distal end side of the distal end movable member 15 and tilted at an angle θ smaller than 90° relative to a longitudinal axis of the distal end movable member 15. The distal end movable member 15 is disposed relative to the distal end fixation member 14 so that a distal end part of the tilt portion 15a contacts or is positioned close to the distal end part 14a1 of the bending portion 14a when the distal end movable member 15 moves in the distal end direction. In other words, the distal end fixation member 14 serves as a fixation member including a distal end portion (the bending portion 14a) provided on the distal end side along the longitudinal axis with respect to a distal end portion (tilt portion 15a) of the distal end movable member 15. The distal end portion (bending portion 14a) of the distal end fixation member 14 and the distal end portion (tilt portion 15a) of the distal end movable member 15 serve as a grasping portion that grasps a foreign object. The grasping portion is a grasping mechanism that sandwiches and grasps a foreign object between the bending portion 14a and the tilt portion 15a as the tilt portion 15a moves in the distal end direction.

The thicknesses and the widths of sections of the distal end fixation member 14 and the distal end movable member 15 along a plane orthogonal to the longitudinal axes of the distal end fixation member 14 and the distal end movable member 15 are substantially identical to each other. However, the distal end fixation member 14 and the distal end movable member 15 may be detachable so that at least one of the thickness and the width of each of plate materials of the distal end fixation member 14 and the distal end movable member 15 can be changed as necessary when a foreign object is to be collected. For example, a foreign object to be grasped can be relatively accurately positioned relative to the distal end movable member 15 by increasing the width of the distal end fixation member 14. Moreover, for example, when a foreign object is to be grasped, the foreign object can be firmly fixed by increasing the plate thickness of the distal end fixation member 14 to reduce deformation due to pushing force of the distal end movable member 15. With slight deformation (forming a bending shape) of the distal end movable member 15, it is possible to reduce a gap between the distal end fixation member 14 and the distal end movable member 15 so that a foreign object can be firmly fixed. In the bow deformation, part of the distal end movable member 15 in the longitudinal direction, which is parallel to part of the distal end fixation member 14 in the longitudinal direction bends in a circular arc shape and approaches the distal end fixation member 14, and accordingly, the two parallel members extending in the longitudinal directions approach each other. A foreign object can be sandwiched in the gap.

The insertion portion 13 includes a flexible coil sheath 16. The coil sheath 16 is a close-contact coil in this example. A tubular distal end pipe sleeve 16a is provided at a distal end of the coil sheath 16. The distal end pipe sleeve 16a is connected to the distal end of the coil sheath 16 and fixed to the coil sheath 16 by a bonding agent or the like. A proximal end pipe sleeve 16b (FIG. 4) is fixed to a proximal end portion of the coil sheath 16 by a bonding agent.

Figure 3:
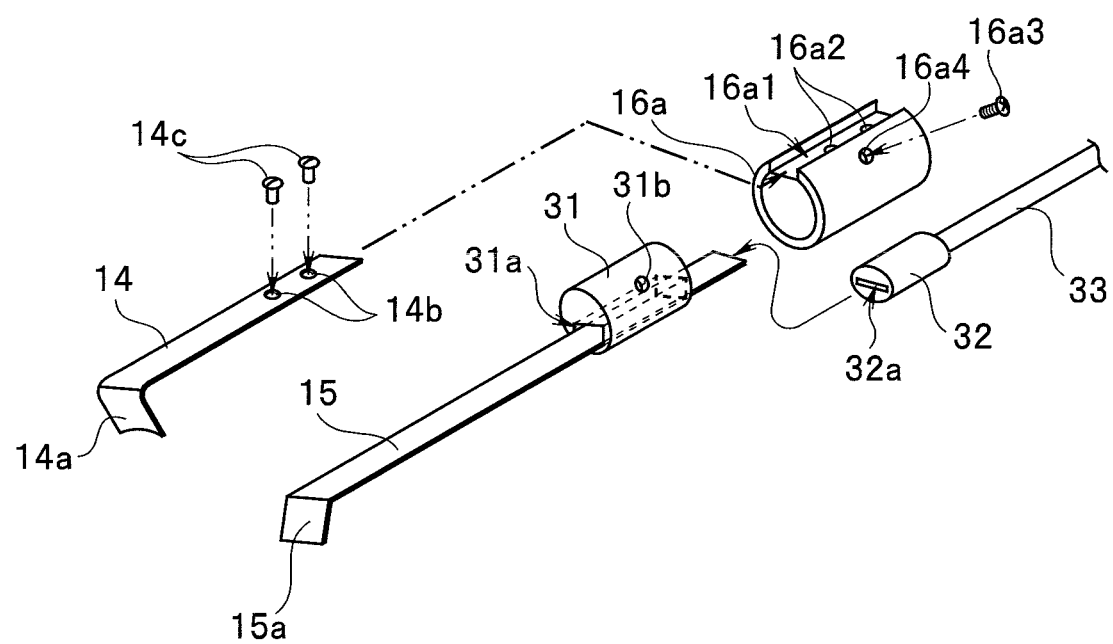
FIG. 3 is an exploded view of a distal end grasping portion of the first embodiment.

FIG. 3 is an exploded view of the distal end grasping portion 11. An outer peripheral groove 16a1 is formed at an outer peripheral portion of the distal end pipe sleeve 16a along the longitudinal axis. The outer peripheral groove 16a1 has a width corresponding to a width of a proximal end part of the distal end fixation member 14 and has a shape into which the distal end fixation member 14 is fitted. The distal end fixation member 14 has two screw holes 14b at a proximal end side part. The distal end fixation member 14 is fixed to the distal end pipe sleeve 16a when two screws 14c are screwed through the two screw holes 14b into two holes 16a2 formed at the outer peripheral groove 16a1. The distal end pipe sleeve 16a has a screw hole 16a4 into which a screw 16a3 is screwed.

Note that the distal end fixation member 14 may be fixed to the distal end pipe sleeve 16a by welding or a bonding agent.

A distal end inner pipe sleeve 31 is disposed inside the distal end pipe sleeve 16a. The distal end inner pipe sleeve 31 has a cylindrical shape and has a hole 31a formed along a longitudinal axis of the distal end inner pipe sleeve 31. The hole 31a has such a size that the distal end movable member 15 can be inserted into the hole 31a. In addition, the hole 31a has such a shape that the distal end movable member 15 can slide, in other words, is movable forward and backward along the longitudinal axis of the distal end movable member 15.

The distal end inner pipe sleeve 31 has a screw hole 31b at a side surface. The distal end inner pipe sleeve 31 is fixed to the distal end pipe sleeve 16a inside the distal end pipe sleeve 16a when the screw 16a3 is screwed into the screw hole 31b through the screw hole 16a4.

A proximal end part of the distal end movable member 15 extends from the hole 31a toward a proximal end side. The proximal end part of the distal end movable member 15 is fitted to a distal end side groove 32a of a coupling member 32 and fixed to the coupling member 32 by a bonding agent or the like. A distal end part of a wire 33 is fixed to a proximal end portion of the coupling member 32 by a bonding agent or the like. Accordingly, the distal end movable member 15 serves as a movable member capable of moving forward and backward along a longitudinal axis of the distal end grasping portion 11.

As illustrated in FIG. 2, a pipe member 41 is externally fitted to a vicinity part of a proximal end part of the wire 33. The pipe member 41 is fixed when a proximal end pipe 42 (FIG. 4) internally fitted to the proximal end portion of the coil sheath 16 is externally fitted to a proximal end of the wire 33.

Figure 4:
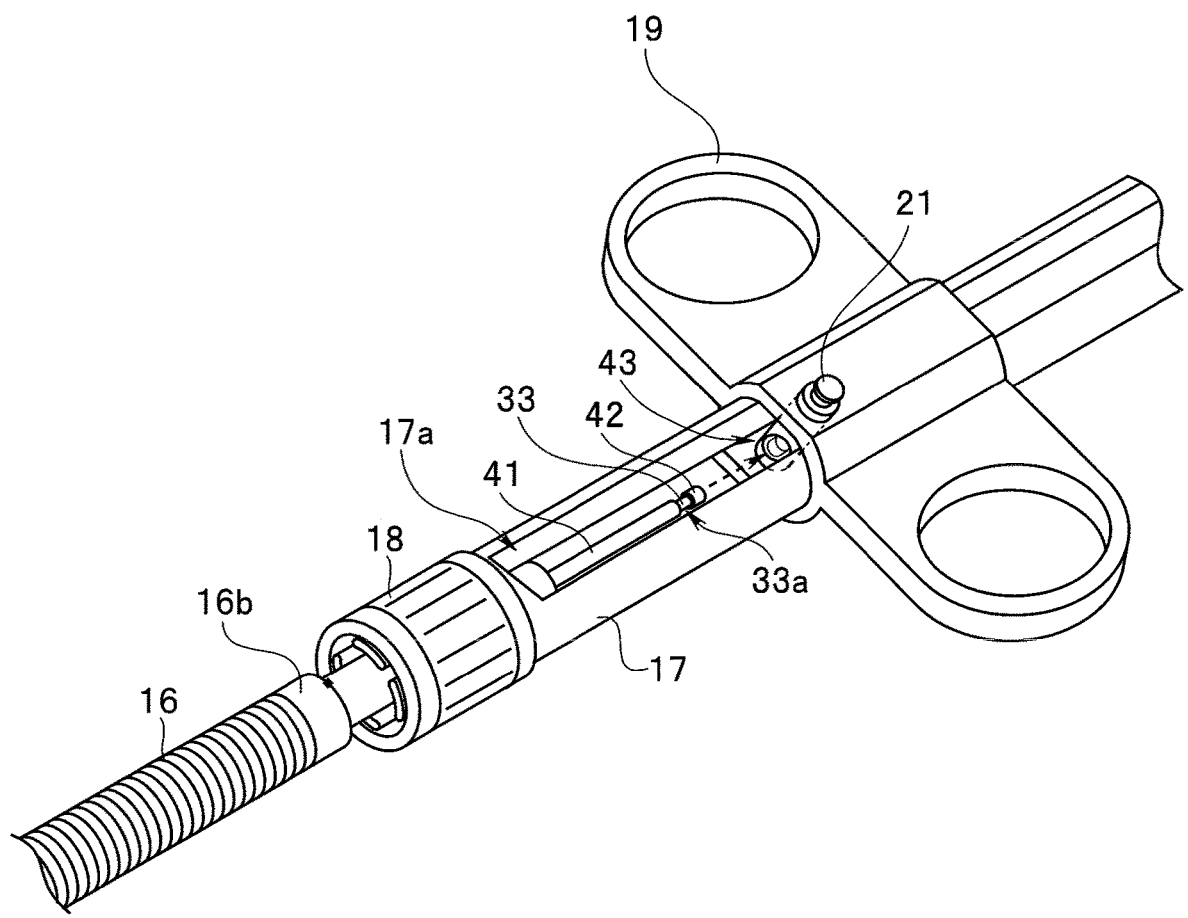
FIG. 4 is a perspective view of an operation portion of the first embodiment.

FIG. 4 is a perspective view of the operation portion 12. The operation portion 12 includes an operation main body member 17, a knob member 18, and a handle 19. The handle 19 has two holes as finger rings. A ring shape portion 20 (FIG. 2) is provided at a proximal end portion of the operation main body member 17. The operation main body member 17 has a guiding groove 17a as a tubular member formed along a longitudinal axis of the operation main body member 17. The knob member 18 is provided at a distal end of the operation main body member 17. The handle 19 is movable forward and backward in an axial direction of the operation main body member 17. The handle 19 is provided with a button 21 for wire fixation.

As described above, the proximal end pipe 42 fixed to the proximal end of the wire 33 can be coupled with a lock portion 43 provided to the handle 19 of the operation portion 12. The lock portion 43 is provided to the handle 19 so that the lock portion 43 is positioned in the guiding groove 17a.

Figure 10:
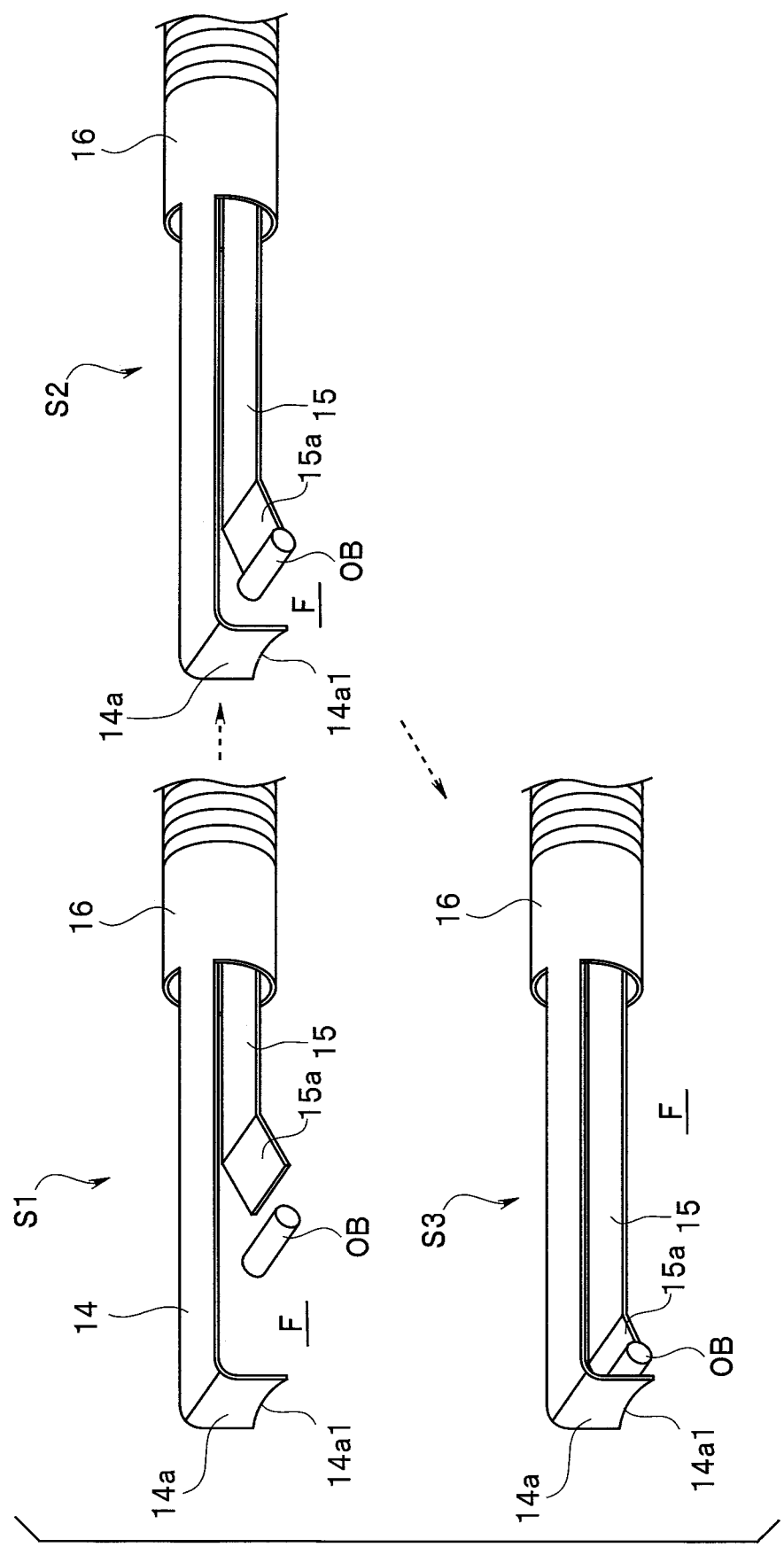
FIG. 10 is a diagram illustrating movement when a foreign object is grasped by a distal end fixation member and a distal end movable member related to the first embodiment.

Note that, although the distal end fixation member 14 is a member separated from the distal end pipe sleeve 16a and fixed to the distal end pipe sleeve 16a by the screws 14c in FIGS. 2 and 3, the distal end fixation member 14 and the distal end pipe sleeve 16a may be formed as one member as illustrated in FIG. 10 to be described later.

Figure 5:
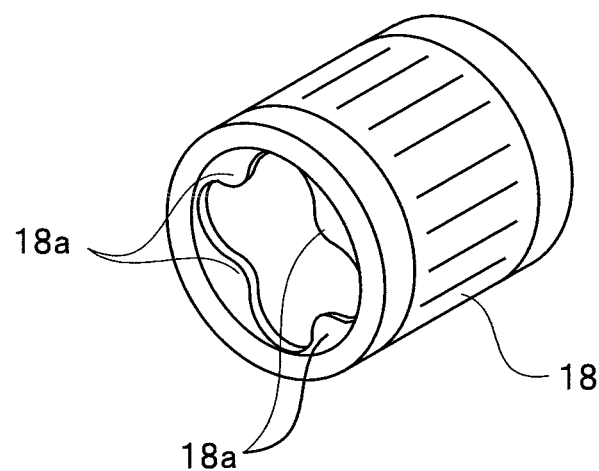
FIG. 5 is a perspective view of a knob member of the first embodiment.
Figure 6:
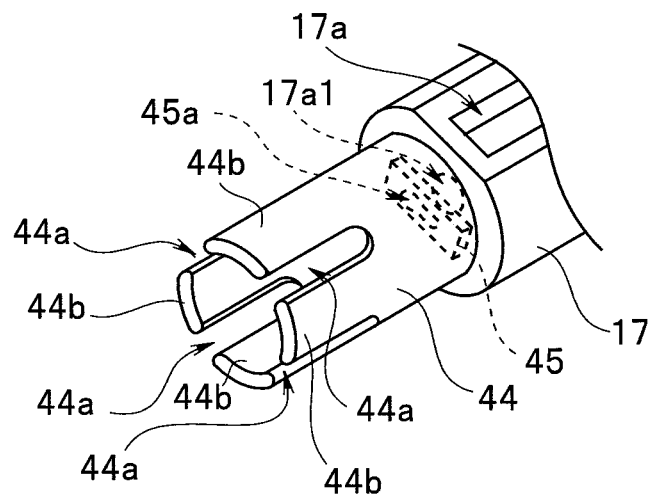
FIG. 6 is a perspective view of a distal end part of an operation main body member of the first embodiment.
Figure 7:
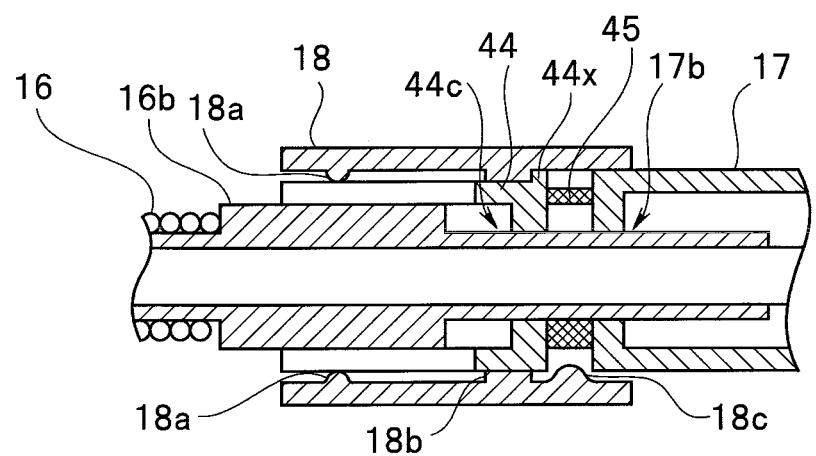
FIG. 7 is a cross-sectional view of a distal end part of the operation portion of the first embodiment.

FIG. 5 is a perspective view of the knob member 18. FIG. 6 is a perspective view of a distal end part of the operation main body member 17. FIG. 7 is a cross-sectional view of a distal end part of the operation portion 12.

The knob member 18 is a tubular member. A plurality of convex portions 18a protruding in an inward radial direction are provided on an inner peripheral surface of the knob member 18 on the distal end side. An inward flange 18b is formed inside the knob member 18. In addition, a plurality of convex portions 18c protruding in the inward radial direction are provided on the inner peripheral surface of the knob member 18 on the proximal end side.

A chuck member 44 is internally fitted from the proximal end side of the knob member 18 and disposed inside the knob member 18. A partially outward flange portion 44x is formed at part of a proximal end portion of the chuck member 44. The partially outward flange portion 44x contacts the inward flange 18b inside the knob member 18.

The operation main body member 17 is internally fitted from the proximal end side of the knob member 18. A transverse plate member 45 is disposed between a distal end surface of the operation main body member 17 internally fitted and a proximal end surface of the chuck member 44.

The transverse plate member 45 has a plate shape and has a long hole 45a formed at its central part. The long hole 45a is partially narrowed. A proximal end part of the proximal end pipe sleeve 16b is inserted into a hole 44c on the proximal end side of the chuck member 44, the long hole 45a, and a hole 17a1 on the distal end side of the operation main body member 17.

The chuck member 44 has, on the distal end side, four slots 44a formed at equal intervals in a circumferential direction. The chuck member 44 includes four extension portions 44b extending in the distal end direction in the axial direction. The four slots 44a are formed by the four extension portions 44b.

When each convex portion 18a is positioned between two extension portions 44b while the chuck member 44 is internally fitted to the knob member 18, the chuck member 44 does not press an outer peripheral portion of the proximal end pipe sleeve 16b fixed to the proximal end portion of the coil sheath 16.

When the knob member 18 is axially rotated so that each convex portion 18a presses an outer peripheral portion of the chuck member 44 in the inward radial direction while the chuck member 44 is internally fitted to the knob member 18, the four extension portions 44b function as a chuck and the chuck member 44 presses the outer peripheral portion of the proximal end pipe sleeve 16b. As a result, the proximal end pipe sleeve 16b is clamped by the knob member 18 and the coil sheath 16 is fixed to the operation main body member 17.

The wire 33 is inserted into the long hole 45a of the transverse plate member 45. As the knob member 18 is rotated, the transverse plate member 45 is pushed by the convex portions 18c and slides in a direction orthogonal to the longitudinal axis in the operation main body member 17. The proximal end part of the proximal end pipe sleeve 16b moves from a region in which an inner diameter of the long hole 45a is large to a region in which the inner diameter is small, and is firmly fixed by the long hole 45a.

Figure 8:
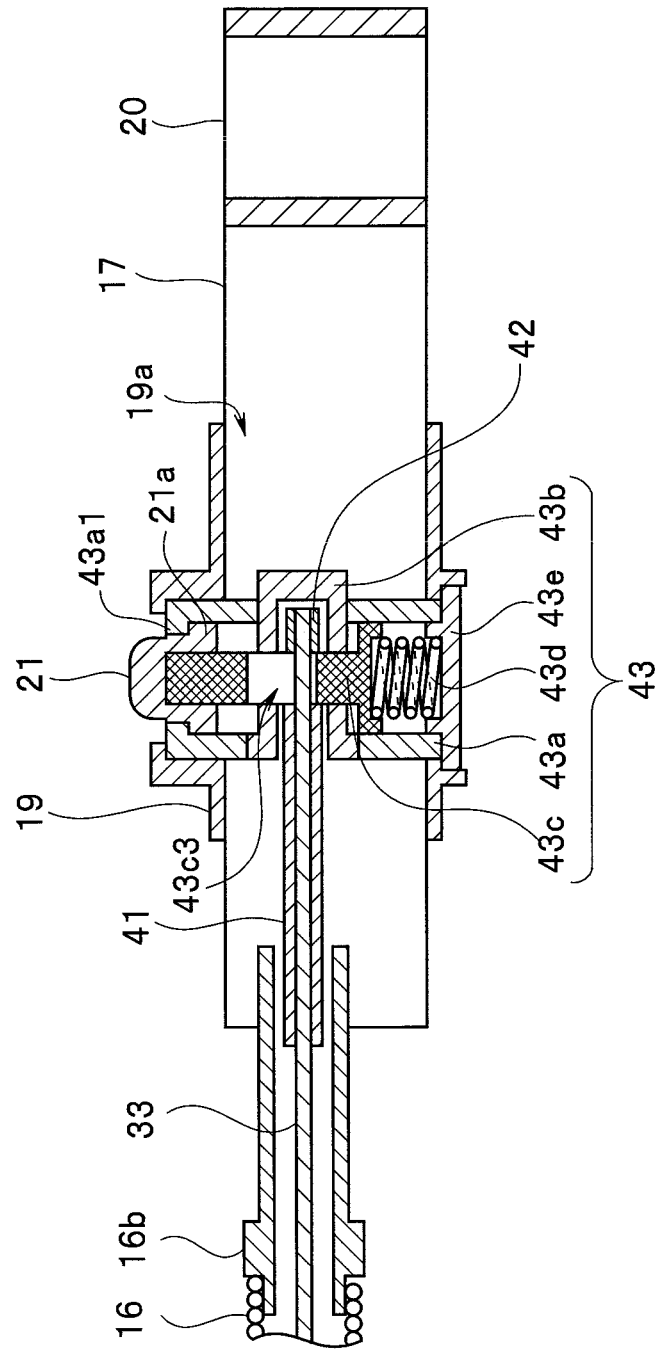
FIG. 8 is a cross-sectional view of the operation portion near a handle of the first embodiment.

FIG. 8 is a cross-sectional view of the operation portion 12 in the vicinity of the handle 19.

As illustrated in FIG. 8, the handle 19 has an insertion hole 19a into which the operation main body member 17 is inserted. The operation main body member 17 is movable forward and backward along the insertion hole 19a in the axial direction of the operation main body member 17.

The lock portion 43 is provided at a central part of the handle 19. The lock portion 43 includes an outer pipe 43a fixed to the handle 19 by a bonding agent or the like. A longitudinal axis of the outer pipe 43a is orthogonal to the axial direction of the operation main body member 17. A transverse pipe 43b is fixed at a central part of the outer pipe 43a by a bonding agent or the like. A longitudinal axis of the transverse pipe 43b is parallel to the axial direction of the operation main body member 17. The transverse pipe 43b has a hole formed in a direction orthogonal to an axial direction of the transverse pipe 43b. A lock shaft member 43c is inserted into the hole in a state in which the lock shaft member 43c is movable in an axial direction of the lock shaft member 43c. As illustrated in FIG. 8, the lock shaft member 43c is supported in the transverse pipe 43b in a state in which the lock shaft member 43c is movable in a direction orthogonal to the axial direction of the operation main body member 17.

Figure 9:
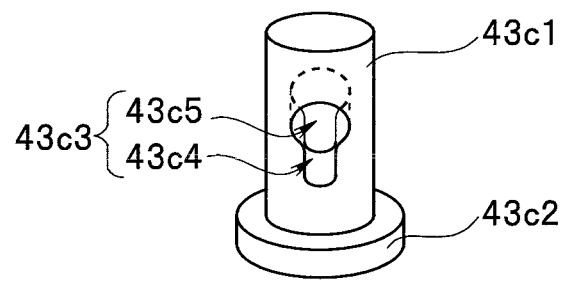
FIG. 9 is a perspective view of a lock shaft member of the first embodiment.

FIG. 9 is a perspective view of the lock shaft member 43c. The lock shaft member 43c includes a cylinder-shaped portion 43c1, and a stopper portion 43c2 formed at one end of the cylinder-shaped portion 43c1. The cylinder-shaped portion 43c1 has a hole 43c3 formed in a direction orthogonal to the axial direction of the lock shaft member 43c. The hole 43c3 includes a first hole part 43c4 having a small width, and a second hole part 43c5 having a large width.

A spring 43d is disposed in the outer pipe 43a so that the spring 43d pushes the stopper portion 43c2 in an inward radial direction of the operation main body member 17. A lid member 43e is fixed to one end of the outer pipe 43a by a bonding agent or the like to hold the spring 43d being compressed in the outer pipe 43a.

The other end of the outer pipe 43a is fixed to the button 21 for wire fixation. Specifically, as illustrated in FIG. 8, the button 21 includes an outward flange 21a at a lower part. The outward flange 21a is locked by an inward flange 43a1 formed at the other end of the outer pipe 43a. A distal end of the cylinder-shaped portion 43c1 of the lock shaft member 43c is fitted into a hole formed at the lower part of the button 21.

As the button 21 is pressed in the inward radial direction of the operation main body member 17, the lock shaft member 43c slides inside the hole of the transverse pipe 43b while compressing the spring 43d. In a state in which the button 21 is pressed and the spring 43d is compressed, the second hole part 43c5 of the lock shaft member 43c is positioned inside the transverse pipe 43b.

When the pressing on the button 21 in the inward radial direction is canceled, the lock shaft member 43c presses the button 21 in an outward radial direction of the operation main body member 17 while sliding inside the hole of the transverse pipe 43b by force of the spring 43d. When the button 21 is no longer pressed, the first hole part 43c4 of the lock shaft member 43c is positioned inside the transverse pipe 43b.

A distal end part of the pipe member 41 externally fitted to the proximal end part of the wire 33 is fixed to a proximal end portion of the proximal end pipe sleeve 16b by a bonding agent or the like. The wire 33 is disposed to be movable forward and backward in the pipe member 41.

The proximal end pipe 42 fixed to the proximal end of the wire 33 has such an outer diameter size that the proximal end pipe 42 can pass through the second hole part 43c5 of the lock shaft member 43c. However, the proximal end pipe 42 has such an outer diameter size that the proximal end pipe 42 cannot pass through the first hole part 43c4 of the lock shaft member 43c. A groove portion 33a at which the wire 33 is exposed is formed between the proximal end pipe 42 and the pipe member 41.

Accordingly, the proximal end pipe 42 of the proximal end of the wire 33 can be inserted into the second hole part 43c5 when the second hole part 43c5 is positioned inside the transverse pipe 43b while the button 21 is pressed and the spring 43d is compressed.

As illustrated in FIG. 8, the first hole part 43c4 of the lock shaft member 43c is positioned inside the transverse pipe 43b when pressing on the button 21 is canceled while the proximal end pipe 42 is inserted into the second hole part 43c5 and positioned deep inside the transverse pipe 43b. In this state, the proximal end pipe 42 is held by the lock portion 43. In this case, the groove portion 33a is positioned at the first hole part 43c4.

The wire 33 moves forward and backward in the insertion portion 13 as the handle 19 is moved forward and backward along the longitudinal axis of the operation main body member 17 while the proximal end pipe 42 is held by the lock portion 43. As a result, the distal end movable member 15 moves forward and backward along the longitudinal axis of the distal end grasping portion 11, as well.

Note that the shapes of the distal end fixation member 14 of the distal end grasping portion 11 and the distal end movable member 15 are the shapes of plate materials in the above description, but not limited to this configuration. For example, the distal end fixation member 14 and the distal end movable member 15 may be wire rods having circular sections. In addition, the distal end movable member 15 may be integrated with the wire 33 on the proximal end side, and a rotation preventing structure that allows forward and backward movement in the longitudinal direction but prevents rotation about the axis of the wire 33 may be provided halfway through. The rotation preventing structure has a shape in which, for example, a flat portion is provided at part of the wire or a metal component (of, for example, a rectangular parallelepiped shape) including a flat portion is fixed, the structure being provided with, at the distal end pipe sleeve, a groove (hole) in accordance with a sectional shape of the flat portion at part of the wire or a sectional shape of the metal component including a flat portion, thereby only allowing movement in the longitudinal direction but preventing rotation.

(Operation)

FIG. 10 is a diagram illustrating movement when a foreign object OB is grasped between the distal end fixation member 14 and the distal end movable member 15.

In an endoscope examination, when having found the foreign object OB, the examiner collects the foreign object OB by using the treatment instrument 7. The examiner fixes a proximal end portion of the wire 33 to the handle 19. As described above, the examiner fixes the proximal end portion of the wire 33 to the handle 19 by holding the proximal end pipe 42 at the lock portion 43.

Then, the examiner moves the distal end fixation member 14 of the treatment instrument 7 closer to the foreign object OB while observing an endoscope image. In FIG. 10, S1 illustrates a state in which the foreign object OB on a floor surface F is positioned on the proximal end side of the bending portion 14a and on the distal end side of the tilt portion 15a. In this case, while pulling the distal end movable member 15 of the distal end grasping portion 11 toward a hand side, the examiner moves the treatment instrument 7 so that the foreign object OB is positioned between the bending portion 14a of the distal end fixation member 14 and the tilt portion 15a of the distal end movable member 15.

In the state of S1, the examiner pushes the handle 19 in the distal end direction. The tilt portion 15a moves the foreign object OB toward the bending portion 14a on the distal end side while scooping the foreign object OB (S2).

The proximal end part of the distal end movable member 15 is connected to the distal end part of the wire 33 through the coupling member 32, and the proximal end part of the wire 33 is coupled at the lock portion 43 provided at the handle 19. Thus, when the handle 19 moves in the distal end direction, the tilt portion 15a can then make the foreign object OB contact with the bending portion 14a while moving the foreign object OB on the floor surface F.

When the examiner further pushes the handle 19 in the distal end direction, the foreign object OB is sandwiched between the bending portion 14a and the tilt portion 15a, and accordingly, the handle 19 no longer moves in the distal end direction as illustrated in S3.

As a result, the foreign object OB is sandwiched and grasped between the bending portion 14a and the tilt portion 15a. Thereafter, the examiner pulls the treatment instrument 7 out of a subject, thereby collecting the foreign object OB from inside of the subject.

As described above, even when the foreign object OB is a small member or a thin member, the examiner can reliably grasp and collect the foreign object OB by scooping from below with the tilt portion 15a of the distal end movable member 15 like a shovel.

For example, in an industrial field, it is difficult to perform an operation of grasping a small foreign object such as a metal piece with a conventional treatment instrument, and after the grasping, the foreign object is more likely to fall. Furthermore, the foreign object OB jumps in an unexpected direction by force applied to the foreign object OB in the grasping operation in some cases.

However, with the treatment instrument 7 of the above-described embodiment, the examiner can easily position the distal end grasping portion 11 by positioning the bending portion 14a of the distal end fixation member 14 behind the foreign object OB and moving the distal end movable member 15 closer to the bending portion 14a from the proximal end side of the foreign object OB. It is desirable to, while performing observation through the endoscope, move the distal end grasping portion 11 closer to the foreign object OB and adjust the positions of the bending portion 14a of the distal end fixation member 14 and the foreign object OB to position the bending portion 14a behind the foreign object OB, thereby placing the foreign object OB at a position close to the bending portion 14a as much as possible. The foreign object OB is more easily grasped when movement of the foreign object OB is reduced as much as possible to reduce rollover of the foreign object OB before grasping.

Moreover, the foreign object OB such as a metal piece having a small flat shape on the floor surface F or the like is scooped and moved with the tilt portion 15a of the distal end movable member 15 and sandwiched between the bending portion 14a and the tilt portion 15a, and thus, with the grasping portion constituted by the bending portion 14a and the tilt portion 15a, it is possible to appropriately apply force to the foreign object OB, it is easy to grasp the foreign object OB, and it is unlikely to drop the foreign object OB.

As described above, according to the above-described embodiment, it is possible to provide a treatment instrument with which it is easy to position a grasping portion relative to an object and collect the object.

(Modification 1)

In the first embodiment, the distal end fixation member does not move forward and backward, but may move forward and backward.

Figure 11:
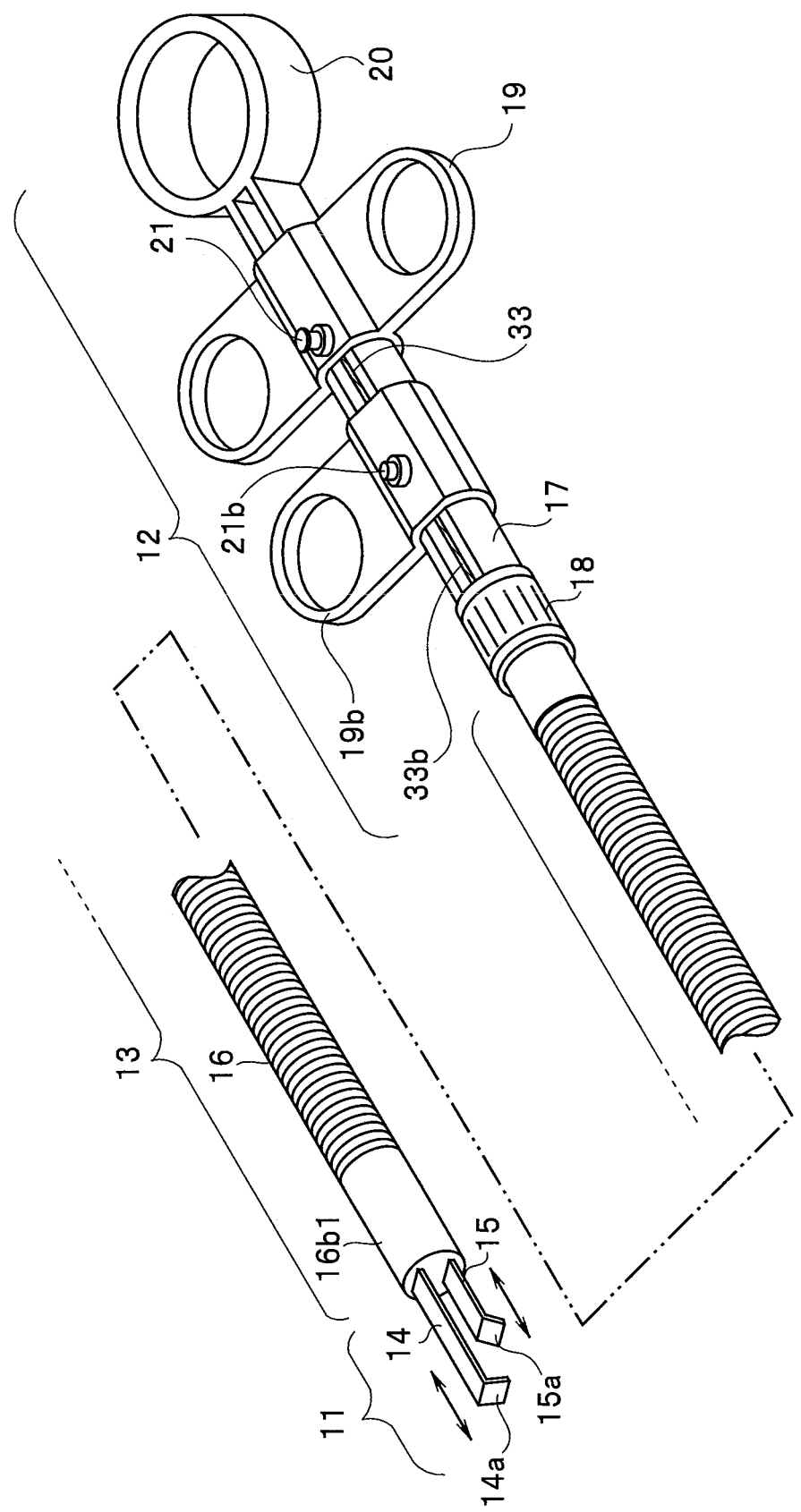
FIG. 11 is a perspective view of a treatment instrument according to Modification 1 of the first embodiment.

FIG. 11 is a perspective view of a treatment instrument according to Modification 1. The distal end fixation member 14 is movable forward and backward along the longitudinal axis of the distal end grasping portion 11.

The proximal end part of the distal end fixation member 14 is inserted into a hole formed at a pipe sleeve 16b1 and movable forward and backward. A second wire 33b is connected to the proximal end part of the distal end fixation member 14. The wire 33b is fixed to a second handle 19b provided to the operation portion 12 through the insertion portion 13 by a button 21b. The button 21b and a wire lock mechanism by the button 21b are the same as the button 21 and the wire lock mechanism described above. The handle 19b has a hole as a finger ring.

Figure 12:
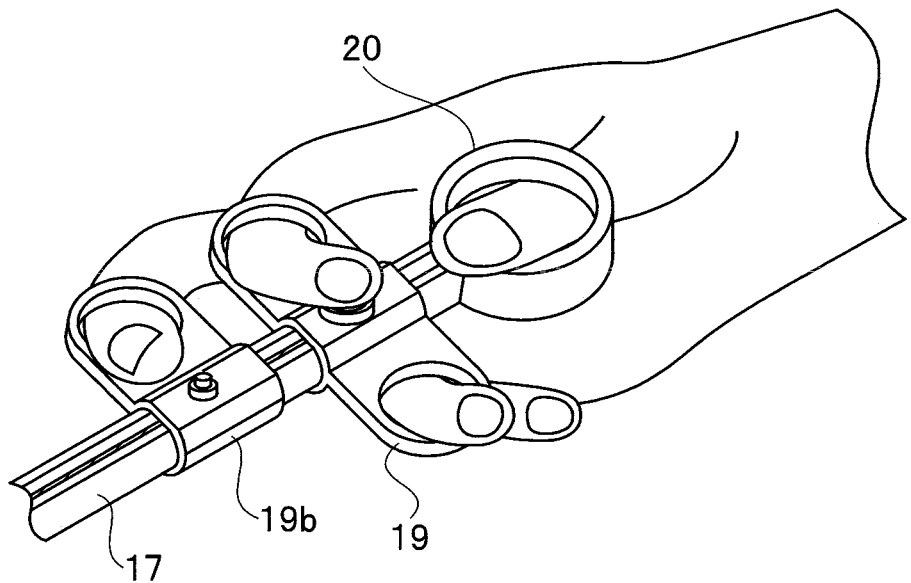
FIG. 12 is a diagram illustrating an exemplary way of holding an operation portion with fingers according to Modification 1 of the first embodiment.

FIG. 12 is a diagram illustrating an exemplary way of holding the operation portion 12 with fingers. The thumb of the right hand of the examiner is put into the ring shape portion 20. The index finger is put into one of two holes of the handle 19. The middle finger is put into the other of the two holes of the handle 19. The ring finger is put into the hole of the second handle 19b.

Accordingly, the examiner can individually move the distal end fixation member 14 and the distal end movable member 15 through a one-hand operation. The examiner can move the distal end fixation member 14 forward and backward in accordance with forward and backward movement of the handle 19b by moving the handle 19b forward and backward along a longitudinal axis of the operation portion 12.

(Modification 2)

In Modification 1, the distal end fixation member is moved forward and backward through forward and backward movement of the handle 19b, but may be moved forward and backward through rotation of a knob.

Figure 13:
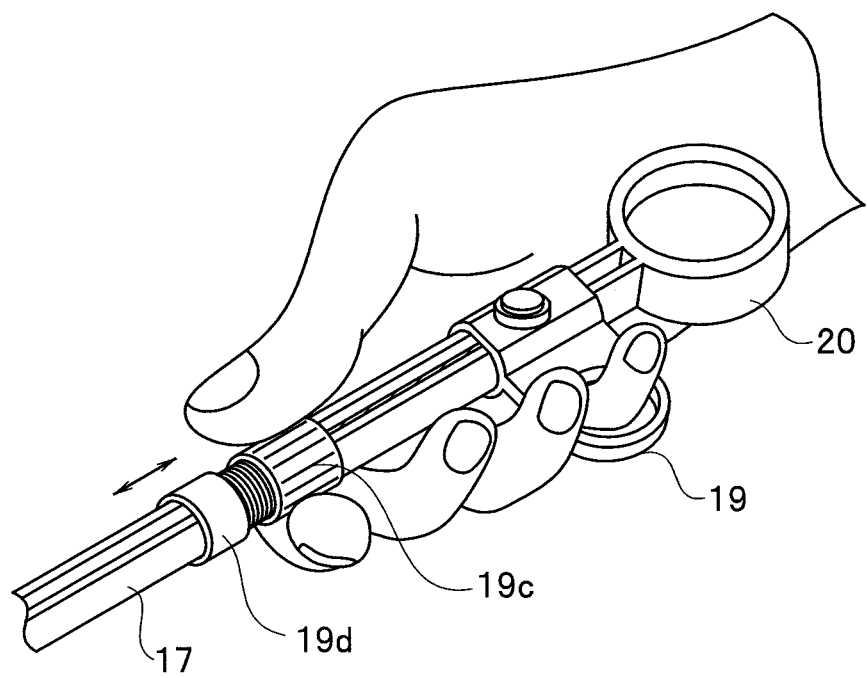
FIG. 13 is a perspective view of an operation portion of a treatment instrument according to Modification 2 of the first embodiment.

FIG. 13 is a perspective view of an operation portion of a treatment instrument according to Modification 2. The operation main body member 17 is provided with a rotatably attached knob 19c, and a distal end fixation member positioning knob 19d attached to the operation main body member 17 and movable forward and backward. The proximal end portion of the wire 33 is fixed to the distal end fixation member positioning knob 19d.

A male screw portion is provided on an outer peripheral surface of a proximal end part of the distal end fixation member positioning knob 19d and screwed with a female screw portion formed on an inner peripheral surface of the knob 19c.

The handle 19 is provided with one hole as a finger ring.

Thus, as illustrated in FIG. 13, when the examiner puts the little finger of the right hand on the hole of the handle 19 and rotates the knob 19c by using the thumb and the index finger, the wire 33 moves to the distal end side in accordance with the rotation, and accordingly, the distal end movable member 15 can be moved in the distal end direction.

(Modification 3)

In the embodiment, the distal end movable member 15 is pushed in the distal end direction as the wire 33 is pushed in the distal end direction, but the distal end movable member 15 may be pushed in the distal end direction as the wire 33 is pulled toward the proximal end side.

Figure 14:
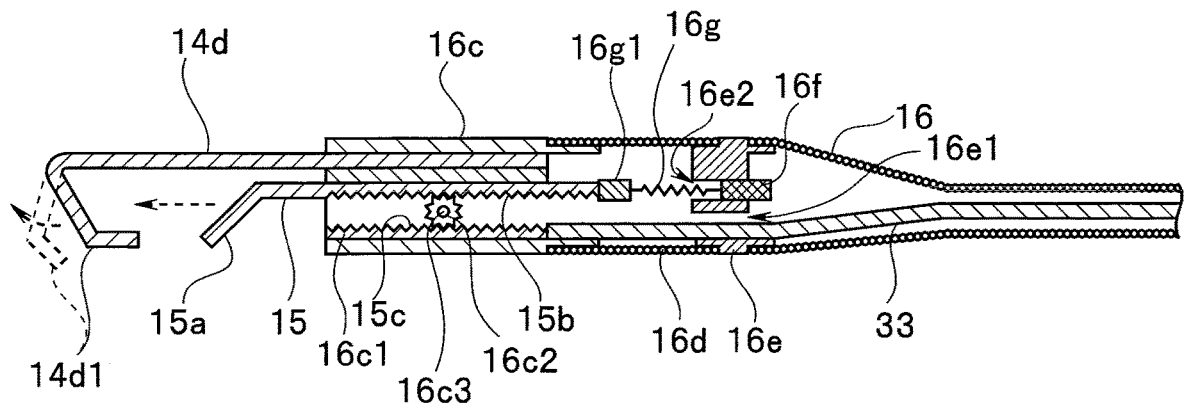
FIG. 14 is a cross-sectional view of a distal end grasping portion according to Modification 3 of the first embodiment along the longitudinal axis.
Figure 15:
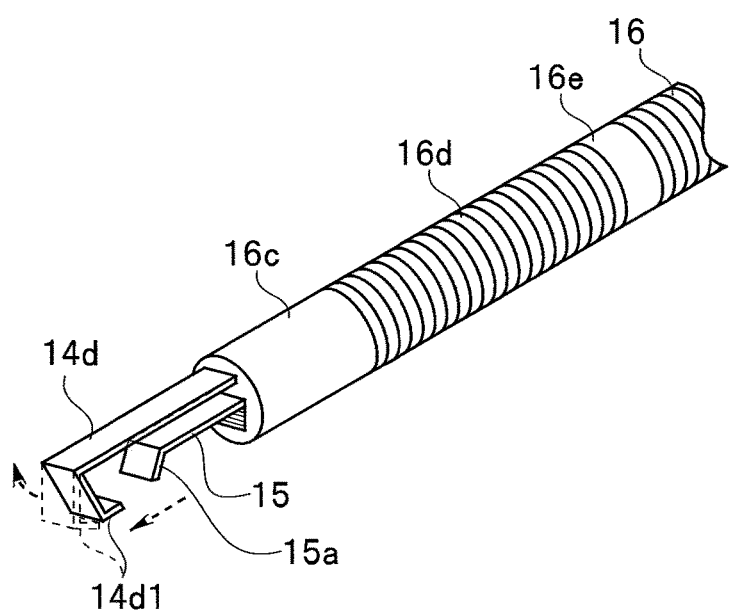
FIG. 15 is a perspective view of the distal end grasping portion according to Modification 3 of the first embodiment along the longitudinal axis.

FIG. 14 is a cross-sectional view of a distal end grasping portion according to Modification 3 along the longitudinal axis. FIG. 15 is a perspective view of the distal end grasping portion according to Modification 3 along the longitudinal axis. A proximal end portion of a distal end fixation member 14*d* is fixed inside a distal end pipe sleeve 16*c*.

The distal end movable member 15 having a plate shape is disposed inside the distal end pipe sleeve 16*c*. A rack gear 15*b* is formed on one surface of the distal end movable member 15 on the proximal end side.

A rack member 16*c*1 including a rack-side gear 15*c* is fixed inside the distal end pipe sleeve 16*c*. A circular gear 16*c*2 is disposed in the distal end pipe sleeve 16*c* so that the gear 16*c*2 can be rotated about a shaft 16*c*3 and is sandwiched between the two gears 15*b* and 15*c*.

A distal end part of a coil 16*d* is connected to a proximal end part of the distal end pipe sleeve 16*c*. The coil sheath 16 is connected to a proximal end part of the coil 16*d* through a coupling pipe sleeve 16*e*.

The coupling pipe sleeve 16*e* has a hole 16*e*1 through which the wire 33 is installed inside. The coupling pipe sleeve 16*e* further has a hole 16*e*2, and a spring fixation member 16*f* is fixed to the hole 16*e*2.

A proximal end portion of the distal end movable member 15 is connected to one end of a coil spring 16*g* through a spring coupling part 16*g*1. The other end of the coil spring 16*g* is fixed to the spring fixation member 16*f*.

Thus, when the wire 33 is pulled toward the proximal end side, the distal end movable member 15 is moved in the distal end direction by the circular gear 16*c*2 and the two gears 15*b* and 15*c*.

In FIGS. 14 and 15, a distal end portion 14*d*1 of the distal end fixation member 14*d* is bent at two stages. When the distal end movable member 15 moves in the distal end direction and sandwiches the foreign object OB, the distal end portion 14*d*1 is bent by stress as illustrated with a dotted line and can firmly grasp the foreign object OB.

(Modification 4)

With the distal end fixation member of the first embodiment, the foreign object OB is pressed against the bending portion 14*a* and grasped, a suction port may be provided to the bending portion 14*a* so that the foreign object OB is sucked through the suction port.

Figure 16:
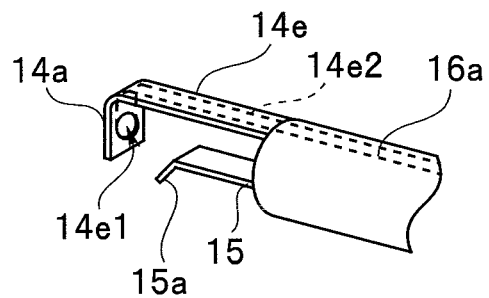
FIG. 16 is a perspective view of a distal end grasping portion according to Modification 4 of the first embodiment.

FIG. 16 is a perspective view of a distal end grasping portion according to Modification 4.

An opening portion 14*e*1 is formed inside the bending portion 14*a* of the distal end fixation member 14. The distal end fixation member 14 includes a pipe line 14*e*2 inside, and the pipe line 14*e*2 communicates with the opening portion 14*e*1. A proximal end portion of the pipe line 14*e*2 is connected to a non-illustrated suction pipe so that air can be sucked through the opening portion 14*e*1.

Accordingly, when the foreign object OB is pushed by the tilt portion 15*a* of the distal end movable member 15, the foreign object OB is sucked to the opening portion 14*e*1 of the bending portion 14*a* and thus likely to be reliably sandwiched.

Note that the distal end fixation member 14 may be able to move forward and backward along the longitudinal axis.

Figure 17:
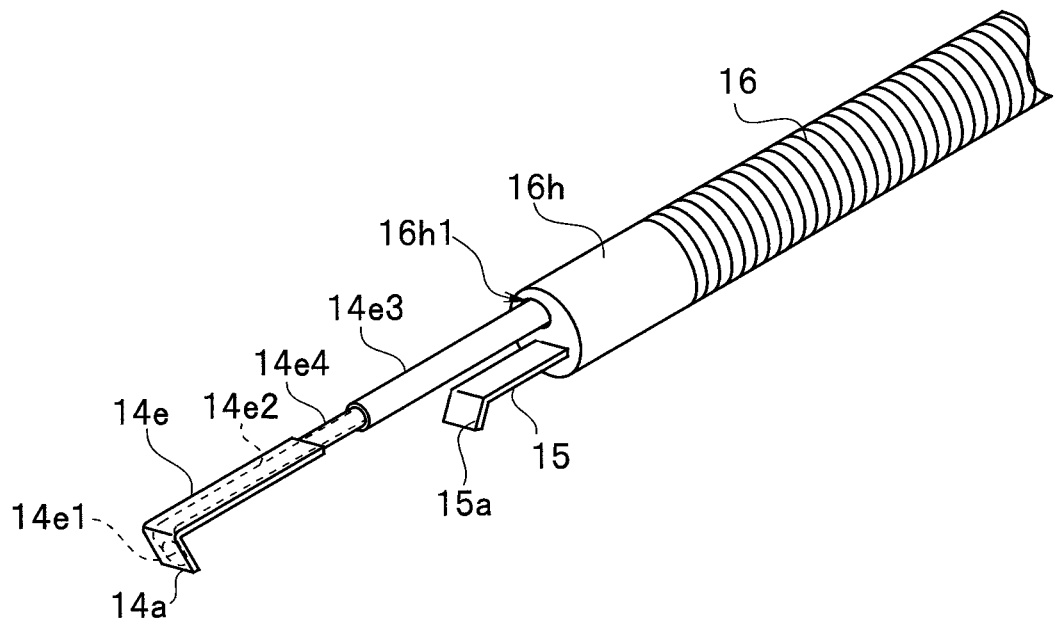
FIG. 17 is a perspective view of the distal end grasping portion according to Modification 4 of the first embodiment in which a distal end portion of a suction pipe is connected to a proximal end portion of a distal end fixation member through a connection pipe.

FIG. 17 is a perspective view of the distal end grasping portion in which a distal end portion of a suction pipe 14*e*3 is connected to a proximal end portion of the distal end fixation member 14 through a connection pipe 14*e*4. The opening portion 14*e*1 communicates with the suction pipe 14*e*3.

A distal end pipe sleeve 16*h* has a hole 16*h*1 into which the suction pipe 14*e*3 can be inserted. The suction pipe 14*e*3 is movable forward and backward inside the distal end pipe sleeve 16*h* and the coil sheath 16 along the longitudinal axis.

Figure 18:
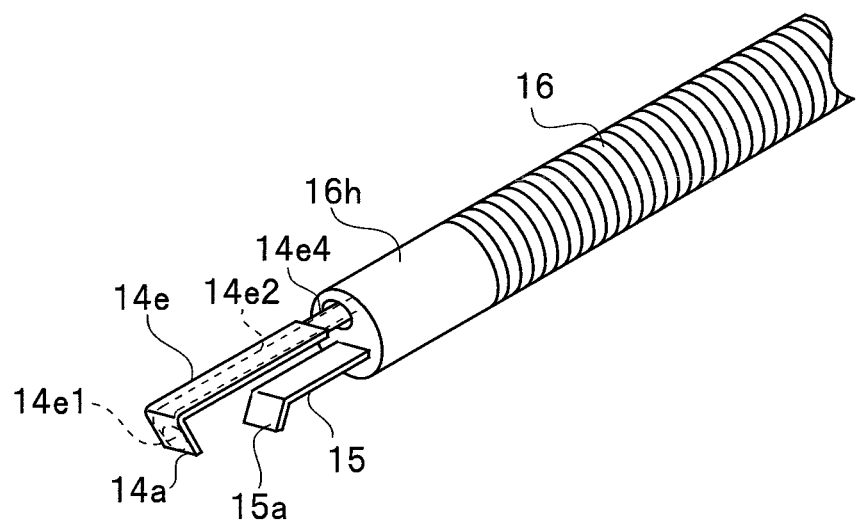
FIG. 18 illustrates a state in which the suction pipe is retracted in a hole provided to a distal end pipe sleeve according to Modification 4 of the first embodiment.

FIG. 18 illustrates a state in which the suction pipe 14*e*3 is retracted inside the hole provided to the distal end pipe sleeve 16*h*.

(Modification 5)

In Modification 4, the foreign object OB is firmly sandwiched by suction, but when the foreign object OB can be attracted by a magnet, the foreign object OB may be firmly grasped by magnetic force of the magnet.

Figure 19:
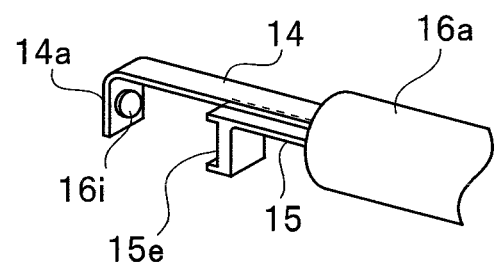
FIG. 19 is a perspective view of a distal end grasping portion according to Modification 5 of the first embodiment.
Figure 20:
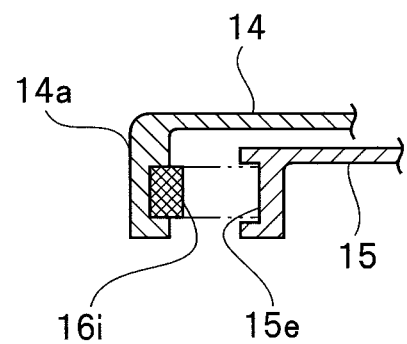
FIG. 20 is a perspective view of the distal end grasping portion according to Modification 5 of the first embodiment.

FIG. 19 is a perspective view of a distal end grasping portion according to Modification 5. FIG. 20 is a perspective view of the distal end grasping portion according to Modification 5.

A magnet 16*i* is fixed to an inner surface of the bending portion 14*a* of the distal end fixation member 14 by a bonding agent or the like.

A recessed portion 15*e* is formed at a distal end part of the distal end movable member 15. The recessed portion 15*e* moves toward the magnet 16*i* as the distal end movable member 15 moves to the distal end side. Accordingly, the foreign object OB attracted by the magnet 16*i* can be firmly pressed inside the recessed portion 15*e*.

Second Embodiment

In the first embodiment, the distal end grasping portion 11 is fixed to the insertion portion 13, but in a second embodiment, the distal end grasping portion 11 is detachably attached to a distal end portion of the insertion portion 13 and replaceable in accordance with an object to be collected or the like.

A configuration of the present embodiment is substantially the same as the above-described configuration of the first embodiment, and thus any identical component is denoted by the same reference sign and description of the component is omitted, and any different component will be described below in detail.

Figure 21:
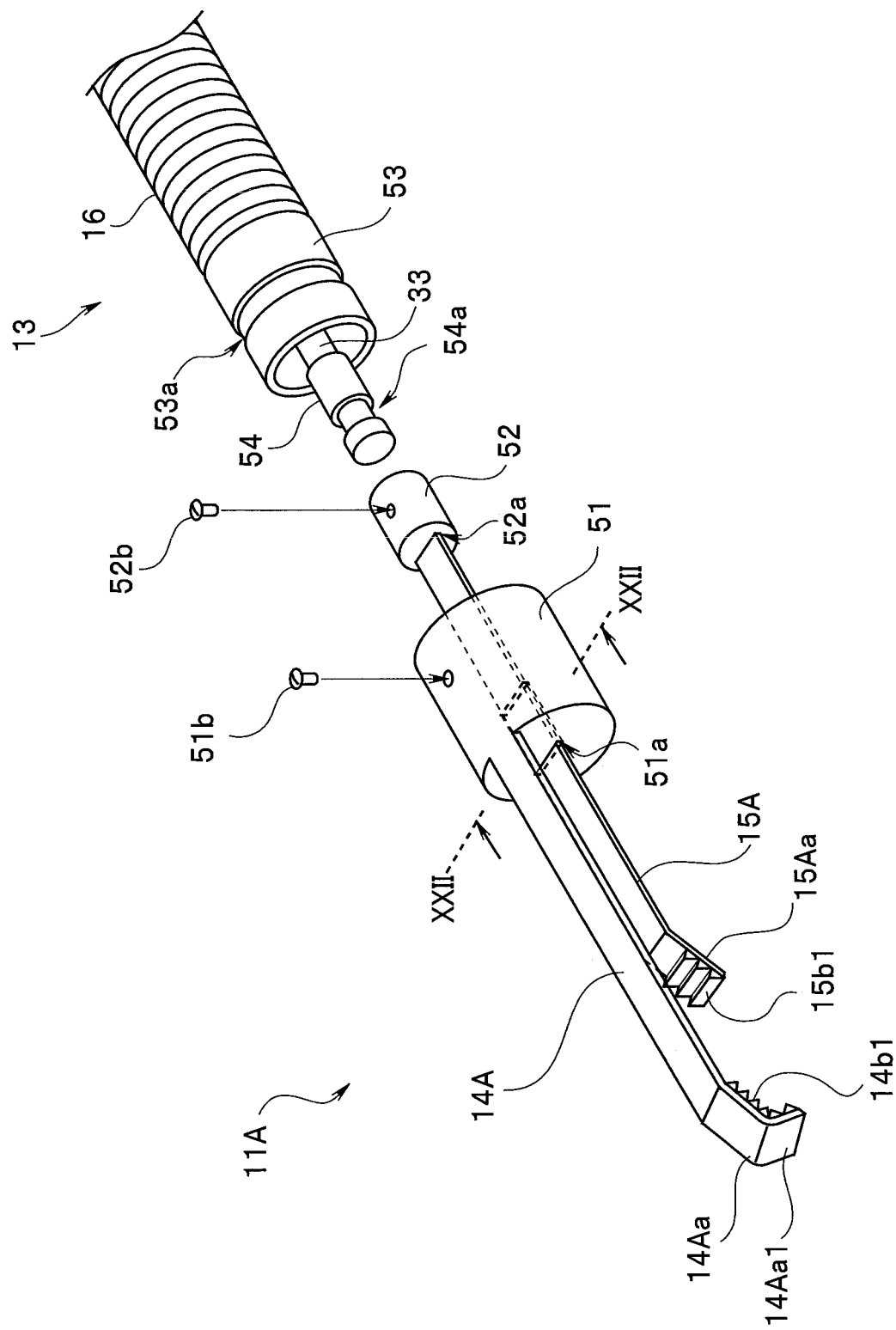
FIG. 21 is an exploded view of a distal end grasping portion of a second embodiment.
Figure 22:
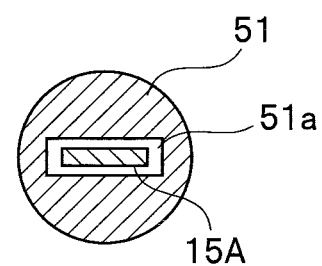
FIG. 22 is a cross-sectional view of the distal end grasping portion, which is taken along line XXII-XXII in FIG. 21.
Figure 23:
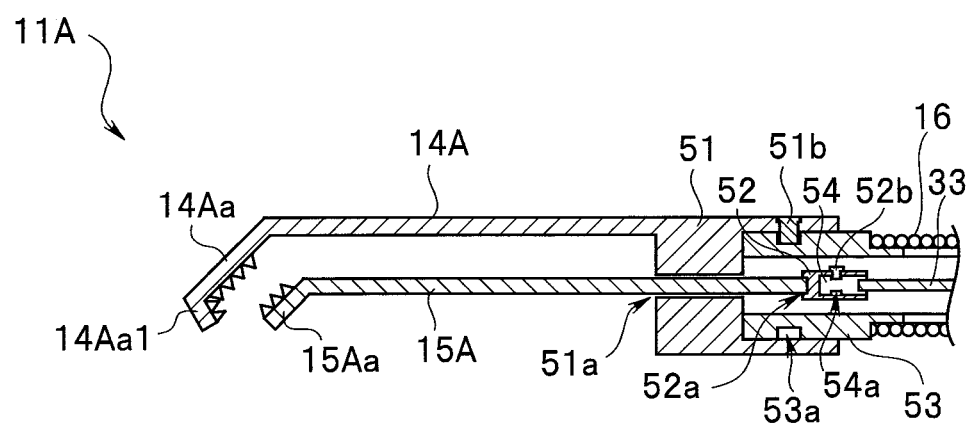
FIG. 23 is a cross-sectional view of the distal end grasping portion of the second embodiment along the longitudinal axis.

FIG. 21 is an exploded view of a distal end grasping portion 11A of the second embodiment. FIG. 22 is a cross-sectional view of the distal end grasping portion 11A, which is taken along line XXII-XXII in FIG. 21. FIG. 23 is a cross-sectional view of the distal end grasping portion 11A along the longitudinal axis. The distal end grasping portion 11A includes a distal end pipe sleeve 51. The distal end pipe sleeve 51 has a cylindrical shape. As illustrated in FIG. 21, the distal end pipe sleeve 51 includes a distal end fixation member 14A. The distal end fixation member 14A is integrally formed with a distal end pipe sleeve 51 and extends in the distal end direction along a longitudinal axis of the distal end pipe sleeve 51. The bending portion of the distal end fixation member 14A has a shape bent at two stages in the distal end direction along the longitudinal axis. A bending portion 14A*a*1 at the second stage is provided on the distal end side of a bending portion 14A*a* at the first stage. The bending portion 14A*a* is bent at an angle smaller than 90° relative to the longitudinal axis of the distal end fixation member 14A. The bending portion 14A*a*1 is bent at an angle exceeding 90° relative to the longitudinal axis of the distal end fixation member 14A. Note that the bending portion of the distal end fixation member 14A may be bent at two stages or more in the distal end direction along the longitudinal axis.

The distal end pipe sleeve 51 has a hole 51*a* in which a distal end movable member 15A is inserted and movable forward and backward along the longitudinal axis. The distal end movable member 15A includes a tilt portion 15A*a* at a distal end. The hole 51*a* has a shape slightly larger than a sectional shape of the distal end movable member 15A so that a tilt angle of the tilt portion 15Aa does not change.

The distal end movable member 15A is inserted into the hole 51a, and a proximal end portion of the distal end movable member 15A is inserted into a hole 52a of a coupling member 52 and fixed to the coupling member 52 by a bonding agent or the like.

A sheath pipe sleeve 53 is connected and fixed to the distal end of the coil sheath 16. The sheath pipe sleeve 53 includes a groove 53a formed in the circumferential direction on an outer peripheral surface.

A coupling member 54 is fixed to a distal end of the wire 33 by a bonding agent or the like. The coupling member 54 includes a groove 54a formed in a circumferential direction on an outer peripheral surface.

A proximal end part of the distal end pipe sleeve 51 has an inner diameter that allows insertion of a distal end part of the sheath pipe sleeve 53. The sheath pipe sleeve 53 can be fixed to the distal end pipe sleeve 51 by a screw 51b while the sheath pipe sleeve 53 is inserted on the proximal end side of the distal end pipe sleeve 51. The screw 51b enters the groove 53a.

In addition, the coupling member 52 is connected to the proximal end portion of the distal end movable member 15A. The coupling member 52 includes, on the proximal end side, a part having an inner diameter that allows insertion of a distal end part of the coupling member 54. The coupling member 52 and the coupling member 54 are fixed by a screw 52b while the coupling member 54 is inserted on the proximal end side of the coupling member 52. The screw 52b enters the groove 54a.

The distal end grasping portion 11A is detachably attached to the insertion portion 13 by the screws 51b and 52b.

A distal end part of the distal end fixation member 14A of the distal end grasping portion 11A includes the bending portions 14Aa and 14Aa1 bent at two stages. A tilt angle of the bending portion 14Aa is equal to the tilt angle of the tilt portion 15Aa of the distal end movable member 15A. Thus, when the distal end movable member 15A moves toward the distal end side and reaches the bending portion 14Aa of the distal end fixation member 14A, a tilted surface of the bending portion 14Aa and a tilted surface of the tilt portion 15Aa closely fit to each other.

Note that, in FIGS. 21 and 23, a plurality of convexo-concave portions 14b1 extending in a direction orthogonal to a longitudinal axis of the distal end grasping portion 11A are provided on inner surfaces of the bending portions 14Aa and 14Aa1, and a plurality of convexo-concave portions 15bi are provided on the tilt portion 15Aa as well, but no convexo-concave portions may be provided. The foreign object OB is solidly grasped by the plurality of convexo-concave portions 14b1 and 15b1.

(Operation)

The distal end grasping portion 11A is detachably attached to the insertion portion 13 by the screws 51b and 52b. Thus, the examiner selects the distal end grasping portion 11A that is suitable for a characteristic such as the shape of the foreign object OB to be collected, and mounts the selected distal end grasping portion 11A on the insertion portion 13.

Grasping operation is the same as that in the first embodiment. Specifically, the foreign object OB is sandwiched and grasped between the tilt portion 15Aa and each of the bending portions 14Aa and 14Aa1 by pushing and moving the distal end movable member 15A toward the distal end side.

In particular, the treatment instrument 7 of the present embodiment can firmly grasp the foreign object OB irrespective of the size of the foreign object OB.

Figure 24:
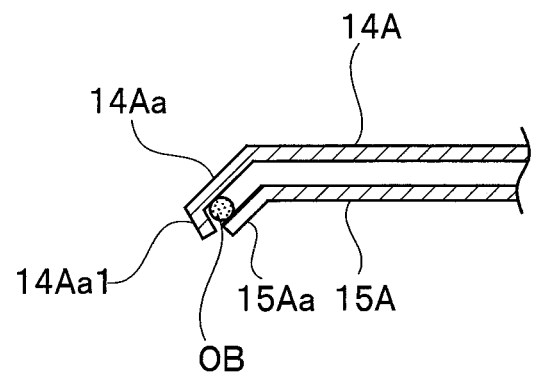
FIG. 24 is a diagram illustrating a grasping state of a treatment instrument related to the second embodiment when a foreign object is relatively large.
Figure 25:
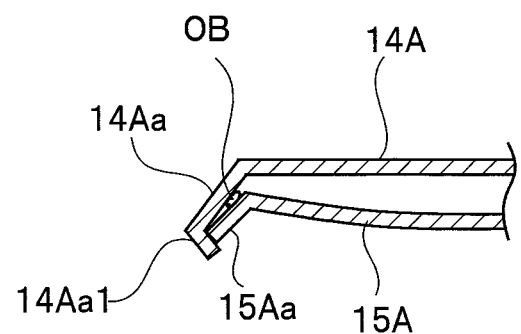
FIG. 25 is a diagram illustrating a grasping state of the treatment instrument related to the second embodiment when a foreign object is small.

FIG. 24 is a diagram illustrating a grasping state of the treatment instrument 7 when the foreign object OB is relatively large. FIG. 25 is a diagram illustrating a grasping state of the treatment instrument 7 when the foreign object OB is small.

When the foreign object is relatively large, as illustrated in FIG. 24, the foreign object OB is sandwiched and grasped between the tilt portion 15Aa of the distal end movable member 15A and a recessed portion between the bending portions 14Aa and 14Aa1 of the distal end fixation member 14A. When the foreign object OB is small, as illustrated in FIG. 25, a distal end of the tilt portion 15Aa of the distal end movable member 15A reaches the recessed portion between the bending portions 14Aa and 14Aa1 of the distal end fixation member 14A, and the foreign object OB is sandwiched and firmly fixed between the tilt portion 15Aa and the bending portions 14Aa and 14Aa1.

As described above, according to the above-described embodiment, it is possible to provide a treatment instrument with which it is easy to position a grasping portion relative to an object and collect the object.

In addition, according to the above-described embodiment, the distal end grasping portion 11A is replaceable in accordance with an object to be collected, and the bending portions 14Aa and 14Aa1 is bent to form a recessed portion, and thus the foreign object OB can be reliably grasped irrespective of the size of the foreign object OB.

Third Embodiment

In the first and second embodiments, the treatment instrument is used alone, but in a third embodiment, the treatment instrument is mounted and used on the endoscope.

A configuration of the present embodiment includes a component substantially the same as a component of the above-described configuration of the first embodiment, and thus any identical component is denoted by the same reference sign and description of the component is omitted, and any different component will be described below in detail.

Figure 26:
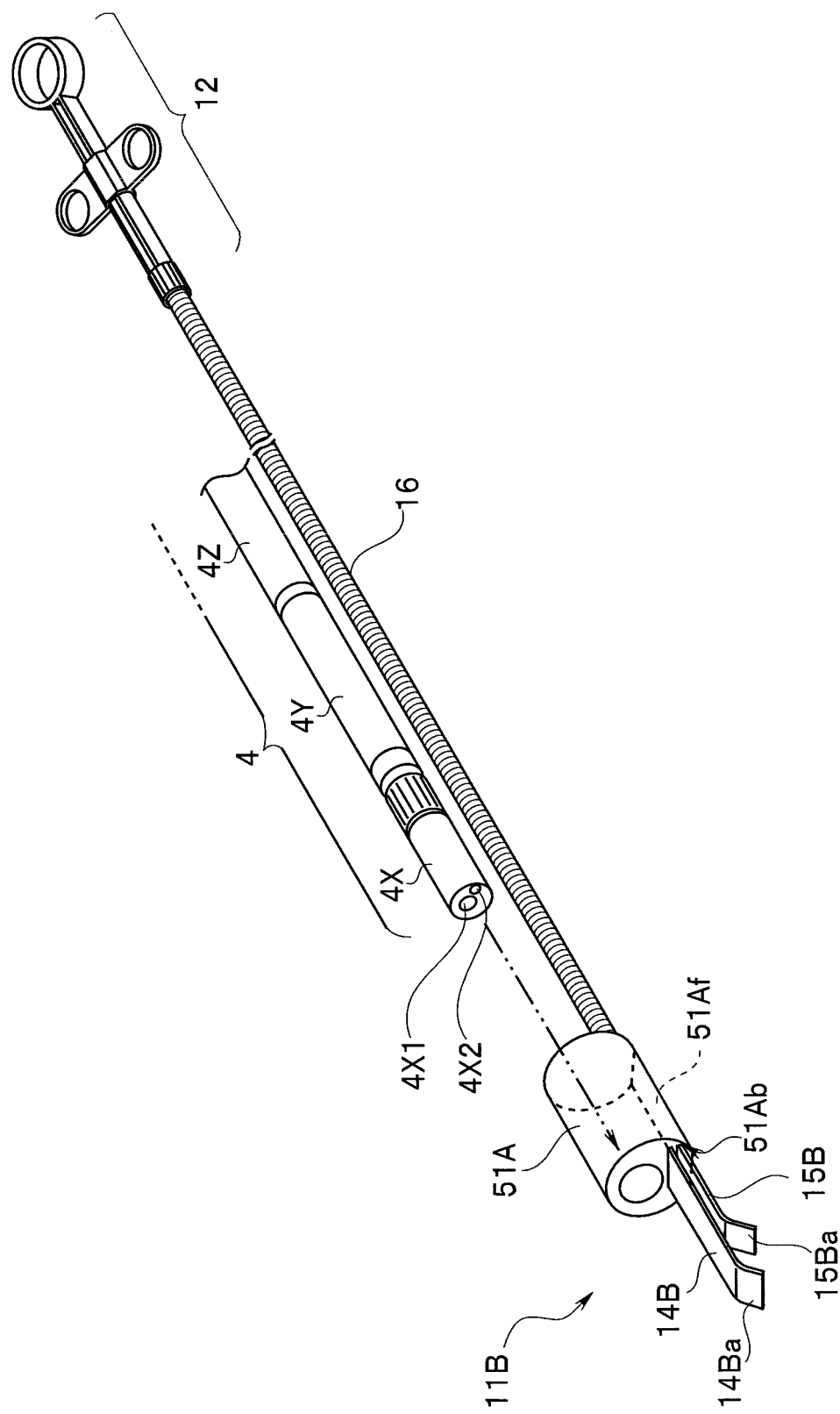
FIG. 26 is a perspective view illustrating a use aspect of a treatment instrument of a third embodiment.
Figure 27:
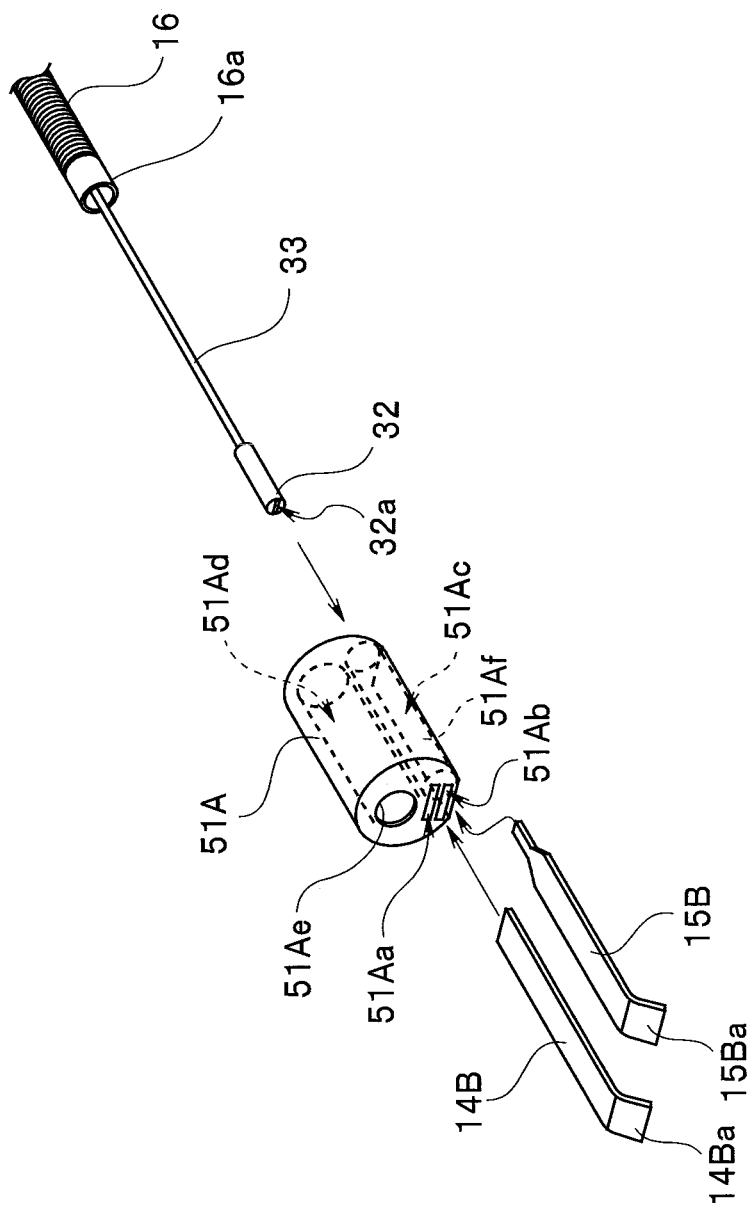
FIG. 27 is a perspective view of a distal end grasping portion of the treatment instrument of the third embodiment.
Figure 28:
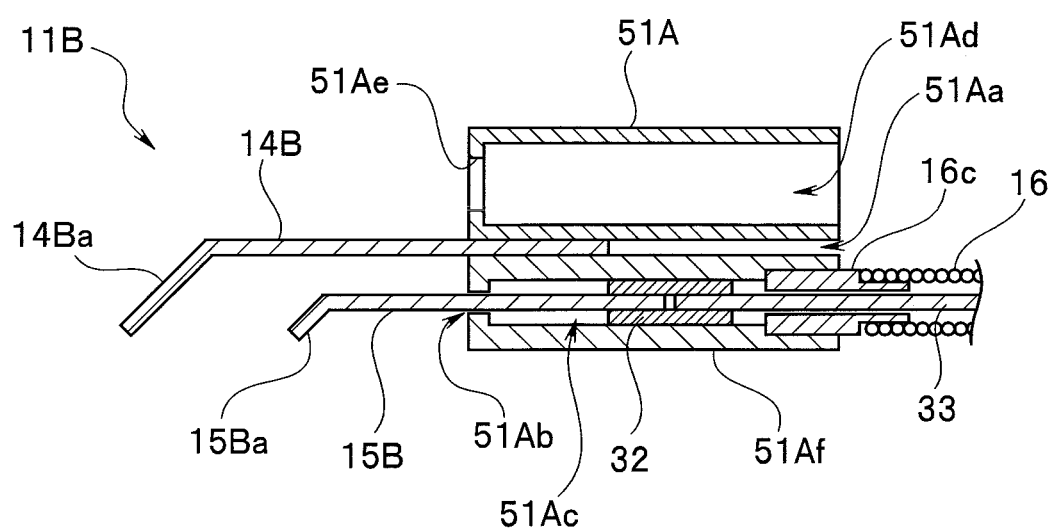
FIG. 28 is a cross-sectional view of the distal end grasping portion of the treatment instrument related to the third embodiment along the longitudinal axis.

FIG. 26 is a perspective view illustrating a use aspect of a treatment instrument of the third embodiment. FIG. 27 is a perspective view of a distal end grasping portion 11B of the treatment instrument of the third embodiment. FIG. 28 is a cross-sectional view of the distal end grasping portion 11B of the treatment instrument related to the third embodiment along the longitudinal axis.

The treatment instrument 7 includes a distal end fixation member 14B and a distal end movable member 15B. The distal end grasping portion 1/B of the treatment instrument 7 includes a distal end pipe sleeve 51A having a cylindrical shape. The distal end fixation member 14B and the distal end movable member 15B have the same shapes as shapes of the distal end fixation member 14 and the distal end movable member 15, respectively, of the first embodiment.

A proximal end portion of the distal end fixation member 14B is fitted to a hole 51Aa at a distal end surface of the distal end pipe sleeve 51A and fixed to the distal end surface of the distal end pipe sleeve 51A by a bonding agent. The distal end fixation member 14B includes a bending portion 14Ba at a distal end.

The distal end pipe sleeve 51A has an opening 51Ab at the distal end surface, and a hole 51Ac communicating with the opening 51Ab is formed inside the distal end pipe sleeve 51A. The opening 51Ab has a rectangular shape in accordance with a sectional shape of the distal end movable member 15B so that the orientation of the distal end movable member 15B does not change. Specifically, the distal end movable member 15B is inserted into the opening 51Ab formed at the distal end pipe sleeve 51A.

A proximal end part of the distal end movable member 15B is fitted to the distal end side groove 32a of the coupling member 32 and fixed to the coupling member 32 by a bonding agent or the like. The distal end part of the wire 33 is fixed to the proximal end portion of the coupling member 32.

The wire 33 is inserted into the coil sheath 16. As illustrated in FIG. 28, a distal end part of the distal end pipe sleeve 16a is internally fitted to the hole 51Ac from the proximal end side of the distal end pipe sleeve 51A and fixed to the distal end pipe sleeve 51A by a bonding agent or the like.

The coupling member 32 moves forward and backward in the hole 51Ac in accordance with forward and backward movement of the wire 33. As a result, the distal end movable member 15B fixed to the coupling member 32 moves forward and backward in accordance with forward and backward movement of the wire 33.

The distal end pipe sleeve 51A has a hole 51Ad formed along a longitudinal axis of the distal end pipe sleeve 51A. An inward flange 51Ae is formed on the distal end side of the hole 51Ad. The hole 51Ad is a lock hole into which a distal end portion 4X of the insertion portion 4 of the endoscope 2 can be inserted. In other words, the distal end portion 4X of the endoscope 2 can be inserted into the hole 51Ad formed at the distal end pipe sleeve 51A.

The distal end pipe sleeve 51A has a flat surface 51Af on an outer peripheral surface. The flat surface 51Af is a surface formed by cutting an outer surface of the distal end pipe sleeve 51A having a cylindrical shape in parallel to the longitudinal axis. The flat surface 51Af is parallel to a longitudinal axis of the opening 51Ab. For example, when the flat surface 51Af is parallel to the floor surface F in a subject, a distal end portion of a tilt portion 15Ba of the distal end movable member 15B is parallel to the floor surface F. In other words, the flat surface 51Af is parallel to a straight portion at an edge part of the tilt portion 15Ba as a distal end portion of the distal end movable member 15B. As a result, the bending portion 14Ba of the distal end fixation member 14B and the tilt portion 15Ba of the distal end movable member 15B are bent toward the floor surface F in the subject, and thus the foreign object OB on the floor surface F can be easily scooped by the tilt portion 15Ba.

The insertion portion 4 includes, sequentially from the distal end side, a distal end rigid portion 4X, a bending portion 4Y, and a flexible tube portion 4Z. An observation window 4X1 and an illumination window 4X2 are provided at a distal end surface of the distal end rigid portion 4X. An object is illuminated with illumination light emitted from the illumination window 4X2. Reflected light from the object is incident on the observation window 4X1. The reflected light from the object forms an object image on an image pickup surface of an image pickup device (not illustrated) through an objective optical system (not illustrated) disposed behind the observation window 4X1. Then, the endoscope image obtained by the endoscope 2 is displayed on a monitor (not illustrated) so that the examiner can observe inside of the subject.

As illustrated with a dashed and double-dotted line in FIG. 26, when a distal end part of the distal end rigid portion 4X is inserted into the hole 51Ad from the proximal end side of the distal end pipe sleeve 51A, the distal end surface of the distal end rigid portion 4X contacts the inward flange 51Ae. The insertion portion 4 is bundled together with the coil sheath 16 by a banding band or the like and fixed to the distal end pipe sleeve 51A.

Note that the distal end rigid portion 4X may be fixed to the distal end pipe sleeve 51A by a screw or the like.

As described above, the treatment instrument 7 including the distal end grasping portion 11B has a structure that can fix the distal end rigid portion 4X of the endoscope 2. The distal end rigid portion 4X of the endoscope 2 is fixed to the distal end pipe sleeve 51A when the treatment instrument 7 is used.

In other words, the treatment instrument 7 serves as a treatment instrument unit including the distal end grasping portion 11B, the operation portion 12, and the insertion portion 13. The treatment instrument unit is mounted on the insertion portion 4 of the endoscope 2 and used. The distal end grasping portion 1/B includes the distal end pipe sleeve 51A as a tubular member, the distal end fixation member 14B, and the distal end movable member 15B.

The distal end movable member 15B is connected to the wire 33 through the coupling member 32 and can slide inside the distal end pipe sleeve 51A.

(Operation)

The examiner mounts the treatment instrument unit on the distal end rigid portion 4X of the endoscope 2. At the mounting of the treatment instrument unit on the endoscope 2, the treatment instrument unit is fixed to the insertion portion 4 of the endoscope 2 so that the distal end grasping portion 11B is positioned in a visual field of the endoscope 2.

When the foreign object OB is to be collected during an endoscope examination, positioning is performed so that the foreign object OB is positioned between the bending portion 14Ba of the distal end fixation member 14B and the tilt portion 15Ba of the distal end movable member 15B, and the distal end movable member 15B is pushed to grasp the foreign object OB.

The flat surface 51Af as a bottom surface is provided on a side surface of the distal end pipe sleeve 51A, and an operation is performed on the hand side so that the flat surface 51Af contacts the floor surface F of a subject to be examined. In the operation, the orientation of the distal end pipe sleeve 51A can be adjusted by twisting the endoscope 2 and the coil sheath 16 of the treatment instrument unit.

After positioning the distal end grasping portion 11B and adjusting an axial angle of the distal end grasping portion 11B, the examiner operates the distal end movable member 15B to grasp the foreign object OB and pulls the treatment instrument 7 out of the subject together with the endoscope 2 while the foreign object OB is grasped, thereby collecting the foreign object OB.

As described above, according to the above-described embodiment, it is possible to provide a treatment instrument with which it is easy to position a grasping portion relative to an object and collect the object. In particular, the treatment instrument 7 can be detachably mounted on the endoscope 2 and can be easily operated together with an operation of the endoscope 2.

Fourth Embodiment

In the third embodiment, the distal end rigid portion 4X of the endoscope is disposed on a side opposite to the distal end movable member 15B with respect to the distal end fixation member 14B of the treatment instrument 7, but in a fourth embodiment, the distal end rigid portion 4X of the endoscope is disposed between the distal end fixation member 14B of the treatment instrument 7 and the distal end movable member 15B.

A configuration of the present embodiment includes components substantially the same as components of the above-described configurations of the first and third embodiments, and thus any identical component is denoted by the same reference sign and description of the component is omitted, and any different component will be described below in detail.

Figure 29:
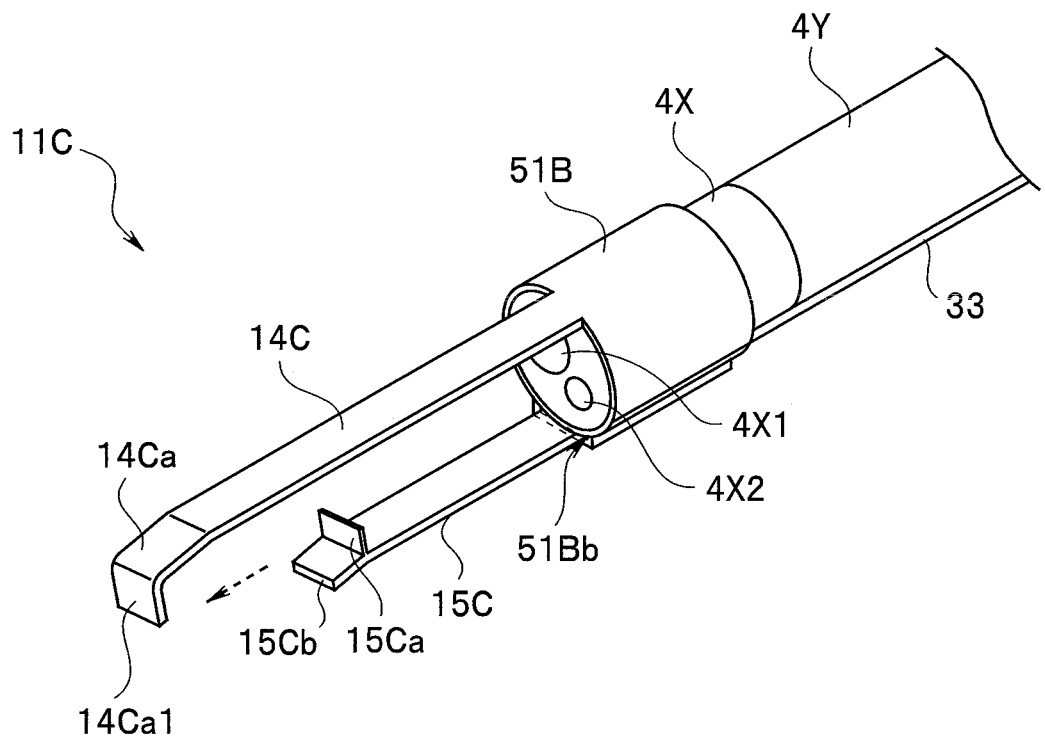
FIG. 29 is a perspective view of a distal end grasping portion of a treatment instrument of a fourth embodiment.
Figure 30:
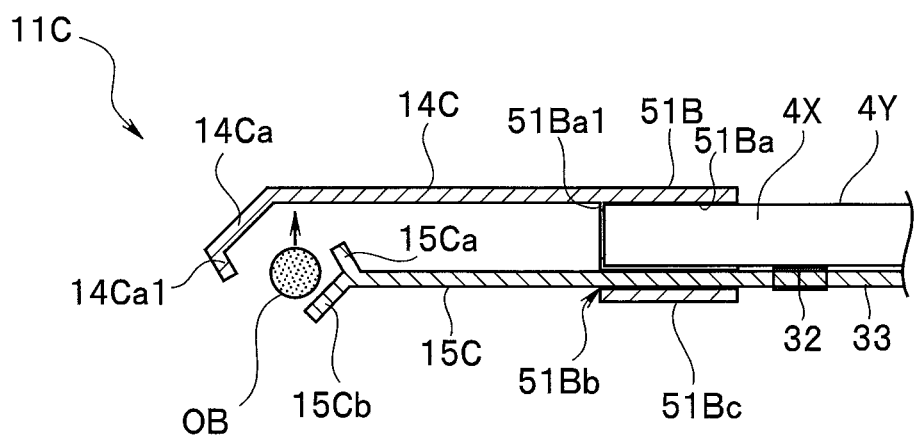
FIG. 30 is a cross-sectional view of the distal end grasping portion related to the fourth embodiment along the longitudinal axis.

FIG. 29 is a perspective view of a distal end grasping portion 11C of a treatment instrument of the fourth embodiment. FIG. 30 is a cross-sectional view of the distal end grasping portion 11C related to the fourth embodiment along the longitudinal axis.

The distal end grasping portion 11C includes a distal end pipe sleeve 51B having a cylindrical shape. The distal end grasping portion 11C includes a distal end fixation member 14C and a distal end movable member 15C.

A hole 51Ba into which the distal end rigid portion 4X of the endoscope 2 can be inserted from the proximal end side is formed at the distal end pipe sleeve 51B. Thus, the distal end portion 4X of the endoscope 2 can be inserted into the hole 51Ba as a lock hole formed at the distal end pipe sleeve 51B. An inward flange 51Ba1 is formed on an inner peripheral surface of the hole 51Ba on the distal end side. When the distal end rigid portion 4X is inserted into the hole 51Ba, the distal end surface of the distal end rigid portion 4X reaches the inward flange 51Ba1 and is fixed.

The distal end fixation member 14C is formed to extend from the distal end pipe sleeve 51B in the distal end direction. Specifically, the distal end fixation member 14C is fixed to the distal end pipe sleeve 51B. A distal end part of the distal end fixation member 14C has a shape bent at two stages. A bending portion 14Ca1 at the second stage is provided on the distal end side of a bending portion 14Ca at the first stage.

The distal end movable member 15C is disposed on a side opposite to the distal end fixation member 14C with respect to the distal end rigid portion 4X of the endoscope 2. A distal end part of the distal end movable member 15C is divided into two portions. One of the two portions is a first tilt portion 15Ca that is tilted toward the distal end fixation member 14C, and the other of the two portions is a second tilt portion 15Cb that is tilted toward a side opposite to the distal end fixation member 14C.

The bending portions 14Ca and 14Ca1 and the first and second tilt portions 15Ca and 15Cb are formed so that a first recess between the bending portion 14Ca and the bending portion 14Ca1 faces a second recess between the first tilt portion 15Ca and the second tilt portion 15Cb of the distal end movable member 15C when the distal end movable member 15C moves in the distal end direction.

Note that, in this example, the distal end fixation member 14C is integrally formed with the distal end pipe sleeve 51B and extends from a distal end portion of the distal end pipe sleeve 51B in the distal end direction, but the distal end fixation member 14C may be separately formed from the distal end pipe sleeve 51B and fixed to the distal end pipe sleeve 51B by a screw or the like.

The distal end pipe sleeve 51B has a hole 51Bb formed along a central axis at a position opposite to the distal end fixation member 14C with respect to the central axis. The distal end movable member 15C as a plate member is inserted into the hole 51Bb. In other words, the hole 51Ba is formed between the distal end fixation member 14C and the distal end movable member 15C. A proximal end portion of the distal end movable member 15C is connected to a distal end portion of the wire 33 through the coupling member 32.

A side surface of the distal end pipe sleeve 51B on the hole 51Bb side is a flat surface 51Bc.

The distal end movable member 15C moves toward the distal end side as the handle 19 of the operation portion 12 is pushed toward the distal end side.

(Operation)

The distal end pipe sleeve 51B is connectable to the distal end rigid portion 4X of the endoscope 2. After inserting the distal end rigid portion 4X of the endoscope 2 into the hole 51Ba, the examiner can examine inside of a subject while observing an endoscope image. The endoscope image is an image when the distal end side is viewed from the proximal end side between the distal end fixation member 14C and the distal end movable member 15C.

While observing the endoscope image, the examiner positions the foreign object OB on the floor surface F between the distal end fixation member 14C and the distal end movable member 15C.

As the distal end movable member 15C is pushed in the distal end direction as illustrated with a dotted line in FIG. 29, the foreign object OB is scooped by the second tilt portion 15Cb, and then reaches the bending portion 14Ca1 and is sandwiched between the first recess, which is formed between the bending portion 14Ca and the bending portion 14Ca1, and the second recess, which is formed between the first tilt portion 15Ca and the second tilt portion 15Cb of the distal end fixation member 14C, as illustrated in FIG. 30.

When the second tilt portion 15Cb hits the foreign object OB, a tilt of the second tilt portion 15Cb generates force (illustrated with a solid line arrow) that moves the foreign object OB toward the distal end fixation member 14C, and the foreign object OB is grasped between the distal end fixation member 14C and the distal end movable member 15C. In this case, the foreign object OB is sandwiched and firmly fixed between the first recess and the second recess.

The foreign object OB can be collected by pulling the treatment instrument 7 together with the endoscope 2 out of the subject while the foreign object OB is grasped.

As described above, according to the above-described embodiment, it is possible to provide a treatment instrument with which it is easy to position a grasping portion relative to an object and collect the object. In particular, the treatment instrument 7 can be detachably mounted on the endoscope 2 and can be easily operated together with an operation of the endoscope 2.

Fifth Embodiment

In the fourth embodiment, the distal end fixation member 14C is fixed to the distal end pipe sleeve 51B so that the distal end fixation member 14C cannot move, but in a fifth embodiment, the distal end fixation member is movable forward and backward along the longitudinal axis of the distal end pipe sleeve and is rotatable about the longitudinal axis of the distal end fixation member.

A configuration of the present embodiment includes components substantially the same as components of the above-described configurations of the first, third, and fourth embodiments, and thus any identical component is denoted by the same reference sign and description of the component is omitted, and any different component will be described below in detail.

Figure 31:
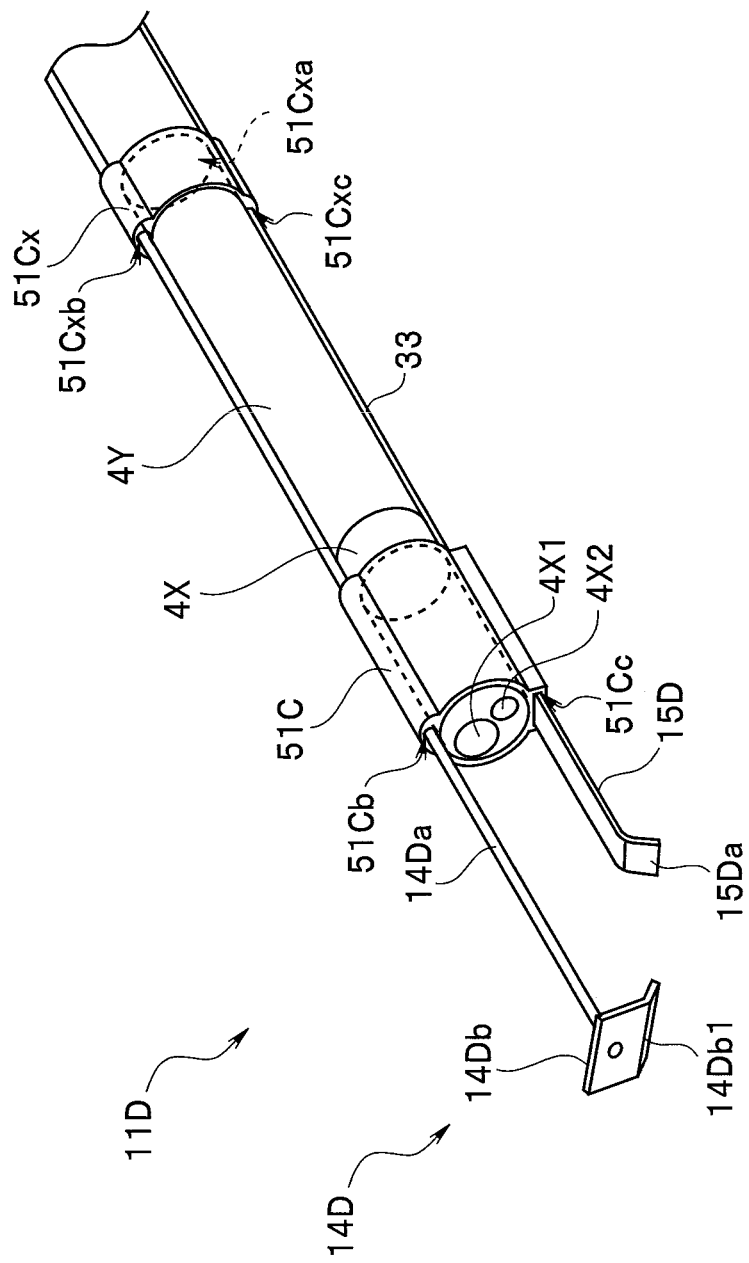
FIG. 31 is a perspective view of a distal end grasping portion of a treatment instrument of a fifth embodiment.

FIG. 31 is a perspective view of a distal end grasping portion 11D of a treatment instrument according to the fifth embodiment.

Figure 32:
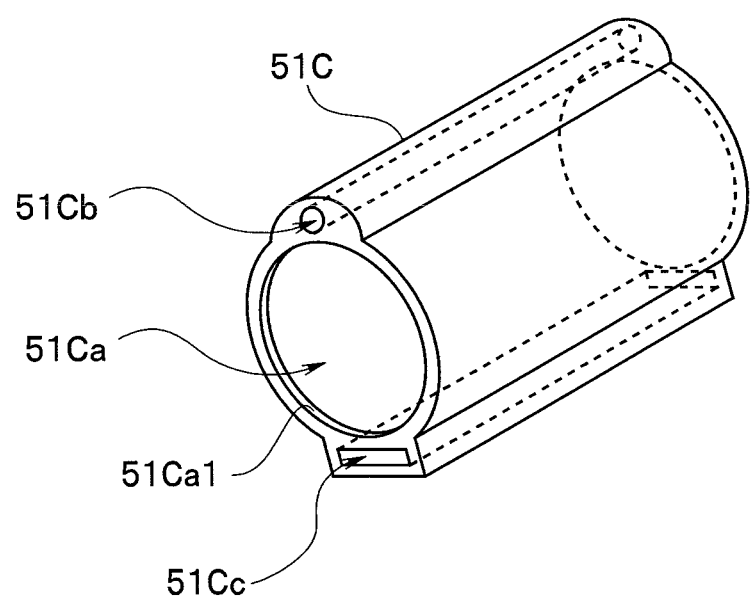
FIG. 32 is a perspective view of a distal end pipe sleeve of the fifth embodiment.

The distal end grasping portion 11D includes distal end pipe sleeves 51C and 51Cx having cylindrical shapes. FIG. 32 is a perspective view of the distal end pipe sleeve 51C. The distal end pipe sleeve 51C has a hole 51Ca along the longitudinal axis. An inward flange 51Ca1 is formed on an inner peripheral surface of the hole 51Ca on the distal end side.

The distal end pipe sleeve 51C further has two holes 51Cb and 51Cc. A distal end fixation member 14D includes a wire 14Da, and a plate member 14Db provided at a distal end of the wire 14Da. The hole 51Cb is a fixation member insertion hole that is formed along a longitudinal axis of the distal end pipe sleeve 51C, into which the wire 14Da connected to the plate member 14Db can be inserted, and in which the distal end fixation member 14D is axially rotatable. In other words, the distal end fixation member 14D is rotatable about the axis of the distal end fixation member 14D in the hole 51Cb. The wire 14Da is a multi-thread multi-layer coil (for example, five-thread coil). The hole 51Cc is formed along the longitudinal axis of the distal end pipe sleeve 51C so that the coupling member 32 and the wire 33 connected to a distal end movable member 15D can be inserted into the hole 51Cc.

Similarly to the distal end pipe sleeve 51C, the distal end pipe sleeve 51Cx has three holes 51Cxa, 51Cxb, and 51Cxc. The hole 51Cxa is formed along a longitudinal axis of the distal end pipe sleeve 51Cx so that the distal end rigid portion 4X and the bending portion 4Y of the endoscope 2 can be inserted into the hole 51Cxa. The hole 51Cxb is formed along the longitudinal axis of the distal end pipe sleeve 51Cx so that the wire 14Da connected to the distal end fixation member 14D can be inserted into the hole 51Cxb. The hole 51Cxc is formed along the longitudinal axis of the distal end pipe sleeve 51Cx so that the wire 33 connected to the distal end movable member 15D can be inserted into the hole 51Cxc.

The plate member 14Db is fixed to the distal end of the wire 14Da by welding or the like. The plate member 14Db includes a bending portion 14Db1 that is bent toward the proximal end side.

The distal end movable member 15D includes a tilt portion 15Da at a distal end.

Figure 33:
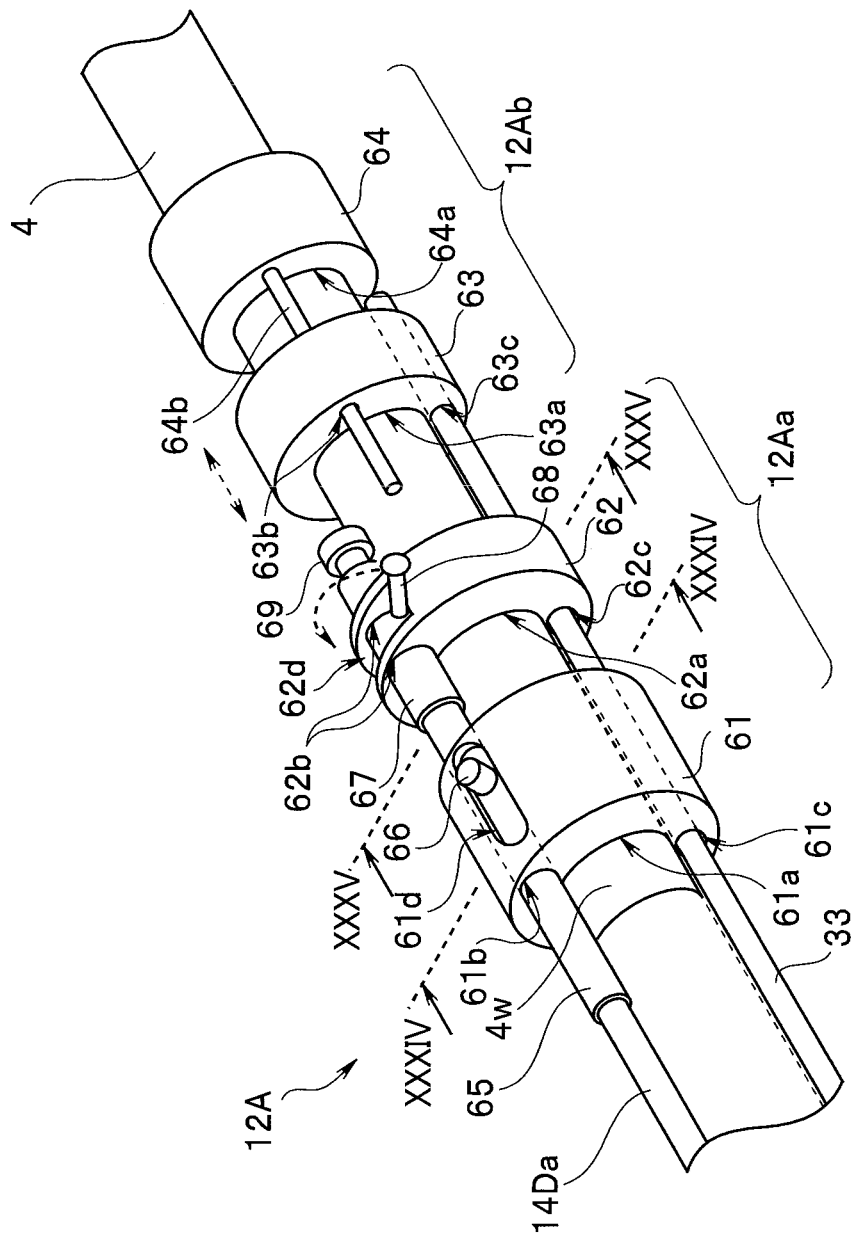
FIG. 33 is a perspective view of an operation portion of the fifth embodiment.
Figure 34:
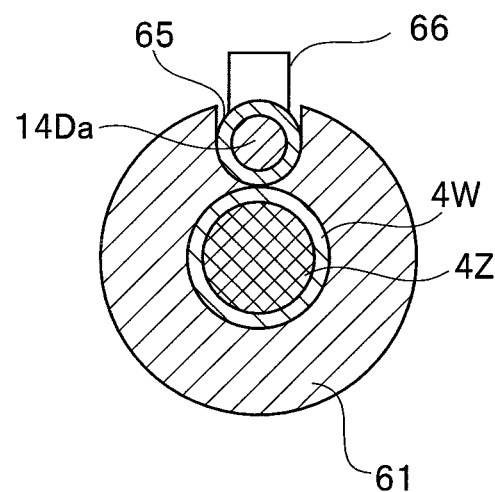
FIG. 34 is a cross-sectional view of the operation portion taken along line XXXIV-XXXIV in FIG. 33.
Figure 35:
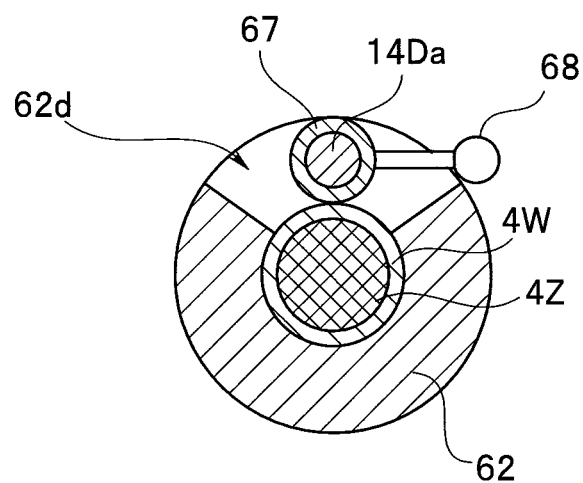
FIG. 35 is a cross-sectional view of the operation portion taken along line XXXV-XXXV in FIG. 33.

FIG. 33 is a perspective view of an operation portion 12A. FIG. 34 is a cross-sectional view of the operation portion 12A, which is taken along line XXXIV-XXXIV in FIG. 33. FIG. 35 is a cross-sectional view of the operation portion 12A, which is taken along line XXXV-XXXV in FIG. 33.

The operation portion 12A includes a first operation portion 12Aa and a second operation portion 12Ab. The first operation portion 12Aa is operated to move the distal end fixation member 14D. The second operation portion 12Ab is operated to move the distal end movable member 15D forward and backward.

The first operation portion 12Aa includes pipe sleeves 61 and 62. The second operation portion 12Ab includes pipe sleeves 63 and 64.

Holes 61a and 62a into which a pipe sleeve 4w provided at a proximal end portion of the insertion portion 4 is inserted are provided at central parts of the pipe sleeves 61 and 62, respectively. The pipe sleeve 61 has a hole 61b into which a pipe 65 is inserted, and a hole 61c into which the wire 33 is inserted. The pipe sleeve 62 has a hole 62b into which a pipe 67 is inserted, and a hole 62c into which the wire 33 is inserted.

The pipe sleeve 4w is fixed to the pipe sleeve 61. The pipe sleeve 4w is not fixed to the pipe sleeve 62 and is movable along a longitudinal axis of the insertion portion 4.

The pipe 65 is inserted into the pipe sleeve 61 so that the pipe 65 can slide in the axial direction. The wire 14Da is inserted into the pipe 65. The wire 14Da is fixed to the pipe 65 by a bonding agent or the like. A forward-backward movement lever 66 for the distal end fixation member is provided and fixed to the pipe 65. The forward-backward movement lever 66 is disposed to extend in the outward radial direction through a hole 61d formed at the pipe sleeve 61. The hole 61d is a long hole formed along a longitudinal axis of the wire 14Da.

The wire 14Da moves forward and backward as the forward-backward movement lever 66 is moved forward and backward along the longitudinal axis of the wire 14Da.

The pipe 67 is provided to the pipe sleeve 62. The pipe 67 is fixed to the pipe 65 by a bonding agent or the like. A hole 62d formed in the circumferential direction is provided to the pipe sleeve 62. The hole 62d is a long hole, and the two holes 62b through which the pipe 67 extends are formed at two walls of the hole 62d on both sides.

A rotation lever 68 for axial rotation of the distal end fixation member 14D is fixed to the pipe 67. The rotation lever 68 is disposed to extend in the outward radial direction through the hole 61d. The rotation lever 68 is rotatable in the circumferential direction in the hole 62d. The rotation lever 68 is pivotally supported about an axis of the pipe 67. The pipe 67 rotates about the axis in accordance with rotation of the rotation lever 68, and the wire 14Da rotates about the axis as well.

A pipe member 69 for removal prevention is fixed to an end part of the wire 14Da protruding on the proximal end side of the pipe 67.

The second operation portion 12Ab is disposed on the proximal end side of the first operation portion 12Aa. The pipe sleeve 63 of a cylindrical shape has a hole 63a into which the insertion portion 4 is inserted, and is provided to be slidable relative to the insertion portion 4 in the axial direction. The pipe sleeve 64 of a cylindrical shape has a hole 64a into which the insertion portion 4 is inserted, and is fixed to the insertion portion 4.

A hole 63c into which the wire 33 is inserted is formed at the pipe sleeve 63 in the axial direction. The proximal end portion of the wire 33 is fixed to the hole 63c by a bonding agent or the like.

The pipe sleeve 64 is provided with a guide pin 64b extending in the distal end direction. The pipe sleeve 63 has a hole 63b into which a guide pin 64a is inserted. The pipe sleeve 63 is guided by the guide pin 64b when moving forward and backward along the longitudinal axis of the insertion portion 4.

(Operation)

Figure 36:
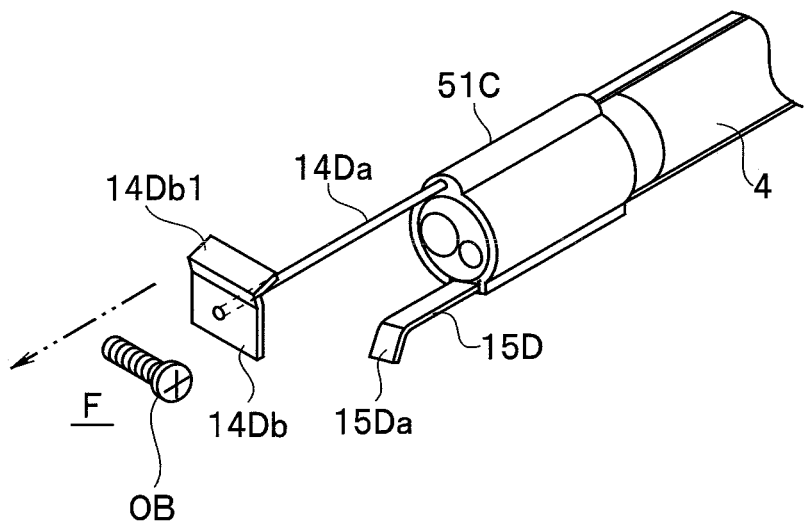
FIG. 36 is a perspective view for description of a method of collecting a foreign object with the treatment instrument related to the fifth embodiment.
Figure 37:
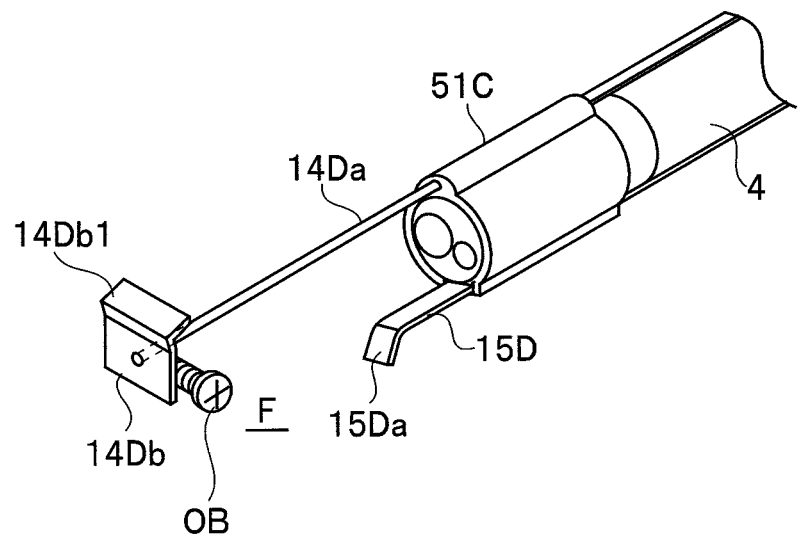
FIG. 37 is a perspective view for description of the method of collecting a foreign object with the treatment instrument related to the fifth embodiment.
Figure 38:
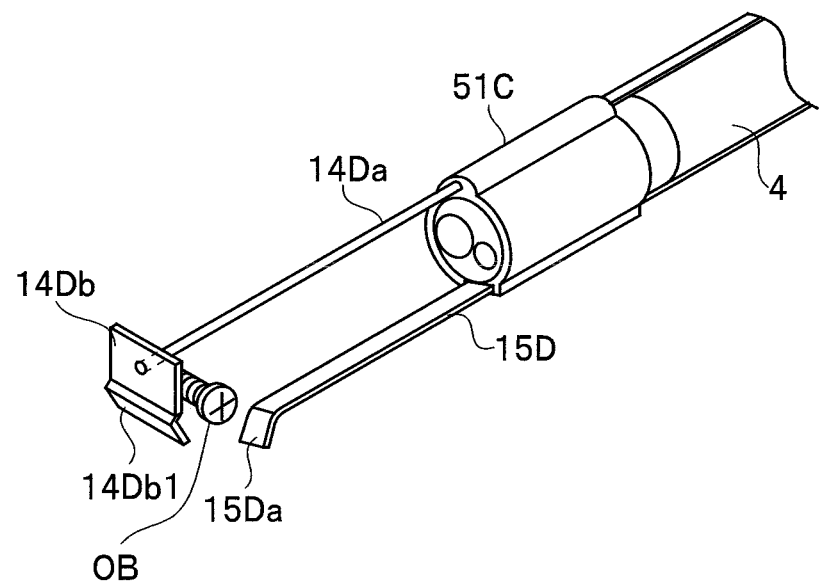
FIG. 38 is a perspective view for description of the method of collecting a foreign object with the treatment instrument related to the fifth embodiment.
Figure 39:
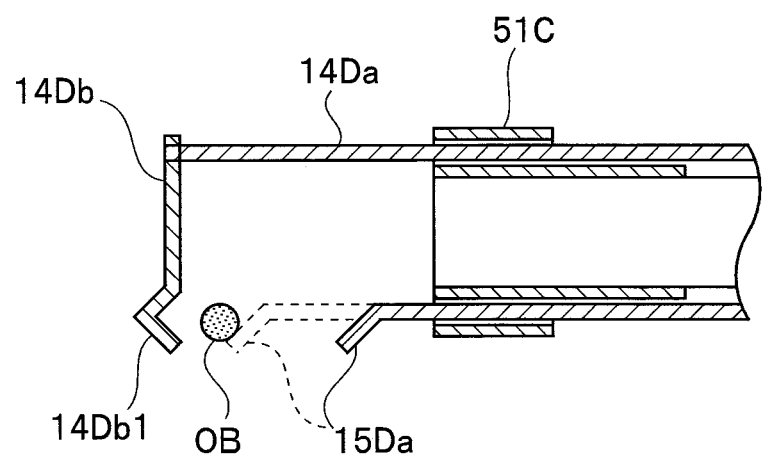
FIG. 39 is a schematic cross-sectional view of a distal end fixation member and a distal end movable member for description of the method of collecting a foreign object with the treatment instrument.

FIGS. 36 to 38 are perspective views for description of a method of collecting the foreign object OB with the treatment instrument 7. FIG. 39 is a schematic cross-sectional view of the distal end fixation member 14D and the distal end movable member 15D for description of the method of collecting the foreign object OB with the treatment instrument 7. In this example, the foreign object OB is a screw on the floor surface F.

As illustrated in FIG. 36, after having checked the foreign object OB during an endoscope examination, the examiner operates the rotation lever 68 of the first operation portion 12Aa to perform rotation so that the tilt portion 14Db1 is positioned on a side opposite to the foreign object OB (in other words, the tilt portion 14Db1 is positioned at a place above and separated from the floor surface F).

Subsequently, as illustrated with a dashed and double-dotted line in FIG. 37, the forward-backward movement lever 66 is pushed in the distal end direction so that the plate member 14Db of the distal end fixation member 14D is positioned beyond the foreign object OB.

In addition, the rotation lever 68 is operated so that, as illustrated in FIG. 38, the bending portion 14Db1 of the distal end fixation member 14D is positioned on the floor surface F side and an edge part of the bending portion 14Db1 contacts the floor surface F.

Then, as illustrated in FIG. 39, the forward-backward movement lever 66 is operated to push the distal end movable member 15D toward the distal end side and sandwich the foreign object OB. The foreign object OB is sandwiched and fixed between the tilt portion 15Da and the bending portion 14Db1.

As described above, according to the above-described embodiment, it is possible to provide a treatment instrument with which it is easy to position the distal end grasping portion 11D relative to an object to be collected and collect the object.

In particular, according to the present embodiment, the distal end fixation member 14D is movable in the longitudinal direction and axially rotatable. Moreover, the distal end movable member 15D is movable along the longitudinal axis. Thus, with the treatment instrument 7, it is easy to position the distal end grasping portion 11D relative to the foreign object OB and it is possible to reduce fumbling.

Sixth Embodiment

In the first to fifth embodiments, the foreign object OB is sandwiched between one bending portion and one tilt portion, but in a sixth embodiment, a distal end grasping portion includes a plurality of bending portions and a plurality of tilt portions so that the foreign object OB can be sandwiched between any one of the bending portions and any one of the tilt portions.

A configuration of the present embodiment includes components substantially the same as components of the above-described configurations of the first to fifth embodiments, and thus any identical component is denoted by the same reference sign and description of the component is omitted, and any different component will be described below in detail.

Figure 40:
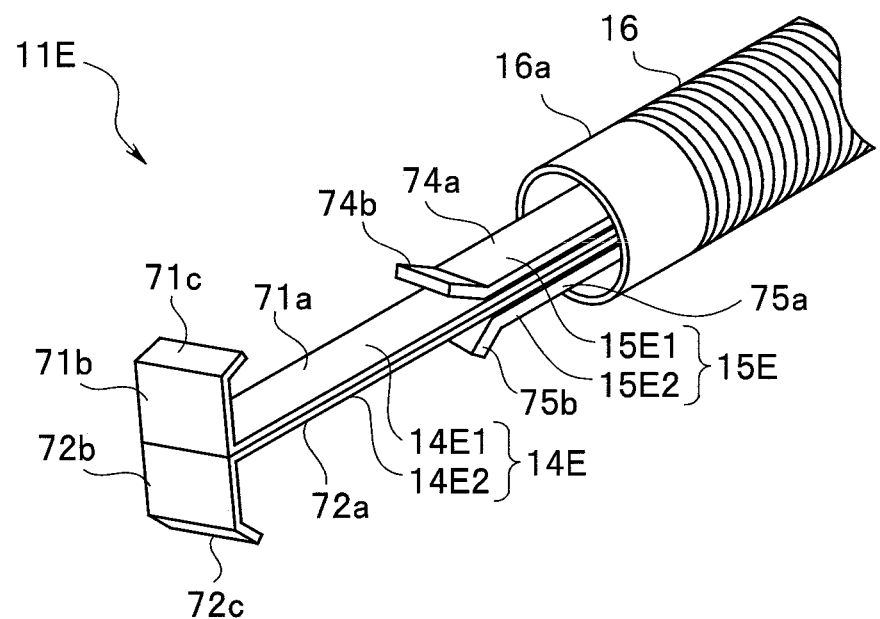
FIG. 40 is a perspective view of a distal end grasping portion of a sixth embodiment.
Figure 41:
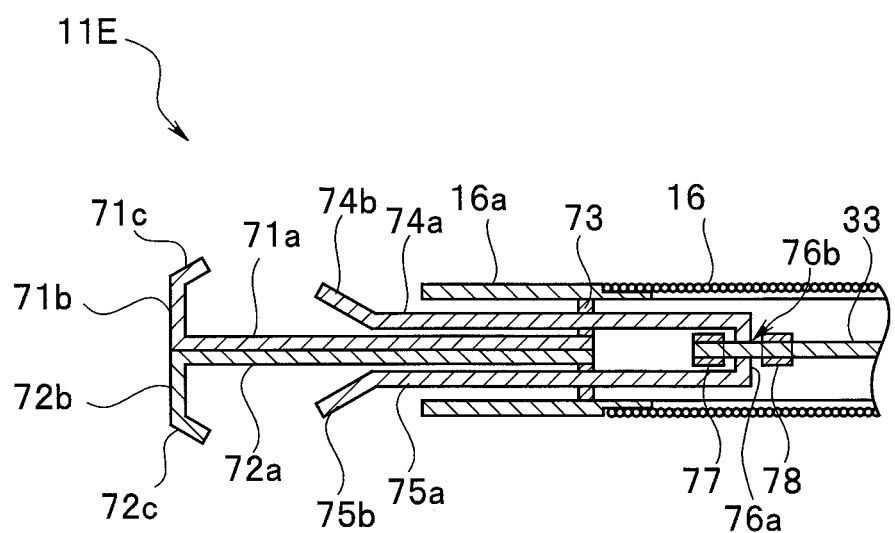
FIG. 41 is a cross-sectional view of the distal end grasping portion related to the sixth embodiment along the longitudinal axis.
Figure 42:
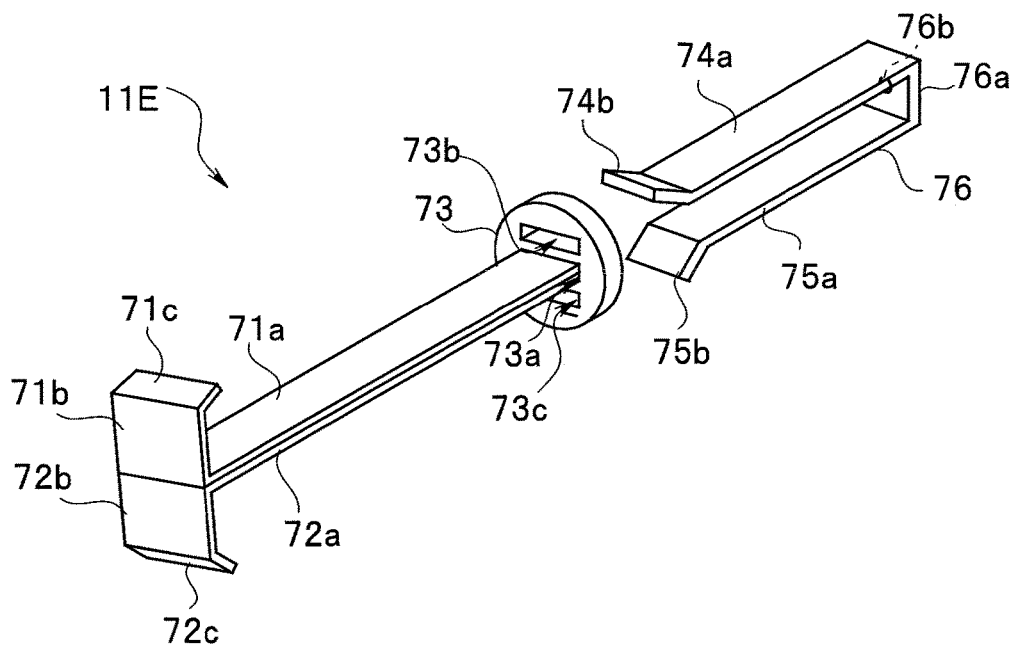
FIG. 42 is an exploded view of the distal end grasping portion of the sixth embodiment.

FIG. 40 is a perspective view of a distal end grasping portion 11E according to the present embodiment. FIG. 41 is a cross-sectional view of the distal end grasping portion 11E along the longitudinal axis. FIG. 42 is an exploded view of the distal end grasping portion 11E.

A distal end fixation member 14E includes two distal end fixation members 14E1 and 14E2. The distal end fixation member 14E1 includes an extension portion 71a along the longitudinal axis, and a first bending portion 71b provided at a distal end portion of the extension portion 71a. The first bending portion 71b includes a second bending portion 71c at a distal end part.

Similarly, the distal end fixation member 14E2 includes an extension portion 72a along the longitudinal axis, and a first bending portion 72b provided at a distal end portion of the extension portion 72a. The first bending portion 72b includes a second bending portion 72c at a distal end part.

The extension portions 71a and 72a are bonded to each other so that the bending portions 71b and 72b extend in directions different from each other. In other words, the bending portion 71b is bent in a direction opposite to a direction in which the bending portion 72b is bent.

Proximal end portions of the distal end fixation members 14E1 and 14E2 are fitted into a hole 73a of a fixation member 73 having a circular plate shape and fixed in a pipe sleeve 16a of the coil sheath 16 on the distal end side, and are fixed to the fixation member 73 by a bonding agent or the like.

A distal end movable member 15E includes two plate fixation members 15E1 and 15E2. The plate fixation member 15E1 includes an extension portion 74a along the longitudinal axis, and a tilt portion 74b provided at a distal end portion of the extension portion 74a.

Similarly, the distal end movable member 15E2 includes an extension portion 75a along the longitudinal axis, and a tilt portion 75b provided at a distal end portion of the extension portion 75a. As described above, the distal end fixation member 14E includes a plurality (in this example, two) of bending portions 71c and 72c, and the distal end movable member 15E includes a plurality (in this example, two) of extension portions 74a and 75a.

As illustrated in FIG. 42, the plate fixation members 15E1 and 15E2 are formed by bending one plate member 76 at a center. The tilt portions 74b and 75b are formed at both end parts of the one plate member 76.

The extension portions 74a and 75a are inserted into holes 73b and 73c, respectively, provided to the fixation member 73. The fixation member 73 has elasticity and thus the holes 73b and 73c deform so that the plate fixation members 15E1 and 15E2 including the tilt portions 74b and 75b can be inserted into the holes 73b and 73c.

A flat portion 76a is formed between the extension portions 74a and 75a. A hole 76b is formed at the flat portion 76a.

The distal end portion of the wire 33 is inserted into the hole 76b. The wire 33 is prevented from being removed from the hole 76b by pipes 77 and 78 fixed to the wire 33.

(Operation)

The distal end movable member 15E moves forward and backward as the examiner moves forward and backward the wire 33 inserted into the coil sheath 16 at the operation portion 12.

The bending portions 71b and 72b of the distal end fixation member 14E are disposed at positions in directions opposite to each other to contact the tilt portions 74b and 75b, respectively, when the distal end movable member 15E moves in the distal end direction.

Note that, in the above-described embodiment, the distal end grasping portion includes two bending portions and two tilt portions, but may include three bending portions or more and three tilt portions or more.

Figure 43:
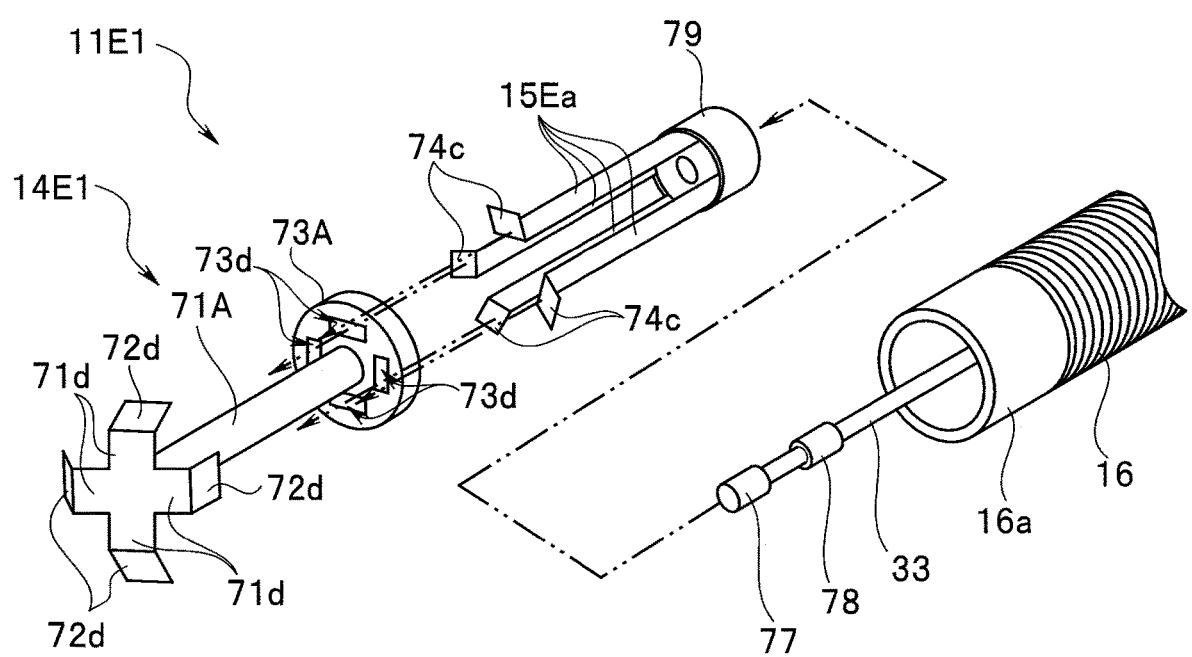
FIG. 43 is an exploded view of the distal end grasping portion including four bending portions and four tilt portions related to the sixth embodiment.

FIG. 43 is an exploded view of a distal end grasping portion 11E1 including four bending portions and four tilt portions.

The distal end fixation member 14E1 includes an extension portion 71A along the longitudinal axis, and four first bending portions 71d at a distal end part of the extension portion 71A. The four first bending portions 71d are disposed at equal intervals in the circumferential direction about the longitudinal axis. A second bending portion 72d is provided at a distal end of each first bending portion 71d.

A proximal end portion of the extension portion 71A is fixed to a fixation member 73A. The fixation member 73A is fixed in the distal end pipe sleeve 16a. The fixation member 73A has four holes 73d. A pipe sleeve 79 is fixed in the distal end pipe sleeve 16a.

Four distal end movable members 15Ea are provided on the distal end side of the pipe sleeve 79 and extend toward the distal end side. Tilt portions 74c are provided at distal ends of the distal end movable members 15Ea. The four tilt portions 74c are disposed at equal intervals in the circumferential direction about a longitudinal axis of the pipe sleeve 79. The distal end movable members 15Ea are inserted into the respective holes 73d.

The distal end portion of the wire 33 is fixed at a center of a proximal end portion of the pipe sleeve 79 by the two pipes 77 and 78. Thus, the four distal end movable members 15Ea move forward and backward in accordance with forward and backward movement of the wire 33.

With a configuration as illustrated in FIG. 43, the foreign object OB or the like can be grasped at four places, and the distal end grasping portion 11E1 can be easily positioned relative to the foreign object OB.

As described above, according to the above-described embodiment, it is possible to provide a treatment instrument with which it is easy to position a grasping portion relative to an object and collect the object.

Seventh Embodiment

In the first to sixth embodiments, a distal end movable member having a plate shape is moved forward and backward by a wire, but in a seventh embodiment, a distal end movable member having a cylindrical shape is provided to a distal end pipe sleeve of a coil sheath, and the distal end movable member moves forward and backward in accordance with forward and backward movement of the coil sheath.

A configuration of the present embodiment includes components substantially the same as components of the above-described configurations of the first to sixth embodiments, and thus any identical component is denoted by the same reference sign and description of the component is omitted, and any different component will be described below in detail.

Figure 44:
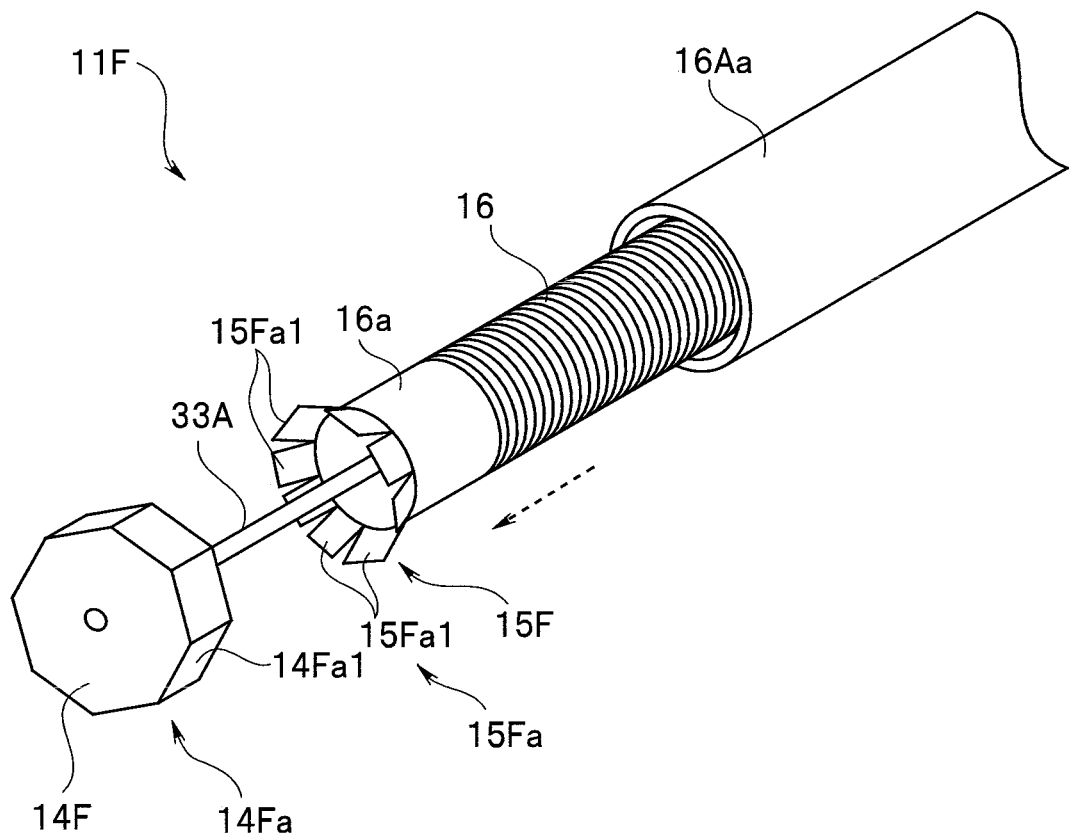
FIG. 44 is a perspective view of a distal end grasping portion of a seventh embodiment.
Figure 45:
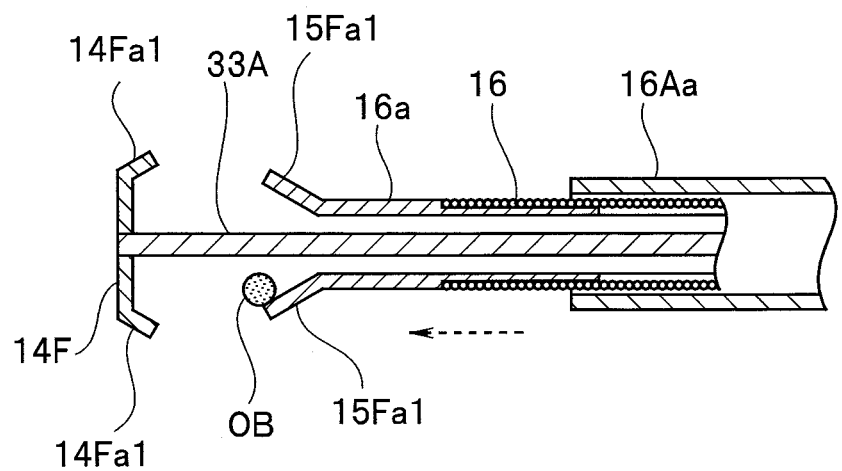
FIG. 45 is a cross-sectional view of the distal end grasping portion related to the seventh embodiment along the longitudinal axis.
Figure 46:
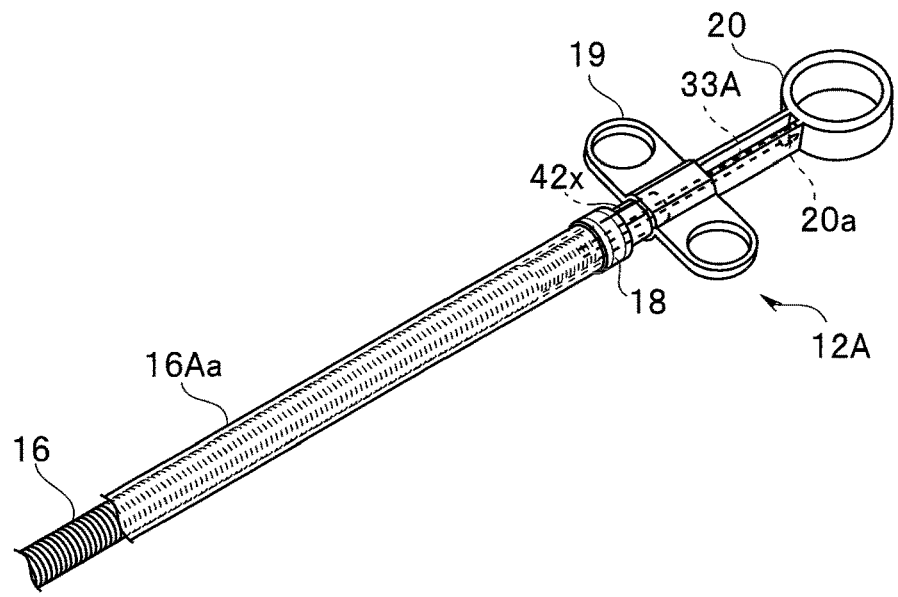
FIG. 46 is a perspective view of an operation portion of the seventh embodiment.

FIG. 44 is a perspective view of a distal end grasping portion 11F. FIG. 45 is a cross-sectional view of the distal end grasping portion 11F along the longitudinal axis. FIG. 46 is a perspective view of the operation portion 12A.

The distal end grasping portion 11F includes a distal end fixation member 14F having a cap shape. The distal end fixation member 14F includes an extension portion 14Fa shaped in a polygon (in this example, an octagon) expanding toward the proximal end side. Each face 14Fa1 of the extension portion 14Fa serves as a bending portion of the distal end fixation member 14F. In other words, the distal end fixation member 14F includes a plurality of bending portions. The plurality of faces 14Fa1 are disposed at equal intervals in the circumferential direction about a longitudinal axis of the distal end grasping portion 11F. The distal end fixation member 14F includes a recessed portion on the proximal end side and has a size with which an increased-diameter portion of a distal end movable member 15F can be housed inside.

A wire 33A is inserted into the coil sheath 16, and the coil sheath 16 is inserted into an outer sheath 16Aa.

The distal end pipe sleeve 16a is fixed to the distal end of the coil sheath 16. The distal end movable member 15F is provided on the distal end side of the distal end pipe sleeve 16a. The distal end movable member 15F includes an increased-diameter portion 15Fa. The increased-diameter portion 15Fa is constituted by a plurality (in this example, eight) of piece portions 15Fa1 so that the diameter radially increases toward the distal end side. Accordingly, each piece portion 15Fa1 serves as a tilt portion. The plurality of piece portions 15Fa1 are disposed at equal intervals in the circumferential direction about the longitudinal axis of the distal end grasping portion 11F.

The increased-diameter portion 15Fa of the distal end movable member 15F has an outer diameter with which the increased-diameter portion 15Fa can be housed inside the extension portion 14Fa of the distal end fixation member 14F.

The distal end fixation member 14F is fixed to a distal end portion of the wire 33A by a bonding agent or the like.

As illustrated in FIG. 46, the wire 33A is inserted into the coil sheath 16, and a proximal end portion of the wire 33A is fixed to the ring shape portion 20 of the operation portion 12A by a fixation member 20a.

The proximal end portion of the coil sheath 16 is narrowed and fixed to one end of a pipe 42X. The other end of the pipe 42X is connected and fixed to the handle 19. Accordingly, the coil sheath 16 moves forward and backward along the longitudinal axis as the handle 19 is moved forward and backward along the longitudinal axis. In this case, the wire 33A does not move forward and backward.

The outer sheath 16Aa is connected and fixed to the operation portion 12A by the knob member 18. The outer sheath 16Aa is made of, for example, PTFE (polytetrafluoroethylene resin).

(Operation)

The examiner positions the foreign object OB between the extension portion 14Fa of the distal end fixation member 14F and the increased-diameter portion 15Fa of the distal end movable member 15F.

Subsequently, as the examiner pushes the handle 19 toward the distal end side, the coil sheath 16 moves toward the distal end side. As a result, the foreign object OB is sandwiched between the increased-diameter portion 15Fa and the distal end fixation member 14F. Since the increased-diameter portion 15Fa enters the recessed portion of the distal end fixation member 14F, the foreign object OB enters the recessed portion, and enters and is fixed in a gap inside the increased-diameter portion 15Fa.

Since the outer sheath 16Aa contacts an internal surface in the subject and thus the coil sheath 16 does not contact the internal surface when pushed, the examiner can smoothly push the coil sheath 16 in the distal end direction.

Note that the distal end fixation member may include a plurality of pieces radially expanding so that the distal end movable member has a flaring shape.

Figure 47:
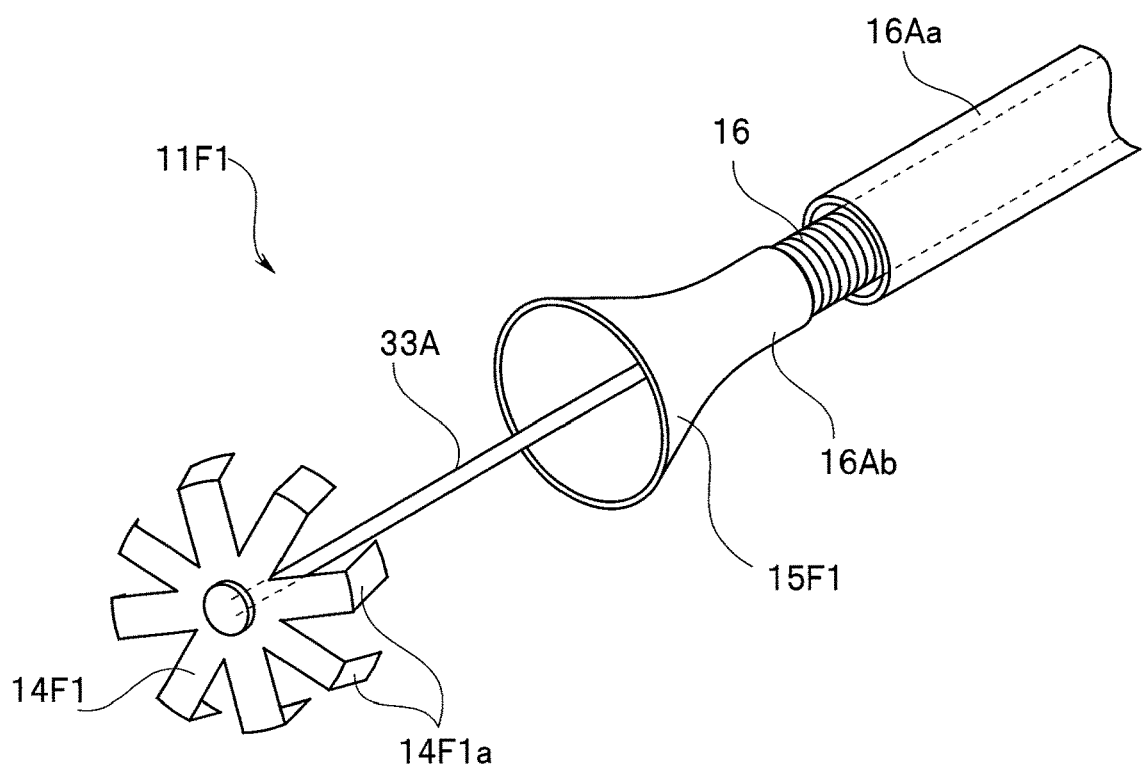
FIG. 47 is a perspective view of a distal end grasping portion related to a modification of the seventh embodiment.

FIG. 47 is a perspective view of a distal end grasping portion 11F1 related to a modification. As illustrated in FIG. 47, a distal end fixation member 14F1 includes a plurality of radially expanding pieces 14F1a. The plurality of pieces 14F1a are disposed at equal intervals in the circumferential direction about a longitudinal axis of the distal end grasping portion 11F1. A distal end movable member 15F1 includes a pipe sleeve 16Aa at a proximal end part and flares at a distal end part. In other words, a tilt portion of the distal end movable member 15F1 is configured as an increased-diameter portion expanding relative to the longitudinal axis on the distal end side.

The present modification provides the same effects as the effects of the above-described embodiments.

As described above, according to the above-described embodiment, it is possible to provide a treatment instrument with which it is easy to position a grasping portion relative to an object and collect the object.

In particular, in the present embodiment and modification, since the grasping portion is radial, it is possible to freely and easily grasp the foreign object OB irrespective of the orientation of the distal end grasping portion, and the foreign object OB thus grasped is unlikely to fall off.

Eighth Embodiment

In the first to seventh embodiments, a foreign object is only sandwiched, but in the present embodiment, a foreign object is sandwiched and housed in an enclosed space.

A configuration of the present embodiment includes components substantially the same as components of the above-described configurations of the first to seventh embodiments, and thus any identical component is denoted by the same reference sign and description of the component is omitted, and any different component will be described below in detail.

Figure 48:
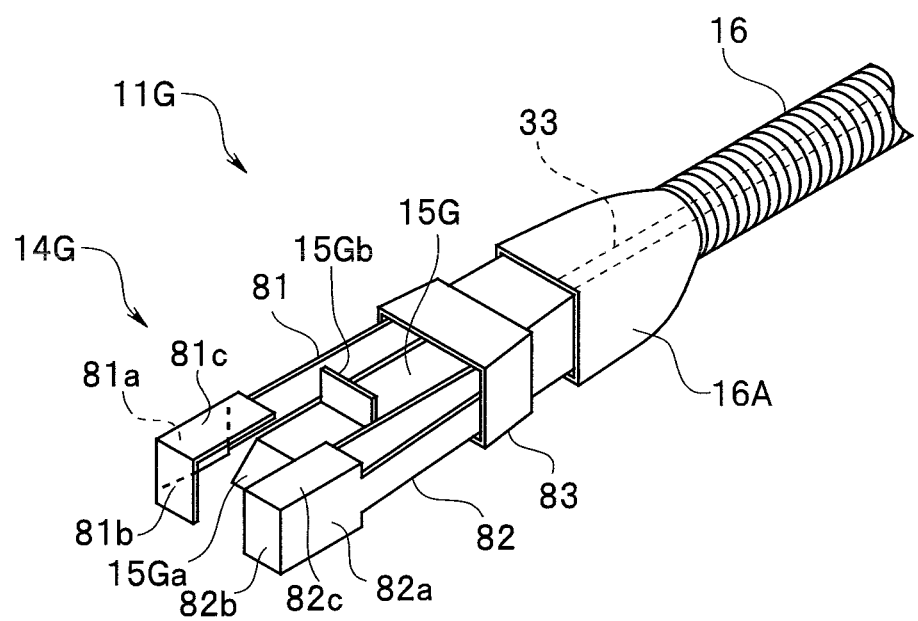
FIG. 48 is a perspective view of a distal end grasping portion of an eighth embodiment.
Figure 49:
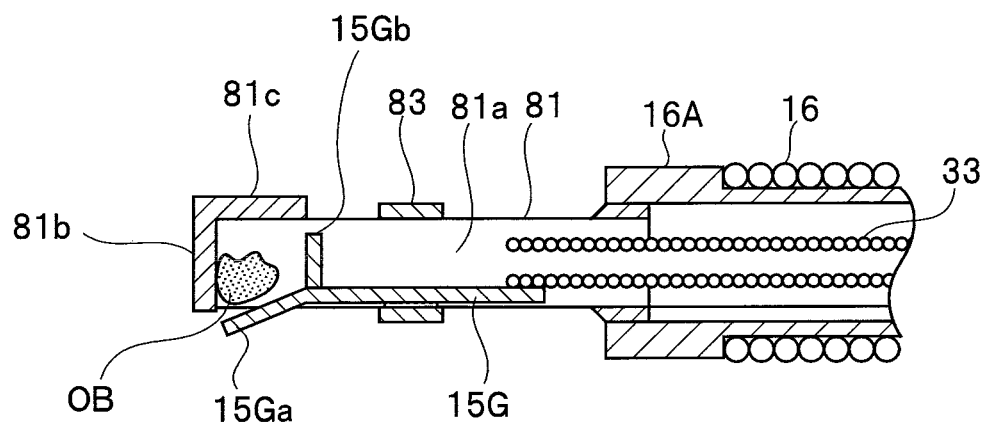
FIG. 49 is a cross-sectional view of the distal end grasping portion related to the eighth embodiment along the longitudinal axis.

FIG. 48 is a perspective view of a distal end grasping portion 1 IG. FIG. 49 is a cross-sectional view of the distal end grasping portion 11G along the longitudinal axis.

The distal end grasping portion 11G includes two plate members 81 and 82. The two plate members 81 and 82 serve as an arm portion for grasping a foreign object. The two plate members 81 and 82 serve as a distal end fixation member 14G. The plate member 81 includes, at a distal end portion, a side surface wall portion 81a, a front surface wall portion 81b, and an upper surface wall portion 81c. The side surface wall portion 81a is substantially parallel to a longitudinal axis of the plate member 81 and has a width larger than a width of a plate portion of the plate member 81. The front surface wall portion 81b is a plane portion substantially orthogonal to the longitudinal axis of the plate member 81. The upper surface wall portion 81c is a plane portion substantially parallel to the longitudinal axis of the plate member 81 and orthogonal to the front surface wall portion 81b.

Similarly, the plate member 82 includes, at a distal end portion, a side surface wall portion 82a, a front surface wall portion 82b, and an upper surface wall portion 82c. The side surface wall portion 82a is substantially parallel to a longitudinal axis of the plate member 82 and has a width larger than a width of a plate portion of the plate member 82. The front surface wall portion 82b is a plane portion substantially orthogonal to the longitudinal axis of the plate member 82. The upper surface wall portion 82c is a plane portion substantially parallel to the longitudinal axis of the plate member 82 and orthogonal to the front surface wall portion 82b.

As described later, the front surface wall portions 81b and 82b are bent at the plate members 81 and 82, respectively, so that two end faces of the front surface wall portions 81b and 82b closely contact each other when the two plate members 81 and 82 move closer to each other. Similarly, the upper surface wall portions 81c and 82c are bent at the plate members 81 and 82, respectively, so that two end faces of the upper surface wall portions 81c and 82c closely contact each other when the two plate members 81 and 82 move closer to each other. The front surface wall portions 81b and 82b and the upper surface wall portions 81c and 82c cover a gap between the two plate members 81 and 82. In other words, the front surface wall portions 81b and 82b and the upper surface wall portions 81c and 82c cover upper and front surfaces of the plate members 81 and 82 when the two plate members 81 and 82 are closed.

The coil sheath 16 includes a distal end pipe sleeve 16A at a distal end, and the wire 33 is inserted into the distal end pipe sleeve 16A. A distal end movable member 15G is connected and fixed to the distal end of the wire 33. Note that a rod member may be used in place of the wire 33.

Proximal end parts of the two plate members 81 and 82 are fixed to the distal end pipe sleeve 16A so that distal end parts of the two plate members 81 and 82 are further separated. The distal end movable member 15G is disposed at a position between the two plate members 81 and 82.

A ring member 83 is provided to surround middle portions of the two plate members 81 and 82. Part of an inner peripheral surface of the ring member 83 is fixed to the distal end movable member 15G by a bonding agent or the like. The ring member 83 is positioned outside the plate portions of the two plate members 81 and 82 on the proximal end side so that the interval (spread) between the two plate members 81 and 82 changes as the position of the ring member 83 along the longitudinal axis changes. In other words, the distal end grasping portion 11G includes the ring member 83 that is fixed to the distal end movable member 15G and into which the two plate members 81 and 82 (two arm portions) are inserted. The ring member 83 is provided so that the two plate members 81 and 82 are closed as the distal end movable member 15G moves in the distal end direction.

The distal end movable member 15G includes a tilt portion 15Ga at a distal end. In addition, a wall portion 15Gb protruding in a direction orthogonal to a longitudinal axis of the distal end movable member 15G is provided at a proximal end portion of the tilt portion 15Ga.

As the wire 33 is pushed in the distal end direction, the distal end movable member 15G moves in the distal end direction and the two plate members 81 and 82 move closer to each other.

(Operation)

As the examiner pushes the handle 19 of the operation portion 12, the distal end movable member 15G moves in the distal end direction and the ring member 83 moves in the distal end direction. The tilt portion 15Ga can scoop the foreign object OB on the floor surface F as the distal end movable member 15G moves in the distal end direction.

As the handle 19 of the operation portion 12 is further pushed, an interval between the two plate members 81 and 82 decreases, a gap between the front surface wall portions 81b and 82b decreases, and the plate members 81 and 82 contact each other to close. The foreign object OB scooped by the wall portion 15Gb of the distal end movable member 15G is pushed in the distal end direction and housed in a space formed by the side surface wall portion 81a, the front surface wall portion 81b, and the upper surface wall portion 81c of the plate member 81 and the side surface wall portion 82a, the front surface wall portion 82b, and the upper surface wall portion 82c of the plate member 82. The tilt portion 15Ga is a bottom surface portion of the space, and the wall portion 15Gb is a back surface portion of the space.

Note that the foreign object OB such as a small metal piece can be sandwiched and collected since the interval between the two plate members 81 and 82 decreases, the gap between the front surface wall portions 81b and 82b decreases, and the plate members 81 and 82 contact each other to close as the handle 19 of the operation portion 12 is pushed.

Figure 50:
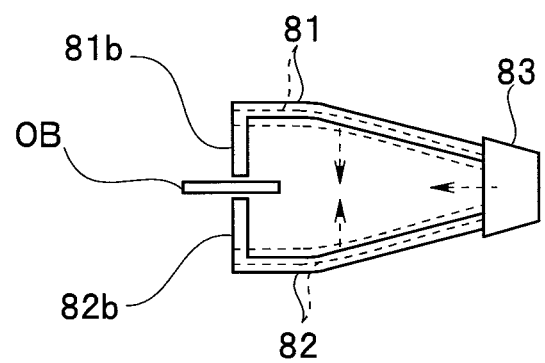
FIG. 50 is a schematic diagram for description of a state in which a foreign object such as a small metal piece can be grasped in a gap through a front surface wall portion related to the eighth embodiment.

FIG. 50 is a schematic diagram for description of a state in which the foreign object OB such as a small metal piece can be grasped in the gap between the front surface wall portions 81b and 82b. Dotted lines illustrate moving directions of the two plate members 81 and 82 and the ring member 83 upon pushing of the wire 33.

The foreign object OB such as a small metal piece can be grasped by the front surface wall portions 81b and 82b or by the upper surface wall portions 81c and 82c.

Thus, it is possible to selectively use, for example, a collection method of inserting the endoscope 2 and the treatment instrument 7 into an elongated pipe and scooping and collecting the foreign object OB on the floor surface F like a shovel, and a collection method of accessing from above and grasping the foreign object OB having fallen in a narrow place.

As described above, according to the above-described embodiment, it is possible to provide a treatment instrument with which it is easy to position a grasping portion relative to an object and collect the object.

Figure 51:
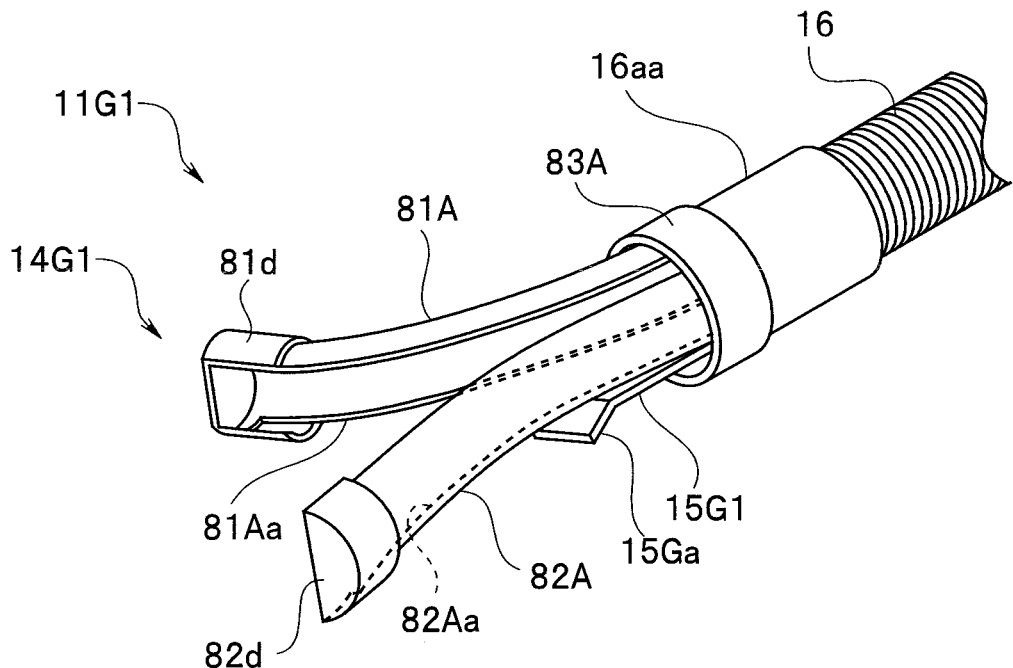
FIG. 51 is a perspective view of a distal end grasping portion related to a modification of the eighth embodiment.
Figure 52:
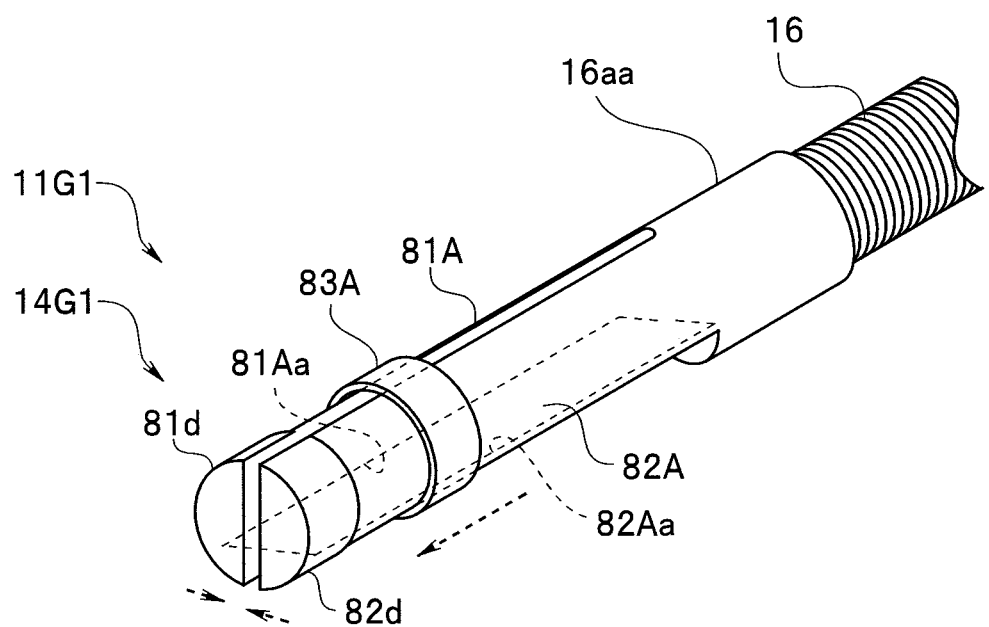
FIG. 52 is a perspective view of the distal end grasping portion related to the modification of the eighth embodiment.

Note that a member partially having a cylindrical shape may be used in place of the two plate members on the distal end side of the distal end fixation member 14G. FIGS. 51 and 52 are perspective views of a distal end grasping portion 11G according to a modification. The distal end grasping portion 11G1 includes a distal end pipe sleeve 16aa. The distal end pipe sleeve 16aa includes partially cylinder-shaped portions 81A and 82A on the distal end side. The partially cylinder-shaped portions 81A and 82A are formed by providing two slits on the distal end side of a pipe-shaped member. In other words, the partially cylinder-shaped portions 81A and 82A are formed by providing two slit-shaped cutouts to a pipe. The upper cutout is formed by the upper slit of the partially cylinder-shaped portions 81A and 82A, and the lower cutout is formed by the lower slit of the partially cylinder-shaped portions 81A and 82A. A distal end movable member 15G1 is disposed in the lower cutout and movable along the longitudinal axis.

The two partially cylinder-shaped portions 81A and 82A are disposed so that inner surfaces of the two partially cylinder-shaped portions 81A and 82A face each other. Proximal end parts of the two partially cylinder-shaped portions 81A and 82A connect a cylindrical part of the distal end pipe sleeve 16aa.

The two partially cylinder-shaped portions 81A and 82A have flexibility. Permanent bends are provided to the two partially cylinder-shaped portions 81A and 82A so that the two partially cylinder-shaped portions 81A and 81B expand on the distal end side as illustrated in FIG. 51 when the distal end movable member 15G1 is not on the distal end side.

Two distal end fixation members 81d and 82d are connected and fixed to distal end parts of the two partially cylinder-shaped portions 81A and 82A. The two distal end fixation members 81d and 82d have partially cylindrical shapes formed when one bottomed cylindrical member is divided into half. The partially cylinder-shaped portions 81A and 81B and the distal end fixation members 81d and 82d serve as a distal end fixation member 14G1.

The two partially cylinder-shaped portions 81A and 82A have cutouts 81Aa and 82Aa for allowing the distal end movable member 15G1 to move forward and backward. The lower cutout is formed by the cutouts 81Aa and 82Aa.

A ring member 83A is provided outside the two partially cylinder-shaped portions 81A and 82A. The two partially cylinder-shaped portions 81A and 81B are inserted into the ring member 83A. The ring member 83A is fixed to the distal end movable member 15G1 by a bonding agent or the like. The ring member 83A moves forward and backward along the longitudinal axis along with forward and backward movement of the distal end movable member 15G1.

As the ring member 83A moves toward the distal end side, the two partially cylinder-shaped portions 81A and 82A deform and become closer to each other.

Figure 53:
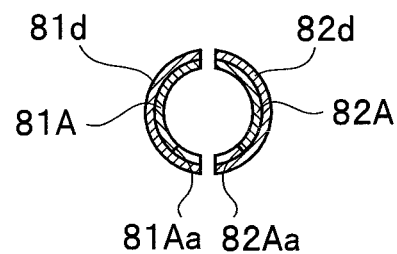
FIG. 53 is a cross-sectional view of a distal end fixation member of the distal end grasping portion related to the modification of the eighth embodiment.

FIG. 52 is a perspective view of the distal end grasping portion 11G1 when the ring member 83A moves toward the distal end side and the two partially cylinder-shaped portions 81A and 82A become closer to each other. FIG. 53 is a cross-sectional view of the distal end fixation members 81d and 82d of the distal end grasping portion 11G1.

Figure 54:
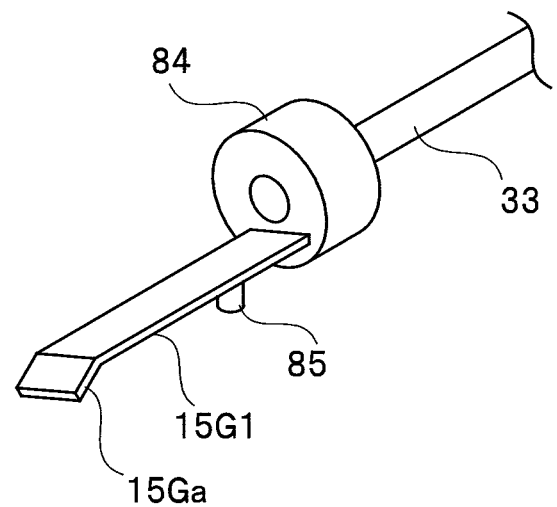
FIG. 54 is a perspective view of a distal end movable member of the modification of the eighth embodiment.
Figure 55:
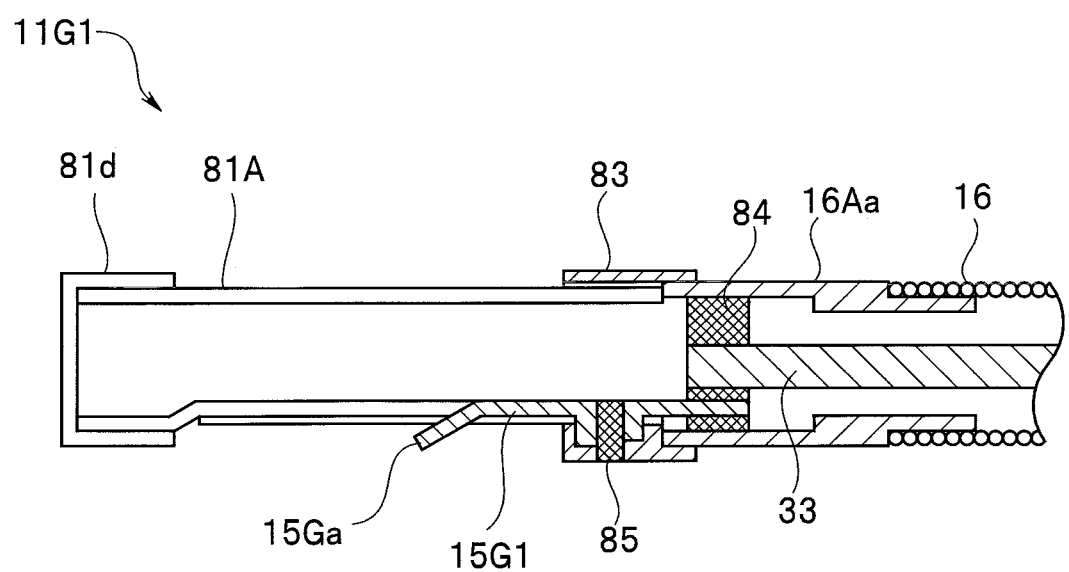
FIG. 55 is a cross-sectional view of the distal end grasping portion related to the modification of the eighth embodiment along the longitudinal axis.

FIG. 54 is a perspective view of the distal end movable member 15G1. FIG. 55 is a cross-sectional view of the distal end grasping portion 11G1 along the longitudinal axis.

The distal end movable member 15G1 includes the tilt portion 15Ga at a distal end. A proximal end portion of the distal end movable member 15G1 is connected and fixed to a connection portion 84. The distal end portion of the wire 33 is connected and fixed on the proximal end side of the connection portion 84.

A pin 85 for connection with the ring member 83 is fixed to a lower surface of the distal end movable member 15G1.

With such a configuration, the foreign object OB is housed inside the two distal end fixation members 81d and 82d when the wire 33 is pushed in the distal end direction.

When the two distal end fixation members 81d and 82d closely contact and thus have no gap between the two distal end fixation members 81d and 82d, it is unlikely to drop the foreign object OB while pulling the distal end grasping portion 11G out of the subject, thereby more reliably collecting the foreign object OB.

The present modification provides the same effects as the effects of the above-described embodiments.

Ninth Embodiment

In the first to eighth embodiments, a distal end fixation member is fixed along the longitudinal axis or movable forward and backward along the longitudinal axis, but in the present embodiment, a distal end fixation member is pivotally supported to a predetermined axis and rotatable about the predetermined axis.

A configuration of the present embodiment includes components substantially the same as components of the above-described configurations of the first to eighth embodiments, and thus any identical component is denoted by the same reference sign and description of the component is omitted, and any different component will be described below in detail.

Figure 56:
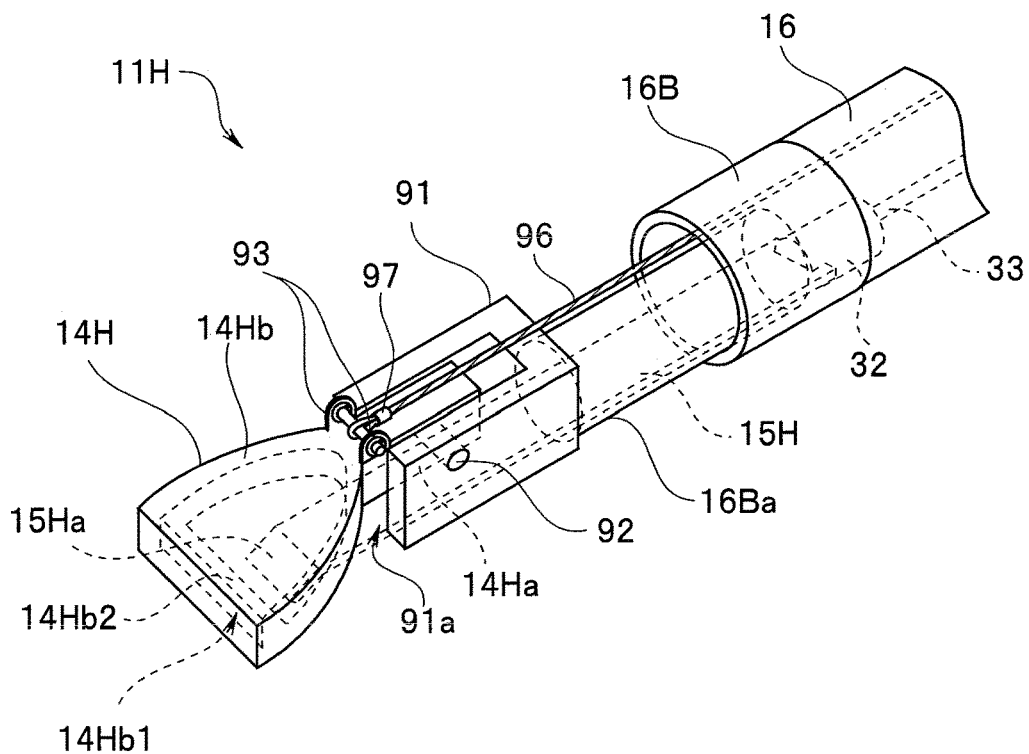
FIG. 56 is a perspective view of a distal end grasping portion of a ninth embodiment.

FIG. 56 is a perspective view of a distal end grasping portion 11H. An intermediate fixation member 91 is disposed on the distal end side of a distal end pipe sleeve 16B. The intermediate fixation member 91 is fixed to the distal end pipe sleeve 16B through a tubal member 16Ba.

A distal end movable member 15H is inserted into the tubal member 16Ba. The distal end movable member 15H includes a tilt portion 15Ha at a distal end portion. A proximal end portion of the distal end movable member 15H is connected to the distal end of the wire 33 through the coupling member 32. The distal end movable member 15H is disposed below the intermediate fixation member 91 and movable forward and backward along a longitudinal axis of the distal end grasping portion 11H.

The intermediate fixation member 91 includes a groove 91a formed in an up-down direction on the distal end side. A proximal end part 14Ha of a distal end fixation member 14H is disposed in the groove 91a, and the distal end fixation member 14H is pivotally supported to and rotatable about a support shaft 92. The support shaft 92 is disposed in a direction (right-left direction) orthogonal to the longitudinal axis of the distal end grasping portion 11H and orthogonal to the groove formation direction of the groove 91a.

A distal end part 14Hb of the distal end fixation member 14H has a lid shape including a recessed portion 14Hb1 on a lower side. A protrusion portion 14Hb2 toward the proximal end side is formed at a lower part of the recessed portion 14Hb1 on the distal end side.

Figure 57:
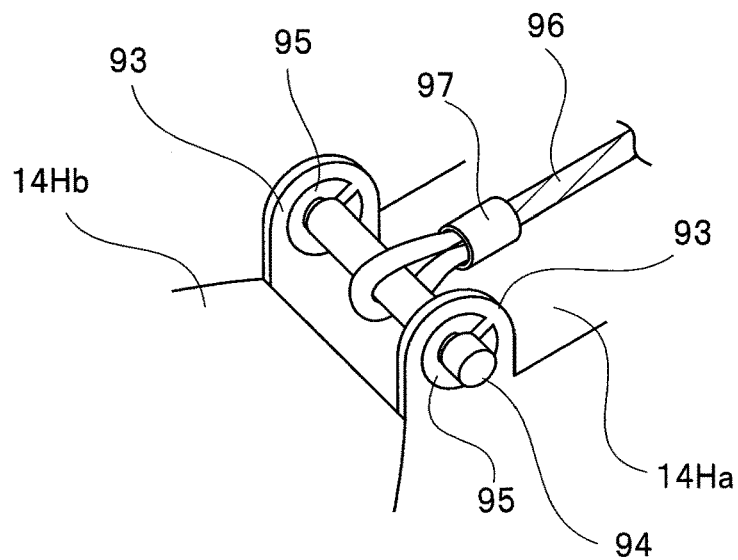
FIG. 57 is an enlarged perspective view of a proximal end side upper part of a distal end part of a distal end fixation member of the ninth embodiment.

FIG. 57 is an enlarged perspective view of an upper part of the distal end part 14Hb of the distal end fixation member 14H on the proximal end side. Two bearing portions 93 are provided at the upper part of the distal end part 14Hb on the proximal end side. A shaft 94 is fixed to the two bearing portions 93. E rings 95 are provided on both sides of each bearing portion 93 to prevent removal of the shaft 94. The shaft 94 is disposed in the direction orthogonal to the longitudinal axis of the distal end grasping portion 11H and orthogonal to the groove formation direction of the groove 91a.

A distal end part of a pulling wire 96 is fixed to the shaft 94. As illustrated in FIG. 57, the pulling wire 96 is wound around the shaft 94 and fixed by a swager member 97.

Figure 58:
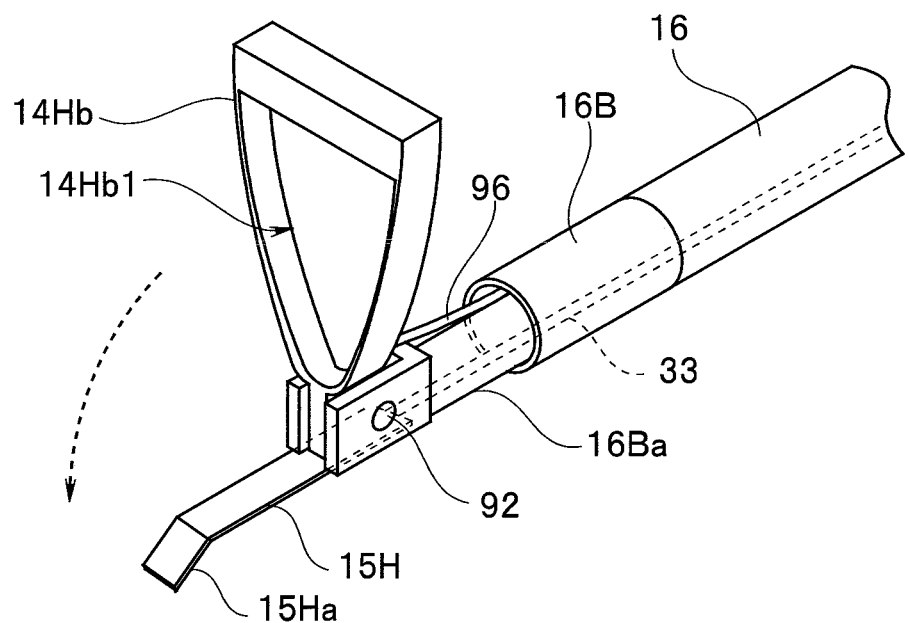
FIG. 58 is a perspective view of a distal end grasping portion of the ninth embodiment.

FIG. 58 is a perspective view of the distal end grasping portion 11H. FIG. 58 illustrates a state in which the distal end fixation member 14H rotates about the shaft 94 and the distal end side moves upward. As the pulling wire 96 is pulled toward the proximal end side, the distal end fixation member 14H rotates about the shaft 94 as a rotation center so that the distal end side moves upward.

(Operation)

The distal end fixation member 14H rotates upward as illustrated in FIG. 58 when the examiner pulls the pulling wire 96 to the hand side, and becomes the state illustrated in FIG. 56 when the examiner pushes the pulling wire 96.

Figure 59:
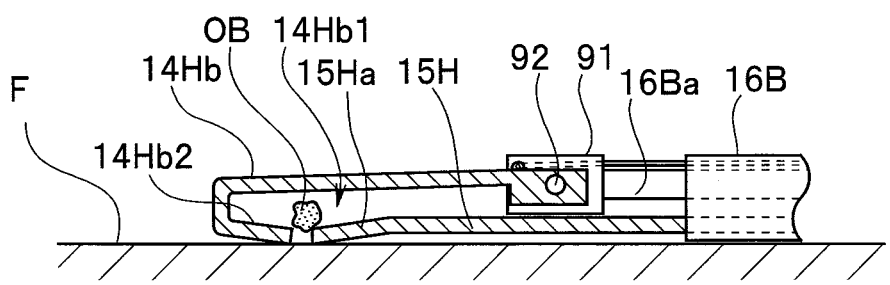
FIG. 59 is a cross-sectional view of the distal end grasping portion related to the ninth embodiment along the longitudinal axis.

In the state illustrated in FIG. 58, the examiner positions the distal end fixation member 14H over the foreign object OB. In this state, when the pulling wire 96 is pushed, the distal end fixation member 14H rotates downward as illustrated in FIG. 56 and positions the foreign object OB in the recessed portion 14Hb1. FIG. 59 is a cross-sectional view of the distal end grasping portion 11H along the longitudinal axis.

Thereafter, when the distal end movable member 15H is pushed, the tilt portion 15Ha scoops the foreign object OB and mounts the foreign object OB on the protrusion portion 14Hb2 of the recessed portion 14Hb1. As a result, the foreign object OB is housed in a space in the recessed portion 14Hb1, and thus the examiner can reliably collect the foreign object OB.

As described above, according to the above-described embodiment, it is possible to provide a treatment instrument with which it is easy to position a grasping portion relative to an object and collect the object.

In particular, with the treatment instrument 7 of the present embodiment, the foreign object OB can be easily grasped and is housed and prevented from falling after the grasping, and thus can be reliably collected.

Tenth Embodiment

In the first to ninth embodiments, a distal end movable member is pushed relative to a distal end fixation member and the foreign object OB is sandwiched by force of the pushing, but in the present embodiment, the foreign object OB is sandwiched by force of a magnet.

A configuration of the present embodiment includes components substantially the same as components of the above-described configurations of the first to ninth embodiments, and thus any identical component is denoted by the same reference sign and description of the component is omitted, and any different component will be described below in detail.

Figure 60:
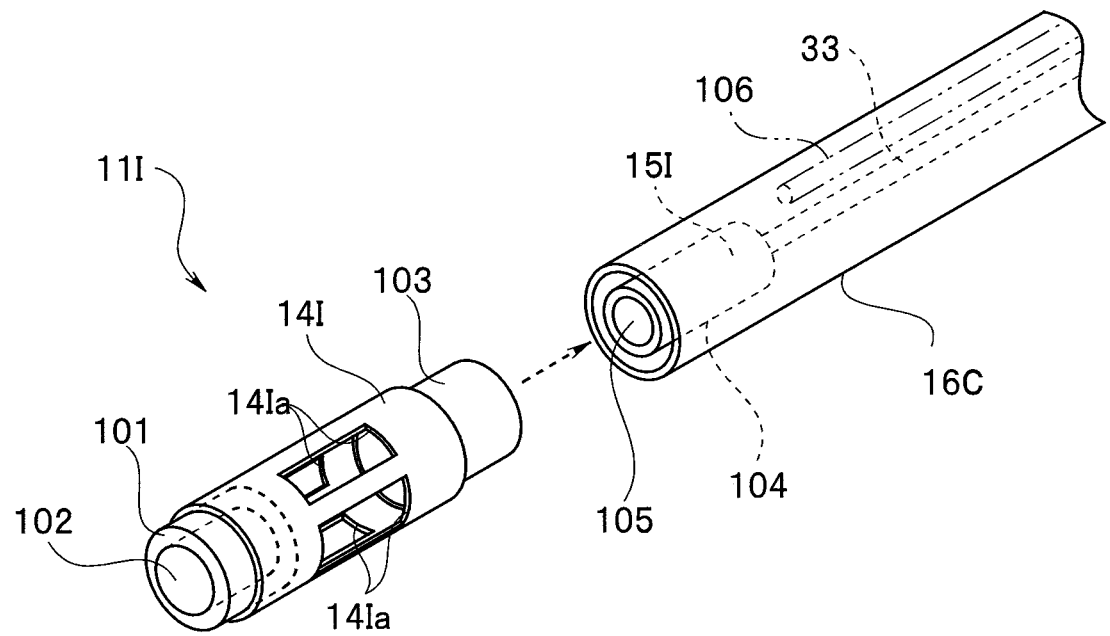
FIG. 60 is an exploded view of a distal end grasping portion related to a tenth embodiment.
Figure 61:
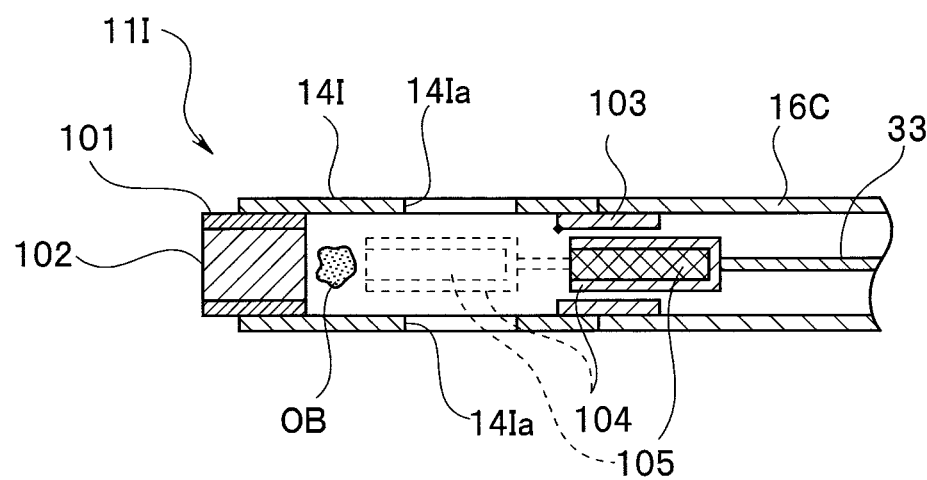
FIG. 61 is a cross-sectional view of the distal end grasping portion related to the tenth embodiment along the longitudinal axis.

FIG. 60 is an exploded view of a distal end grasping portion 11I. FIG. 61 is a cross-sectional view of the distal end grasping portion 11I along the longitudinal axis.

The distal end grasping portion 11I includes a distal end fixation member 14I having a cylindrical shape. The distal end fixation member 14I has a plurality of opening portions 14Ia formed at equal intervals in the circumferential direction. The opening portions 14Ia are long holes along a longitudinal axis of the distal end fixation member 14I. In other words, the distal end fixation member 14I includes a tubular portion provided with a plurality of opening portions.

A pipe 101 is internally fitted to the distal end fixation member 14I on the distal end side and fixed by a bonding agent or the like. A magnet 102 having a cylindrical shape is fixed inside the pipe 101 by a bonding agent or the like. In other words, the distal end fixation member 14I includes the magnet 102 on the distal end side of the tubular portion.

A pipe 103 is internally fitted to the distal end fixation member 14I on the proximal end side and fixed by a bonding agent or the like.

A distal end part of an outer sheath 16C is externally fitted to the pipe 103 and fixed by a bonding agent or the like. Note that the coil sheath 16 may be provided in place of the outer sheath 16C. The wire 33 is inserted into the outer sheath 16C. The distal end of the wire 33 is fixed to a bottom portion of a bottomed pipe 104 by a bonding agent or the like. The pipe 104 serves as a distal end movable member 15I. A magnet 105 having a cylindrical shape is fixed inside the pipe 104 by a bonding agent or the like.

As the wire 33 is pushed in the distal end direction, the magnet 105 moves in the distal end direction together with the pipe 104. In other words, the magnet 105 moves forward and backward in accordance with forward and backward movement of the wire 33. Thus, the distal end movable member 15I can be inserted into the tubular portion of the distal end fixation member 14I.

Note that the magnets 102 and 105 are disposed to be attracted to each other by magnetic force.

(Operation)

Since the distal end fixation member 14I has a tubular shape and has the plurality of opening portions 14Ia at an outer peripheral portion, the examiner positions the distal end fixation member 14I in the subject so that the foreign object OB is positioned in one of the plurality of opening portions 14Ia.

As the examiner pushes the wire 33 after positioning the foreign object OB in the distal end fixation member 14I through the one opening portion 14Ia, the two magnets 102 and 105 are attracted to each other by magnetic force. As a result, the foreign object OB is sandwiched between the two magnets 102 and 105 attracted to each other.

Thus, with the treatment instrument 7 of the present embodiment, the foreign object OB is firmly grasped by using magnetic force. In particular, the foreign object OB is less likely to be dropped when collected since the foreign object OB is sandwiched between the magnets when the foreign object OB is small, and the foreign object OB is attracted to the magnets 102 and 105 by magnetic force when the foreign object OB is metal.

Note that, in the above-described embodiments, the plurality of opening portions 14Ia are provided to the distal end fixation member 14I, but only one opening portion may be provided.

Note that the foreign object OB can be sucked and pulled into the distal end fixation member 14I when a tube 106 for suction is disposed in the outer sheath 16C as illustrated with dashed and double-dotted lines in FIG. 60 to provide negative pressure in the distal end fixation member 14I. In other words, the distal end grasping portion 11I may include the tube 106 as a suction pipe line communicating with inside of the tubular portion of the distal end fixation member 14I.

As described above, according to the above-described embodiment, it is possible to provide a treatment instrument with which it is easy to position a grasping portion relative to an object and collect the object.

Figure 62:
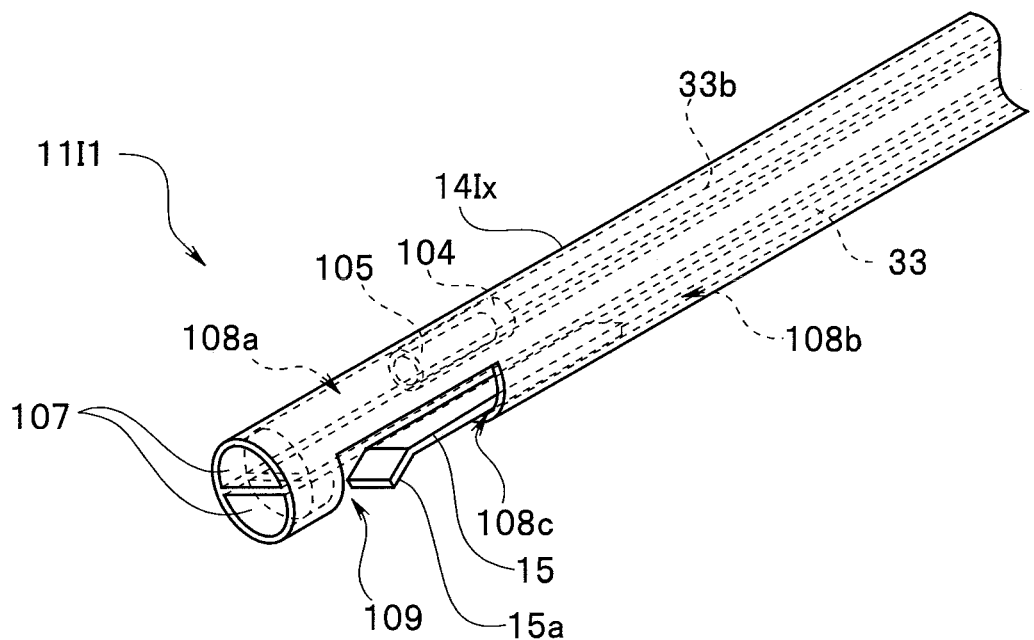
FIG. 62 is a perspective view of a distal end grasping portion related to a modification of the tenth embodiment.
Figure 63:
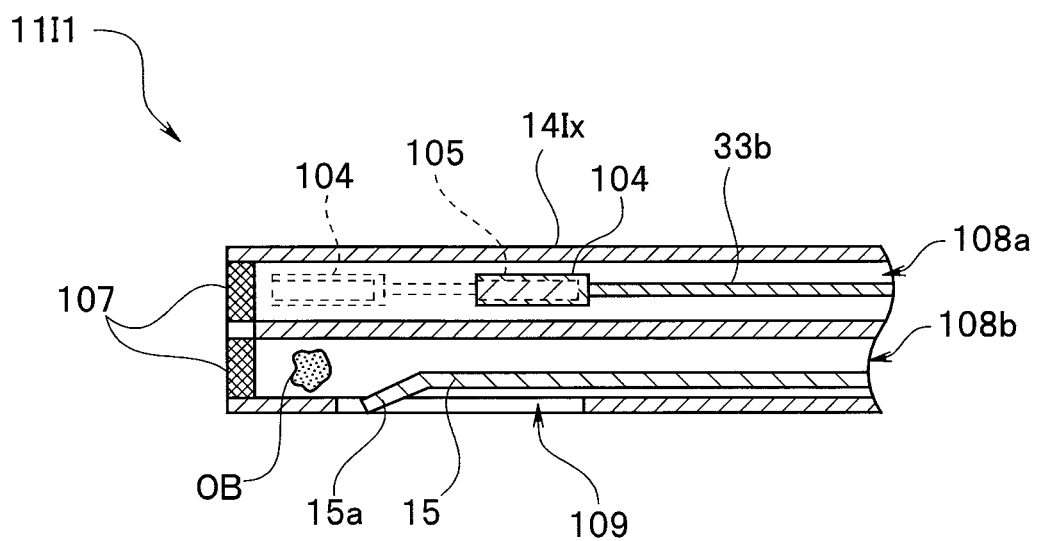
FIG. 63 is a cross-sectional view of the distal end grasping portion related to the modification of the tenth embodiment along the longitudinal axis.

A multiple-lumen tube may be used in place of a pipe of a tubular shape. FIG. 62 is a perspective view of a distal end grasping portion 11I1 related to a modification of the present embodiment. FIG. 63 is a cross-sectional view of the distal end grasping portion 11I1 related to the modification of the present embodiment along the longitudinal axis.

The distal end grasping portion 11I1 includes a distal end fixation member 14Ix. The distal end fixation member 14Ix is a multiple-lumen tube including two pipe portions. A distal end of each pipe portion is sealed by a sealing member 107.

The distal end fixation member 14Ix includes two pipe lines 108a and 108b. The pipe 104 fixed to a distal end of a wire 33b is inserted into the pipe line 108a. A proximal end part of the wire 33b is disposed near the operation portion 12 and can be moved forward and backward by the examiner. The magnet 105 is provided in the pipe 104. In other words, the magnet 105 is disposed in the pipe line 108a and movable forward and backward along a longitudinal axis of the pipe line 108a.

A cutout 109 is formed at part of the distal end fixation member 14Ix. A pipe line 108b has, at a distal end, an opening portion 108c that is opened at the cutout 109.

The distal end movable member 15 and the wire 33 are inserted into the pipe line 108b. The distal end movable member 15 at the distal end of the wire 33 is disposed so that the distal end movable member 15 can protrude and retract through the opening portion 108c.

The examiner positions the distal end fixation member 14Ix in the subject so that the foreign object OB is positioned in the cutout 109.

As the examiner pushes the wire 33 after positioning the foreign object OB in the cutout 109, the foreign object OB is scooped by the tilt portion 15a. When the foreign object OB is metal, the foreign object OB thus scooped can be more easily housed in the cutout 109 by magnetic force as the wire 33b is pushed.

Thus, the present modification provides the same effects as the effects of the above-described embodiments.

Eleventh Embodiment

In the first to tenth embodiments, a distal end movable member is pushed relative to a distal end fixation member and the foreign object OB is sandwiched by force of the pushing, but in the present embodiment, the foreign object OB is sandwiched when a distal end movable member is pulled and then pushed.

A configuration of the present embodiment includes components substantially the same as components of the above-described configurations of the first to tenth embodiments, and thus any identical component is denoted by the same reference sign and description of the component is omitted, and any different component will be described below in detail.

Figure 64:
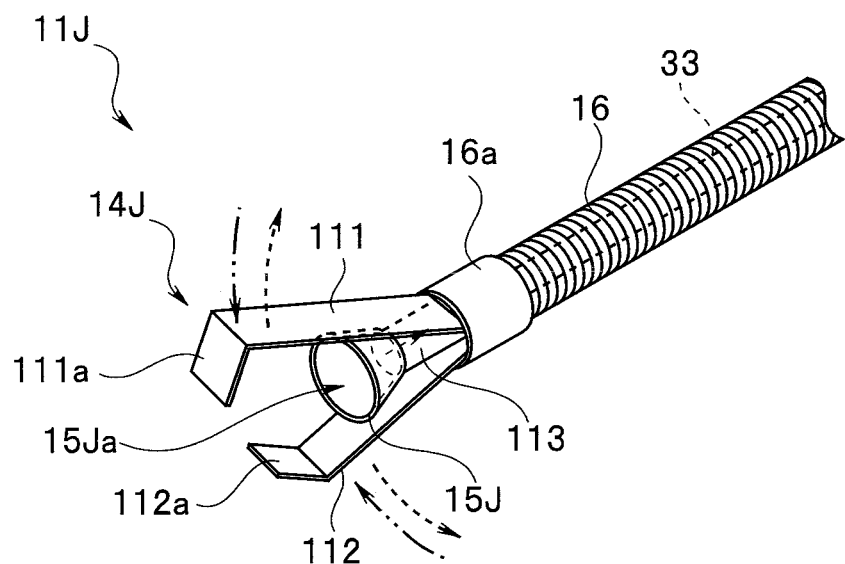
FIG. 64 is a perspective view of a distal end grasping portion of an eleventh embodiment.
Figure 65:
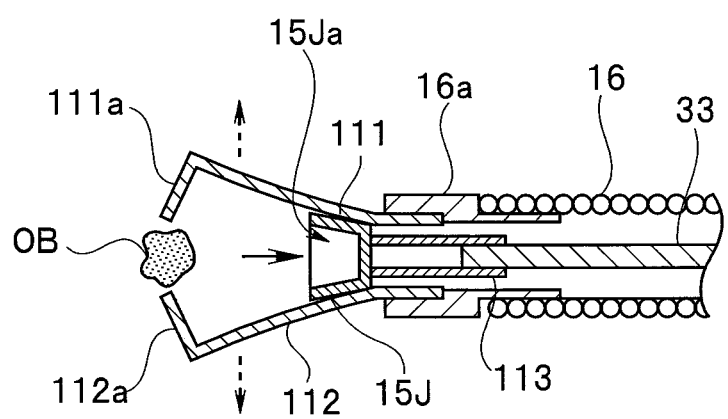
FIG. 65 is a cross-sectional view of the distal end grasping portion related to the eleventh embodiment along the longitudinal axis.

FIG. 64 is a perspective view of a distal end grasping portion 11J. FIG. 65 is a cross-sectional view of the distal end grasping portion 11J along the longitudinal axis. A distal end fixation member 14J is fixed to a distal end portion of the distal end pipe sleeve 16a. The distal end fixation member 14J includes a pair of grasping members 111 and 112. The grasping members 111 and 112 are plate members having elasticity and serve as two arm portions including bending portions 111a and 112a facing each other at their distal end portions. In other words, the distal end fixation member 14J includes the two arm portions, and the two bending portions 111a and 112a provided on the distal end side of the two arm portions.

The distal end pipe sleeve 16a is connected to a distal end portion of the coil sheath 16. Base parts of the pair of grasping members 111 and 112 are fixed to the distal end portion of the distal end pipe sleeve 16a by a bonding agent or the like.

The wire 33 is inserted into the coil sheath 16. A distal end movable member 15J having a cylindrical shape is fixed to the distal end of the wire 33 through a pipe 113. The distal end movable member 15J has a cylindrical shape of a diameter increased on the distal end side. The distal end movable member 15J includes a recessed portion 15Ja on the distal end side and includes a bottom portion on the proximal end side. The bottom portion of the distal end movable member 15J is fixed to a distal end portion of the pipe 113 by a bonding agent or the like. The distal end movable member 15J having a cylindrical shape has an outer diameter larger than an interval between the pair of grasping members 111 and 112 on the proximal end side and smaller than an interval between the pair of grasping members 111 and 112 on the distal end side. In other words, the distal end movable member 15J includes an increased-diameter portion disposed between the pair of grasping members 111 and 112 and having a diameter increased on the distal end side.

The distal end movable member 15J is disposed between the pair of grasping members 111 and 112 and movable forward and backward along the longitudinal axis of the distal end grasping portion 11J.

As illustrated with dashed and double-dotted lines in FIG. 64, the grasping members 111 and 112 are cantilever springs and provided with stress in a direction approaching each other.

However, the pair of grasping members 111 and 112 are separated from each other against the spring stress when the wire 33 is pulled toward the proximal end side and the distal end movable member 153 is moved toward the proximal end side as illustrated with dotted lines. FIGS. 64 and 65 are cross-sectional views of the distal end grasping portion 11J along the longitudinal axis, illustrating a state in which the pair of grasping members 111 and 112 are separated from each other against the spring stress. As illustrated with dotted lines in FIGS. 64 and 65, the two grasping members 111 and 112 are separated from each other. In other words, the two grasping members 111 and 112 open and close in accordance with forward and backward movement of the distal end movable member 15J.

(Operation)

The examiner pulls the wire 33 toward the proximal end side to separate the pair of grasping members 111 and 112, thereby increasing an interval between the bending portions 111a and 112a. In this state, the foreign object OB is positioned between the bending portions 111a and 112a as illustrated in FIG. 65.

Then, as the wire 33 is pushed toward the distal end side, the foreign object OB between the bending portions 111a and 112a is placed between the pair of grasping members 111 and 112 due to stress, and also the distal end movable member 15J approaches the foreign object OB so that the foreign object OB enters the recessed portion 15Ja.

Figure 66:
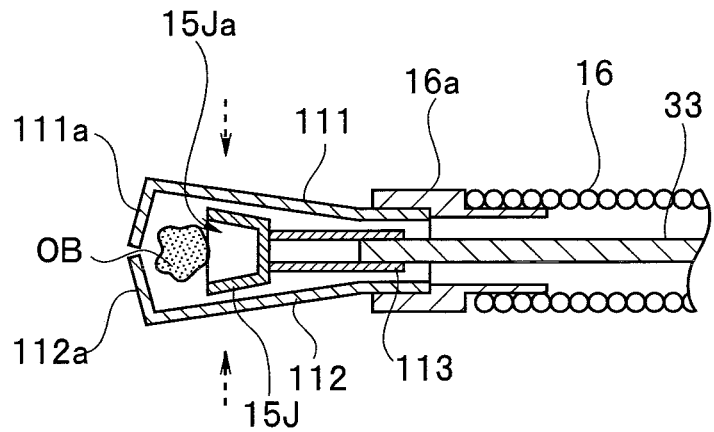
FIG. 66 is a cross-sectional view of the distal end grasping portion related to the eleventh embodiment along the longitudinal axis, illustrating a state in which a pair of grasping members have approached each other by spring stress.

FIG. 66 is a cross-sectional view of the distal end grasping portion 11J along the longitudinal axis, illustrating a state in which the pair of grasping members 111 and 112 have approached each other by the spring stress. The pair of grasping members 111 and 112 return to their original closed state due to elasticity.

Figure 67:
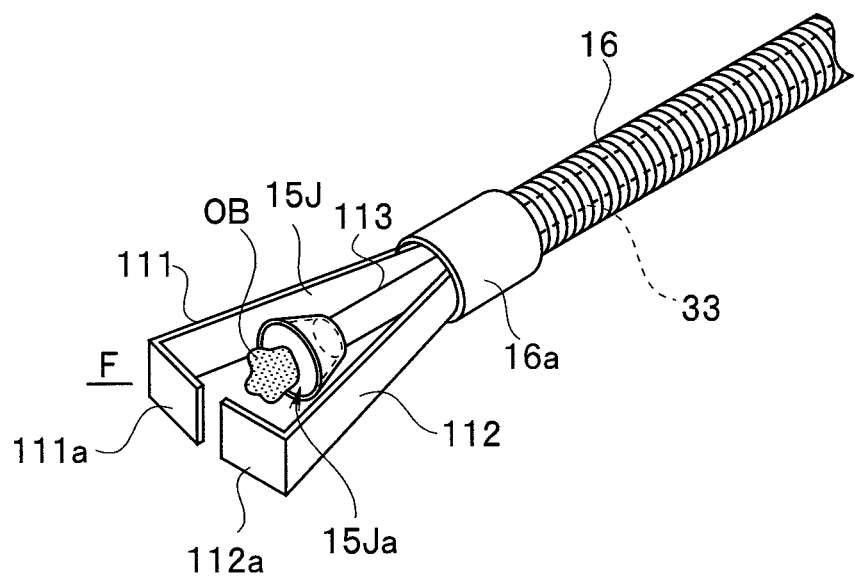
FIG. 67 is a perspective view of the distal end grasping portion related to the eleventh embodiment, illustrating a state in which a foreign object on a floor surface is housed.

FIG. 67 is a perspective view of the distal end grasping portion 11J, illustrating a state in which the foreign object OB on the floor surface F is housed.

The examiner can close the pair of grasping members 111 and 112 in parallel to the floor surface F by axially moving the coil sheath 16. The foreign object OB on the floor surface F is positioned between the pair of grasping members 111 and 112 while the pair of grasping members 111 and 112 are separated.

Then, as the examiner pushes the wire 33 in the distal end direction, the foreign object OB is housed in the recessed portion 15Ja and thus can be sandwiched and collected in a closed space among the closed bending portions 111a and 112a and the recessed portion 15Ja.

As described above, according to the above-described embodiment, it is possible to provide a treatment instrument with which it is easy to position a grasping portion relative to an object and collect the object.

Note that the movable member may include no recessed portion or include two bending portions.

Figure 68:
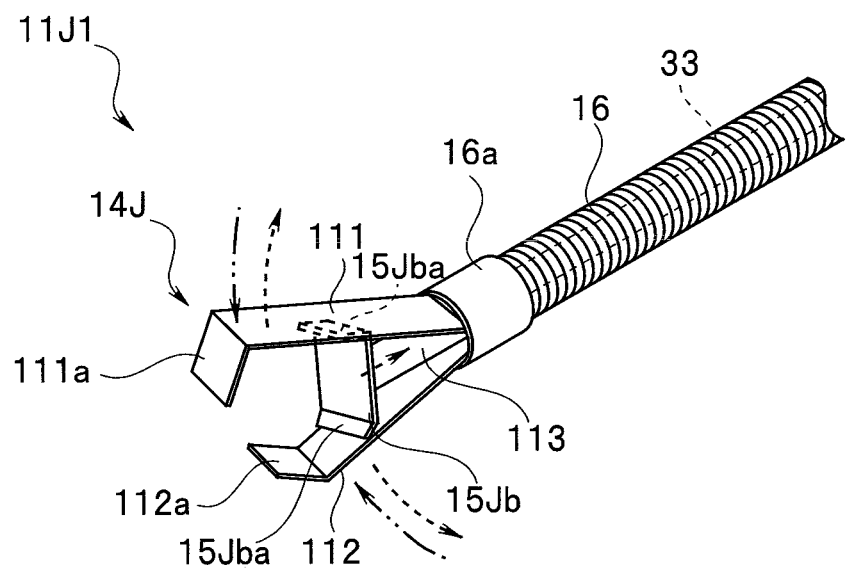
FIG. 68 is a perspective view of a distal end grasping portion related to a modification of the eleventh embodiment.

FIG. 68 is a perspective view of a distal end grasping portion 11J1 related to a modification. A distal end movable member 15Jb is a plate member, and bending portions 15Jba are formed at both end parts. The distal end movable member 15Jb includes a recessed portion 15Ja1 formed on the distal end side by the two bending portions 15Jba.

As the examiner axially rotates the distal end movable member 15Jb, the foreign object OB can be surrounded and held by the two bending portions 111a and 112a of the pair of grasping members 111 and 112 and the two bending portions 15Jba of the distal end movable member 15Jb.

Figure 69:
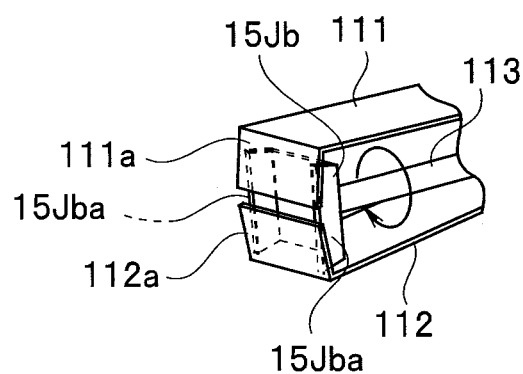
FIG. 69 is a perspective view of a distal end part of the distal end grasping portion, illustrating a state in which a distal end movable member related to the modification of the eleventh embodiment is axially rotated by 90°.

FIG. 69 is a perspective view of a distal end part of the distal end grasping portion 11J1, illustrating a state in which the distal end movable member 15Jb related to the modification is axially rotated by 90°.

Figure 70:
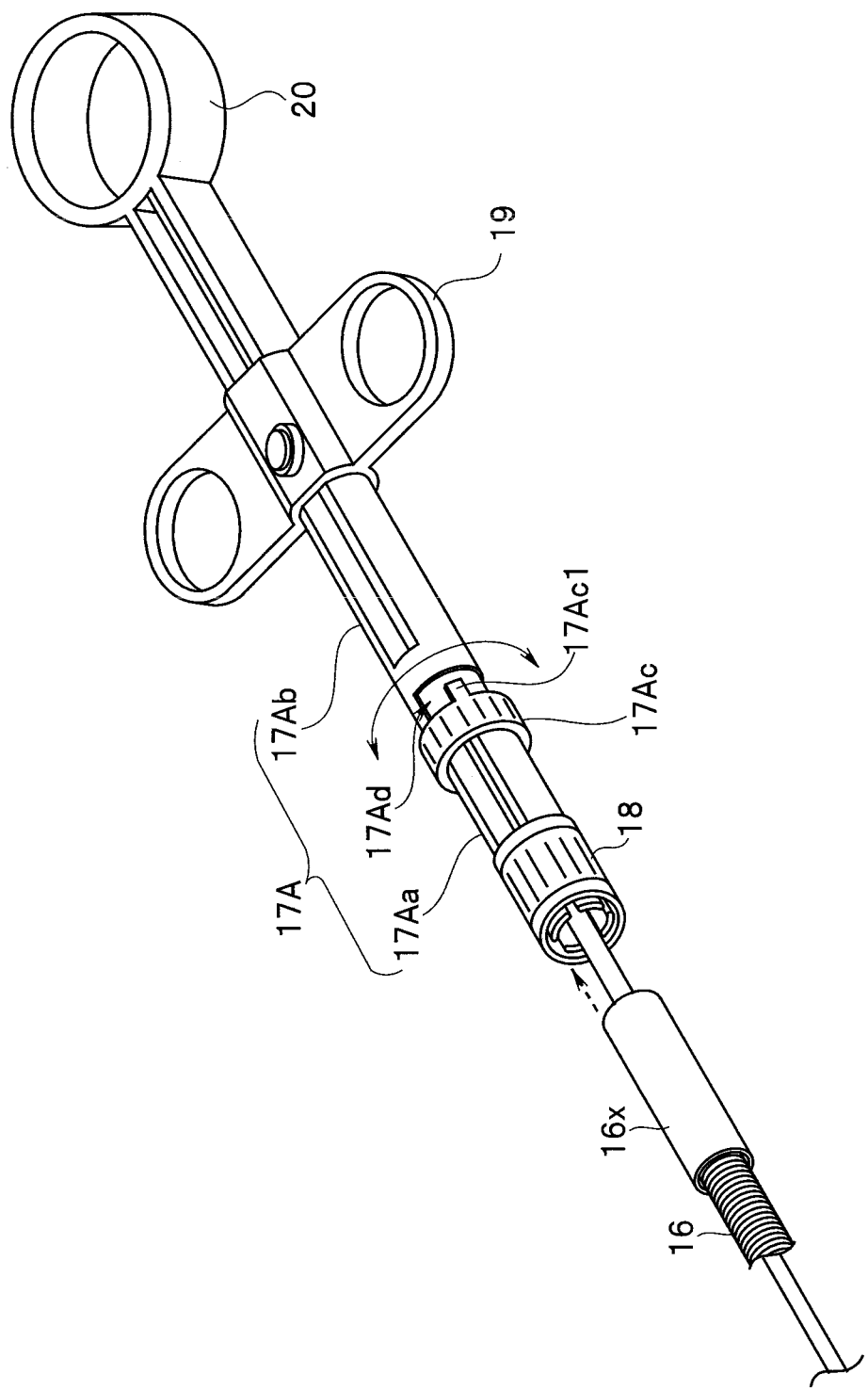
FIG. 70 is a perspective view of a rotational operation portion of the distal end movable member of an operation portion related to the modification of the eleventh embodiment.

FIG. 70 is a perspective view of a rotational operation portion of the distal end movable member 15Jb at the operation portion.

A pipe sleeve 16x provided at the proximal end portion of the coil sheath 16 is fixed to the knob member 18 of the operation portion 12.

An operation main body member 17A is constituted by a distal end side operation member 17Aa, and a proximal end side operation member 17Ab connected on the proximal end side of the distal end side operation member 17Aa. The pipe sleeve 16x is fixed to the distal end side operation member 17Aa through the knob member 18. A ring member 17Ac is fixed to a proximal end part of the distal end side operation member 17Aa by a bonding agent or the like. The ring member 17Ac includes a pair of convex portions 17Ac1 protruding on the proximal end side.

The proximal end side operation member 17Ab includes a cutout 17Ad on the distal end side.

Figure 71:
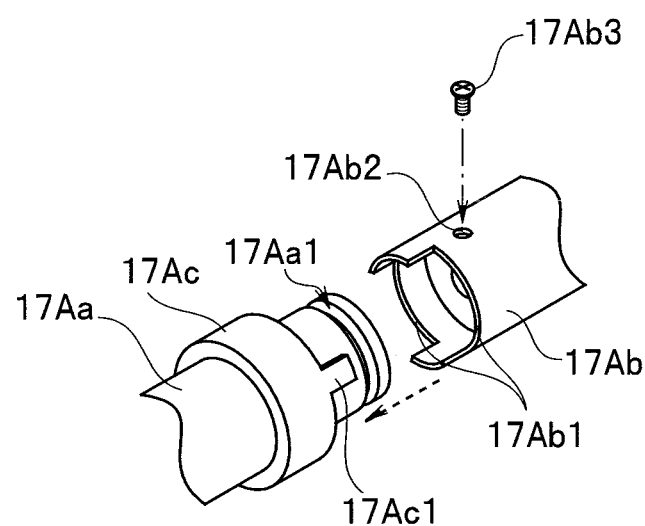
FIG. 71 is a diagram for description of connection between a distal end side operation member and a proximal end side operation member related to the modification of the eleventh embodiment.

FIG. 71 is a diagram for description of connection between the distal end side operation member 17Aa and the proximal end side operation member 17Ab.

The proximal end part of the distal end side operation member 17Aa for the ring member 17Ac has an outer diameter smaller than an outer diameter of part of the distal end side operation member 17Aa on the distal end side. A circumferential groove 17Aa1 is formed at the proximal end part of the distal end side operation member 17Aa.

Two cutouts 17Ab1 are formed at a distal end part of the proximal end side operation member 17Ab. In addition, a hole 17Ab2 for screwing is formed at the distal end part of the proximal end side operation member 17Ab.

The proximal end part of the distal end side operation member 17Aa is internally fitted to the distal end part of the proximal end side operation member 17Ab. When a screw 17Ab3 is screwed into the hole 17Ab2 and a distal end part of the screw 17Ab3 is disposed in the circumferential groove 17Aa1, the distal end part of the proximal end side operation member 17Ab is prevented from being removed from the proximal end part of the distal end side operation member 17Aa and is rotatable about the longitudinal axis.

However, since the two convex portions 17Ac1 are disposed inside the two cutouts 17Ab1, the proximal end side operation member 17Ab is rotatable only in a predetermined angle range. The predetermined angle range is, for example, 150°.

Thus, the wire 33 axially rotates as the examiner axially rotates the proximal end side operation member 17Ab. Thus, the distal end movable member 15Jb described above can be axially moved.

Thus, the present modification provides the same effects as the effects of the above-described embodiments.

Twelfth Embodiment

In the first embodiment, an outer peripheral surface of the coil sheath 16 hits an inner wall or the like in the subject, but in the present embodiment, a treatment instrument includes an outer sheath covering the coil sheath 16 so that an outer peripheral surface of the outer sheath hits an inner wall or the like in the subject, and a distal end fixation member moves forward and backward along the longitudinal axis in accordance with forward and backward movement of the wire 33.

A configuration of the present embodiment includes components substantially the same as components of the above-described configurations of the first to eleventh embodiments, and thus any identical component is denoted by the same reference sign and description of the component is omitted, and any different component will be described below in detail.

Figure 72:
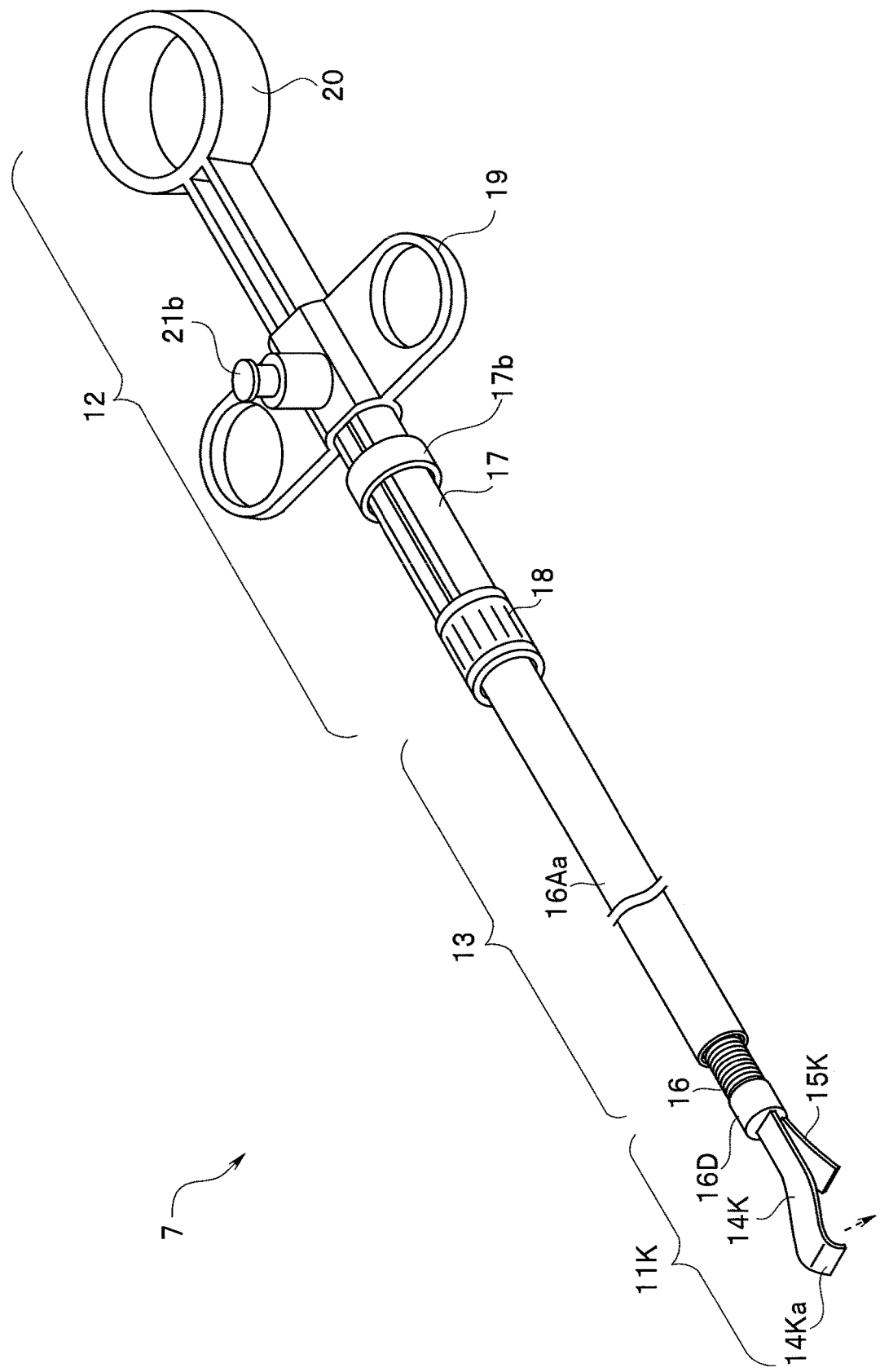
FIG. 72 is a perspective view of a treatment instrument of a twelfth embodiment.
Figure 73:
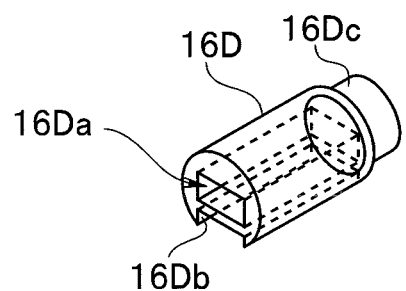
FIG. 73 is a perspective view of a distal end pipe sleeve of the twelfth embodiment.
Figure 74:
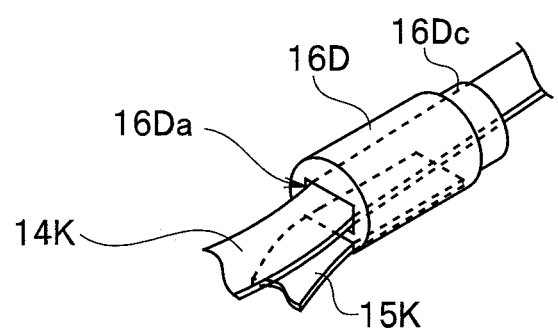
FIG. 74 is a perspective view illustrating positions of a distal end fixation member and a distal end movable member relative to the distal end pipe sleeve related to the twelfth embodiment.

FIG. 72 is a perspective view of the treatment instrument 7. A distal end grasping portion 11K includes a distal end fixation member 14K and a distal end movable member 15K. FIG. 73 is a perspective view of a distal end pipe sleeve 16D. FIG. 74 is a perspective view illustrating positions of the distal end fixation member 14K and the distal end movable member 15K relative to the distal end pipe sleeve 16D.

The distal end fixation member 14K is a plate member and includes a bending portion 14Ka bent at a distal end part. A proximal end part of the distal end fixation member 14K is connected to the wire 33 extending inside the coil sheath 16, and the proximal end portion of the wire 33 is fixed to the handle 19 by the button 21b of the operation portion 12.

The coil sheath 16 is inserted into the outer sheath 16Aa. The outer sheath 16Aa is fixed to the operation main body member 17 by the knob member 18.

The distal end pipe sleeve 16D is fixed to the distal end of the coil sheath 16. The distal end pipe sleeve 16D includes a stepped portion 16Dc of a cylindrical shape at a proximal end portion. The coil sheath 16 is externally fitted to the stepped portion 16Dc and fixed to the stepped portion 16Dc by a bonding agent or the like.

A proximal end part of the coil sheath 16 is fixed to a coil sheath slide operation portion 17b provided at the operation main body member 17 by a bonding agent or the like.

The distal end pipe sleeve 16D has a cylindrical shape. The distal end pipe sleeve 16D has a hole 16Da formed along the longitudinal axis, and a groove 16Db formed at an outer peripheral surface along the longitudinal axis. The distal end fixation member 14K is inserted into the hole 16Da, and the bending portion 14Ka at the distal end part of the distal end fixation member 14K protrudes on the distal end side. A proximal end portion of the distal end fixation member 14K is fixed to the distal end portion of the wire 33. The distal end fixation member 14K is movable forward and backward in the hole 16Da in accordance with forward and backward movement of the wire 33.

The distal end movable member 15K is fixed to the groove 16Db by a screw or the like. A distal end part of the distal end movable member 15K is provided with a permanent bend that separates the distal end part from the distal end fixation member 14K. The groove 16Db serves as a fixation portion to which the distal end movable member 15K as a plate member is fixed.

Accordingly, the distal end fixation member 14K moves forward and backward along a longitudinal axis of the distal end grasping portion 11K in accordance with a forward and backward movement operation of the handle 19. In addition, the distal end movable member 15K moves forward and backward together with the coil sheath 16 in accordance with forward and backward movement of the coil sheath slide operation portion 17b. Specifically, the distal end grasping portion 11K includes the distal end pipe sleeve 16D, and the distal end pipe sleeve 16D has the hole 16Da as a fixation member insertion hole. The distal end fixation member 14K is movable forward and backward along the longitudinal axis in the hole 16Da.

(Operation)

The examiner inserts the treatment instrument 7 into the subject while the distal end fixation member 14K and the like are housed in the outer sheath 16Aa. The distal end grasping portion 11K approaches the vicinity of the foreign object OB while the distal end fixation member 14K and the like are housed in the outer sheath 16Aa. An outer peripheral surface of the outer sheath 16Aa has small friction resistance for an inner wall in the subject, and thus the examiner can smoothly move the distal end grasping portion 11K of the treatment instrument 7 closer to a desired position.

Figure 75:
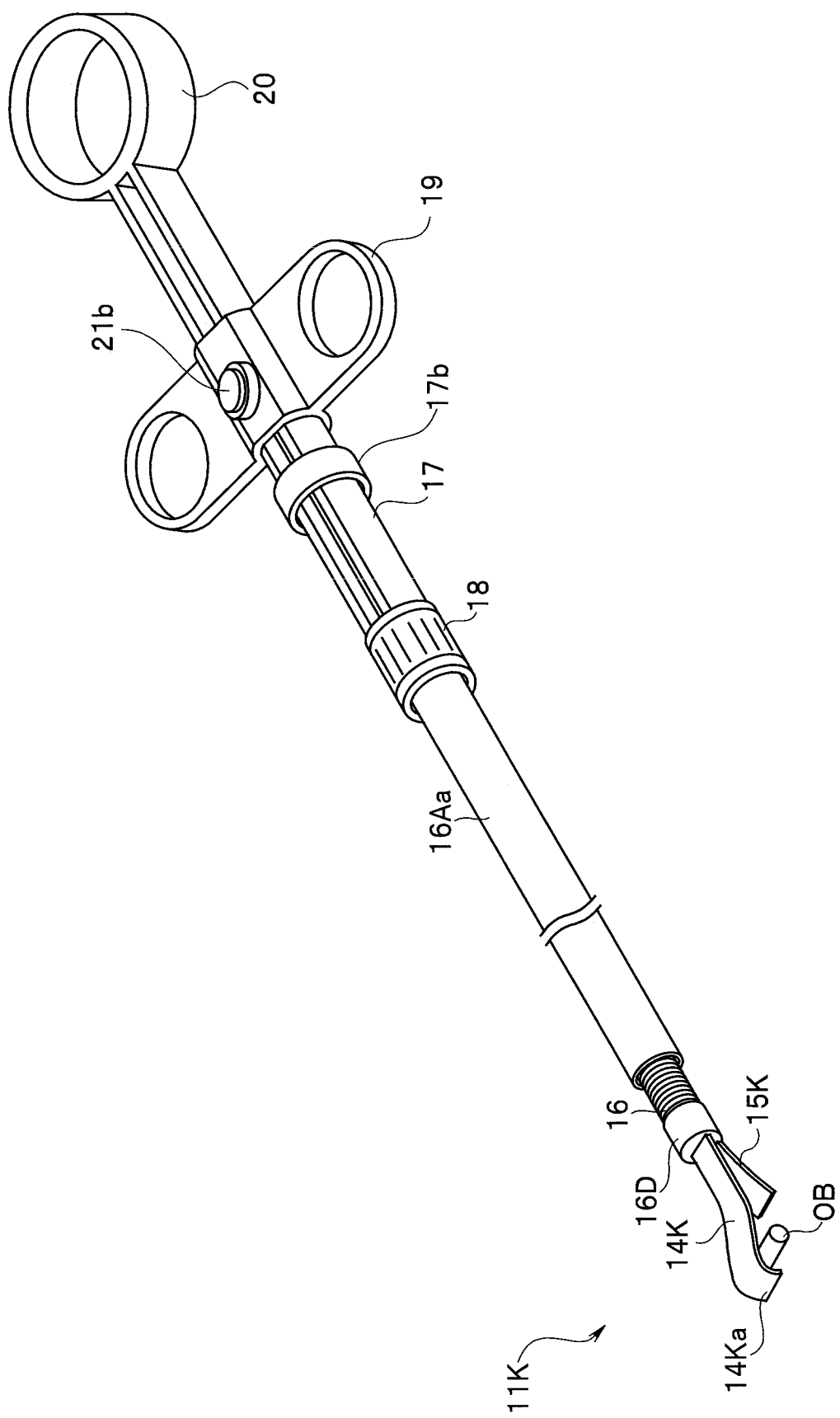
FIG. 75 is a diagram for description of a method of collecting a foreign object with a treatment instrument of the twelfth embodiment.
Figure 76:
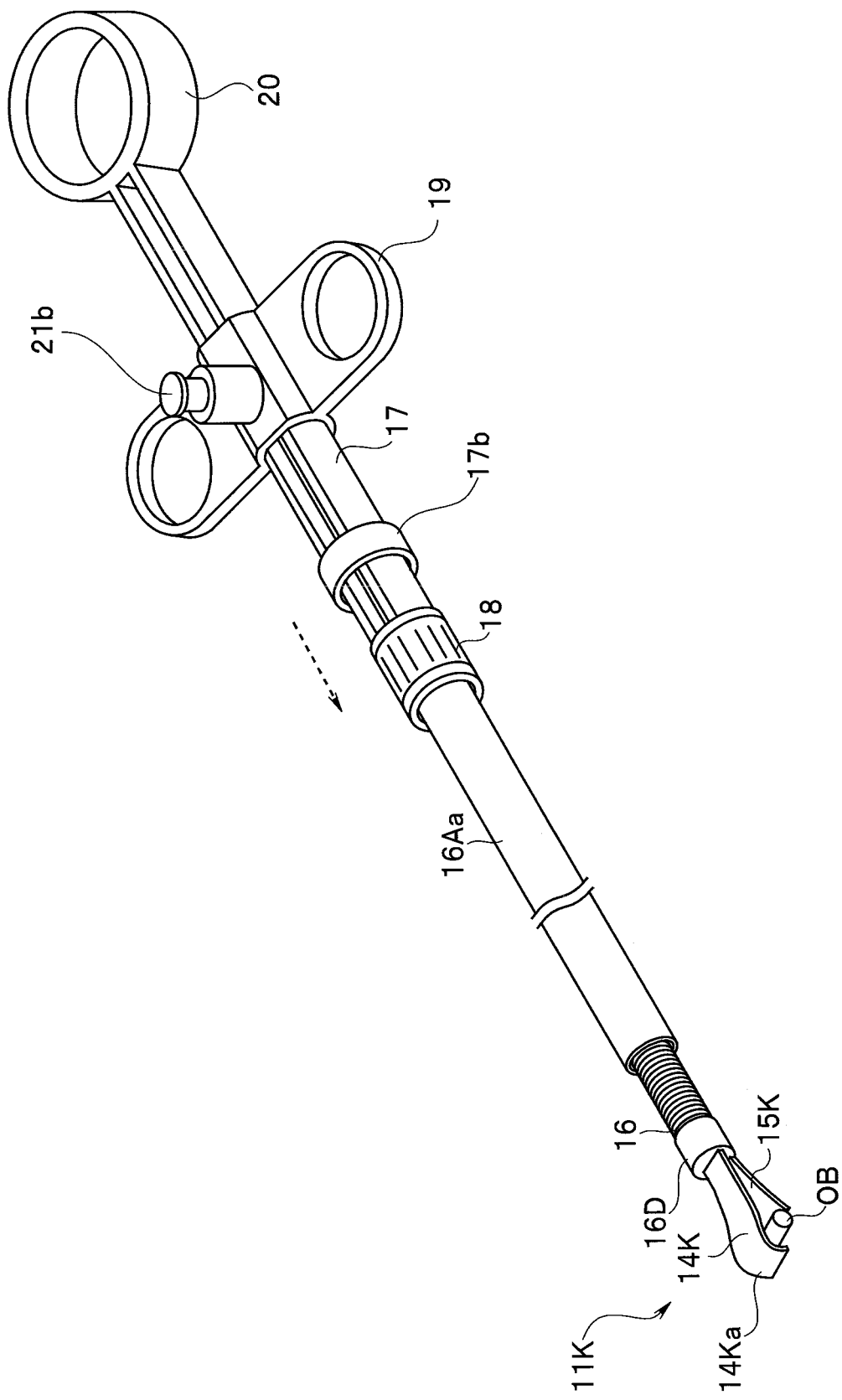
FIG. 76 is a diagram for description of the method of collecting a foreign object with the treatment instrument of the twelfth embodiment.
Figure 77:
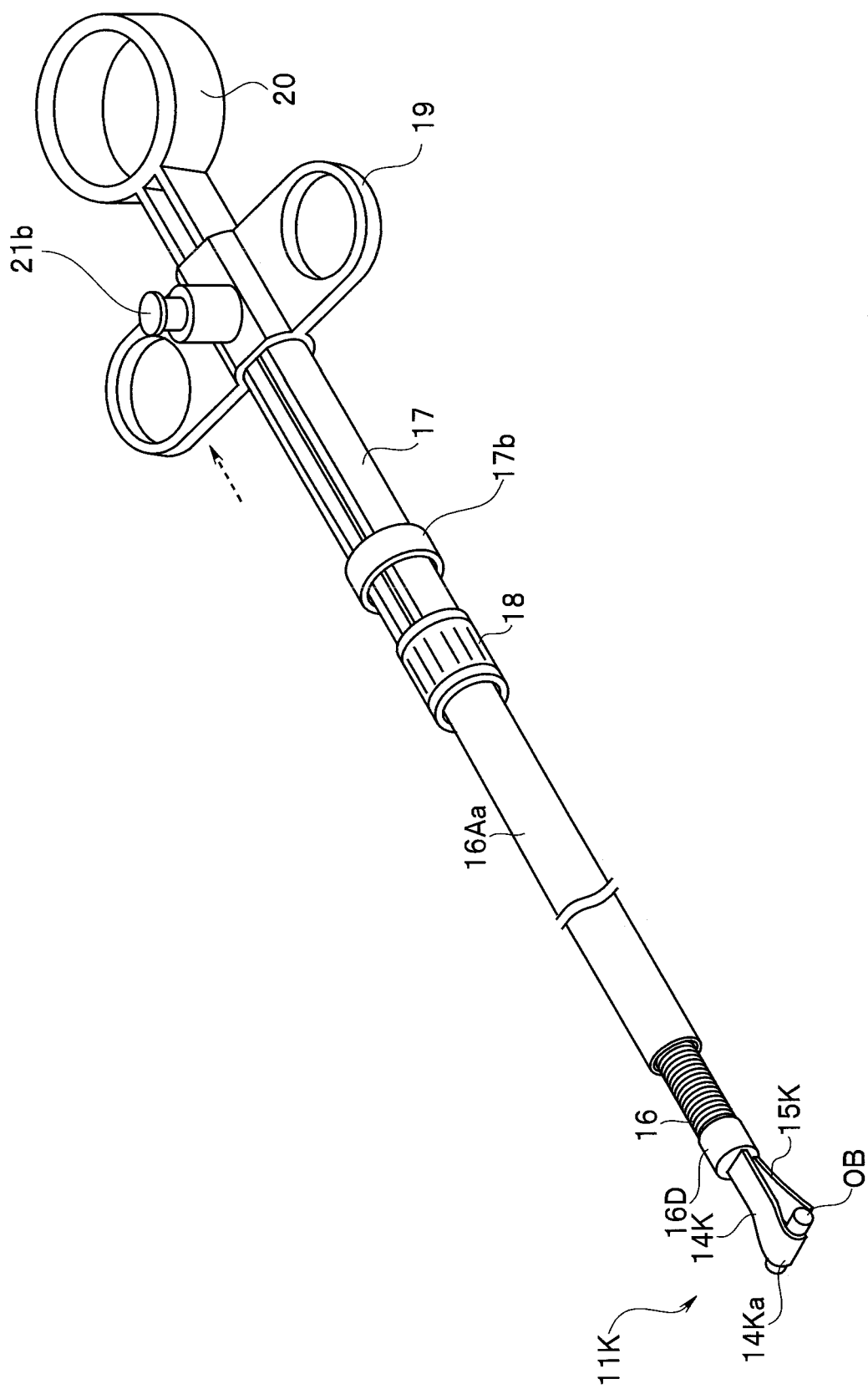
FIG. 77 is a diagram for description of the method of collecting a foreign object with the treatment instrument of the twelfth embodiment.
Figure 78:
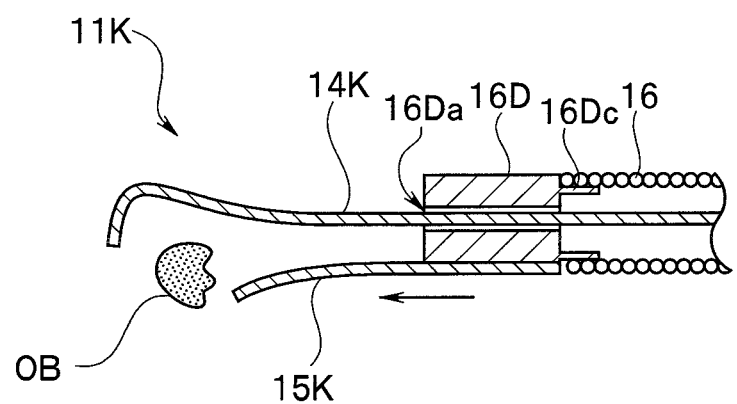
FIG. 78 is a cross-sectional view of a distal end grasping portion in a longitudinal direction for description of a foreign object grasping process related to the twelfth embodiment.
Figure 79:
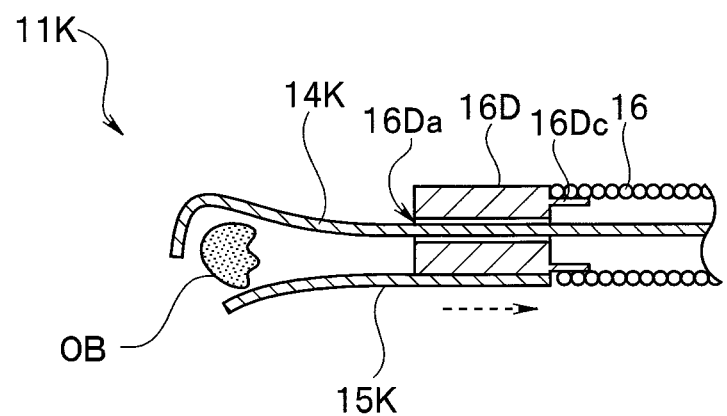
FIG. 79 is a cross-sectional view of the distal end grasping portion in the longitudinal direction for description of the foreign object grasping process related to the twelfth embodiment.
Figure 80:
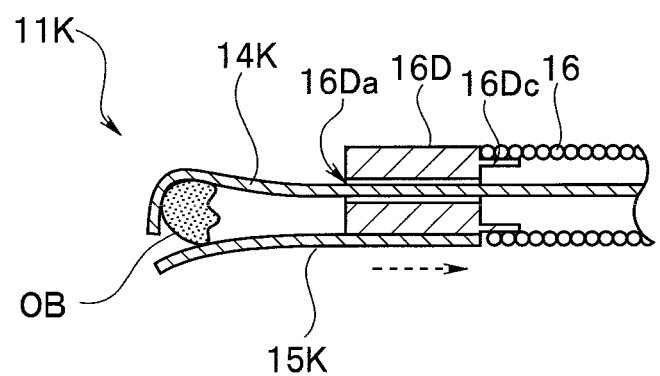
FIG. 80 is a cross-sectional view of the distal end grasping portion in the longitudinal direction for description of the foreign object grasping process related to the twelfth embodiment.

FIGS. 75 to 77 are diagrams for description of a method of collecting the foreign object OB with the treatment instrument according to the present embodiment. FIGS. 78 to 80 are cross-sectional views of the distal end grasping portion in the longitudinal direction for description of processes of grasping the foreign object OB.

FIGS. 75 and 78 illustrate a state in which the bending portion 14Ka of the distal end fixation member 14K are positioned behind the foreign object OB.

Subsequently, the examiner pushes the coil sheath slide operation portion 17b toward the distal end side to slide the distal end part of the distal end movable member 15K to below the foreign object OB and scoops the foreign object OB.

FIGS. 76 and 79 illustrate a state in which the distal end part of the distal end movable member 15K is slid to below the foreign object OB to scoop the foreign object OB. The state is a state in which the foreign object OB is lightly supported and not completely grasped but is temporarily fixed.

Subsequently, as the examiner pulls the handle 19 toward the proximal end side, the distal end fixation member 14K is pulled toward the proximal end side, the distal end fixation member 14K slides inside the hole 16Da of the distal end pipe sleeve 16D, the bending portion 14Ka moves toward the distal end movable member 15K, and the foreign object OB is grasped between the distal end fixation member 14K and the distal end movable member 15K.

FIGS. 77 and 80 illustrate a state in which the foreign object OB is grasped between the distal end fixation member 14K and the distal end movable member 15K.

The foreign object OB is reliably grasped between the distal end fixation member 14K and the distal end movable member 15K.

As described above, according to the above-described embodiment, it is possible to provide a treatment instrument with which it is easy to position a grasping portion relative to an object and collect the object.

In particular, with the outer sheath 16Aa, the examiner can easily move the distal end grasping portion 11K to near the foreign object OB. After the distal end grasping portion 11K approaches near the foreign object OB, the foreign object OB can be easily grasped through a small forward and backward movement operation of the distal end fixation member 14K and the distal end movable member 15K. With the outer sheath 16Aa, when the distal end movable member 15K is pushed forward through a hand-side operation to grasp the foreign object OB in the subject of a complicate bent shape, the foreign object OB can be reliably grasped between the distal end fixation member 14K and the distal end movable member 15K without changing the position of the distal end fixation member 14K relative to the foreign object OB nor moving the foreign object OB. Without the outer sheath 16Aa, the coil sheath 16 cannot be reliably pushed through an operation of pushing the coil sheath 16, and the foreign object OB potentially cannot be grasped because, for example, the distal end fixation member 14K moves to the hand side and hits and moves the foreign object OB.

Thirteenth Embodiment

In the first to twelfth embodiments, a grasping operation of a distal end grasping portion is mainly performed in accordance with forward and backward movement of each operation member of the operation portion 12 along the longitudinal axis, but in the present embodiment, a grasping operation of a distal end grasping portion is performed through one rotational operation of one operation member.

A configuration of the present embodiment includes components substantially the same as components of the above-described configurations of the first to twelfth embodiments, and thus any identical component is denoted by the same reference sign and description of the component is omitted, and any different component will be described below in detail.

Figure 81:
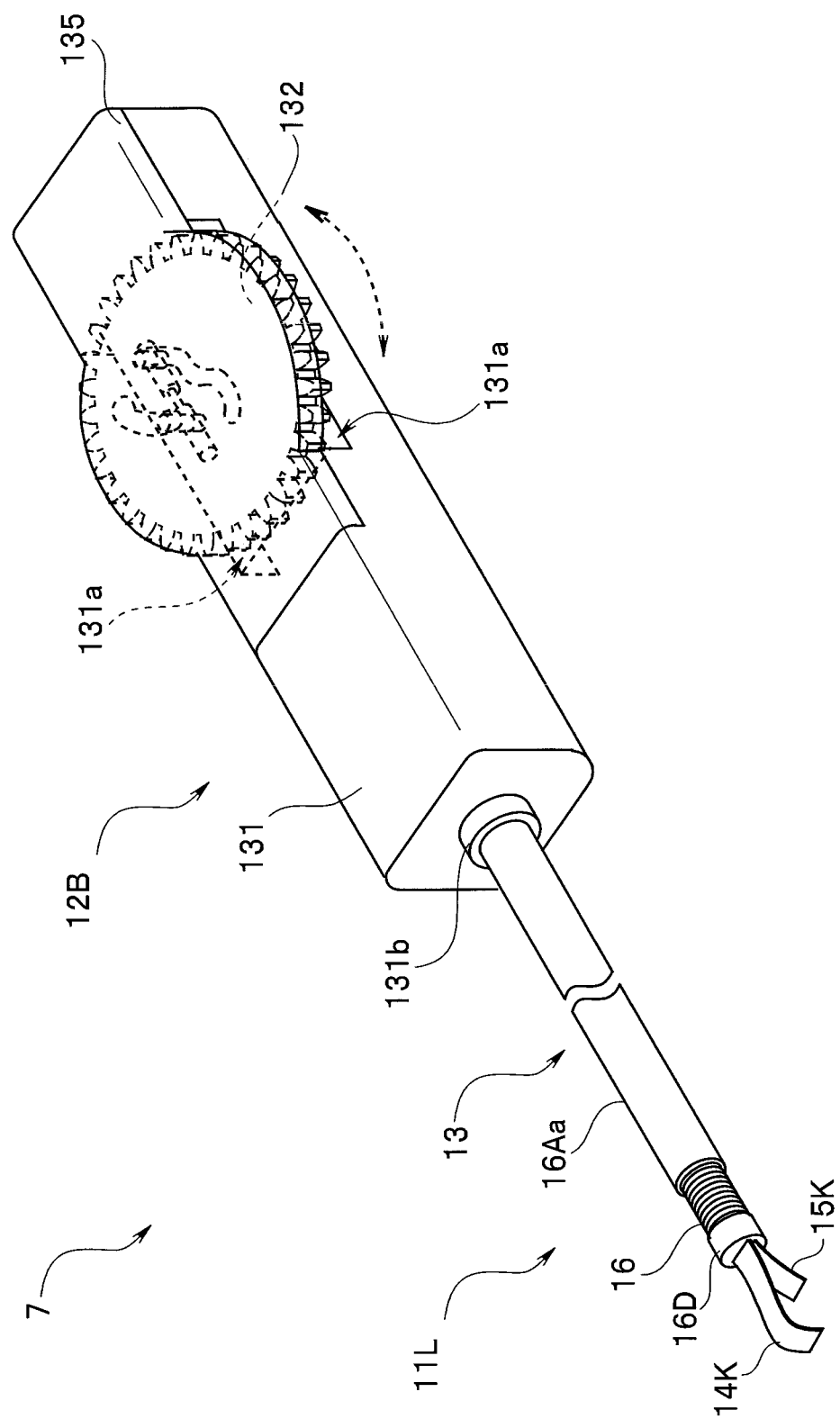
FIG. 81 is a perspective view of an operation portion of a treatment instrument of a thirteenth embodiment.

FIG. 81 is a perspective view of an operation portion 12B of the treatment instrument 7. The treatment instrument 7 includes a distal end grasping portion 11L, the operation portion 12B, and the insertion portion 13. The distal end grasping portion 11L has the same configuration as the configuration of the distal end grasping portion 1*l* K of the above-described twelfth embodiment.

The operation portion 12B includes a rectangular parallelepiped case 131 and a circular disk handle 132. Part of the circular disk handle 132 protrudes from two opening portions 131*a* at both side surface portions of the case 131. An outer peripheral surface of the circular disk handle 132 is provided with a large number of convexo-concave shapes to prevent finger slipping at an operation. The circular disk handle 132 is rotatable about a predetermined axis as illustrated with a dotted line.

A pipe sleeve 131*b* is provided on one surface of the case 131 in a longitudinal axial direction. The pipe sleeve 131*b* has a cylindrical shape and is fixed to a proximal end portion of the outer sheath 16Aa. The coil sheath 16 is inserted into the outer sheath 16Aa.

Figure 82:
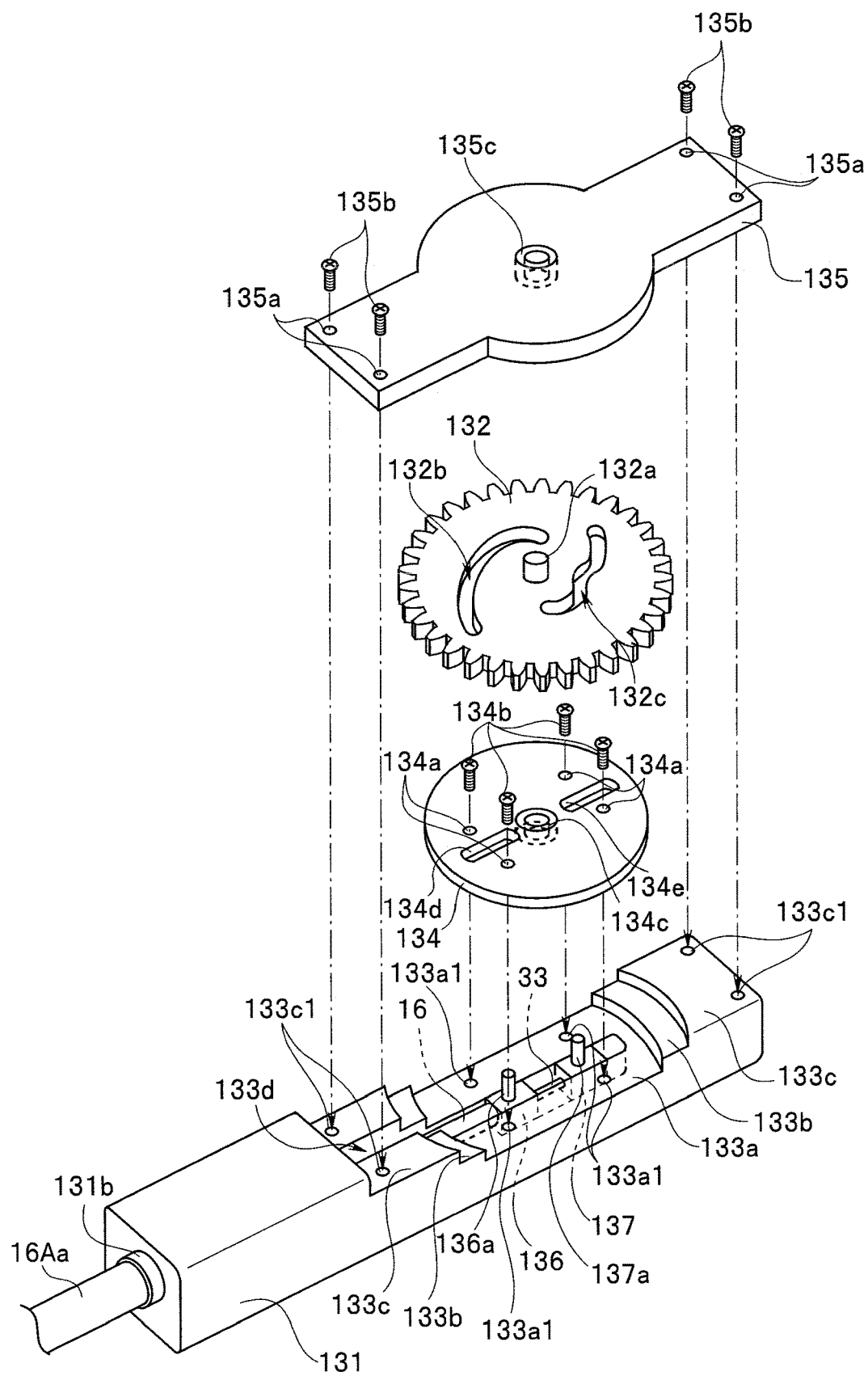
FIG. 82 is an exploded view of the operation portion of the thirteenth embodiment.
Figure 83:
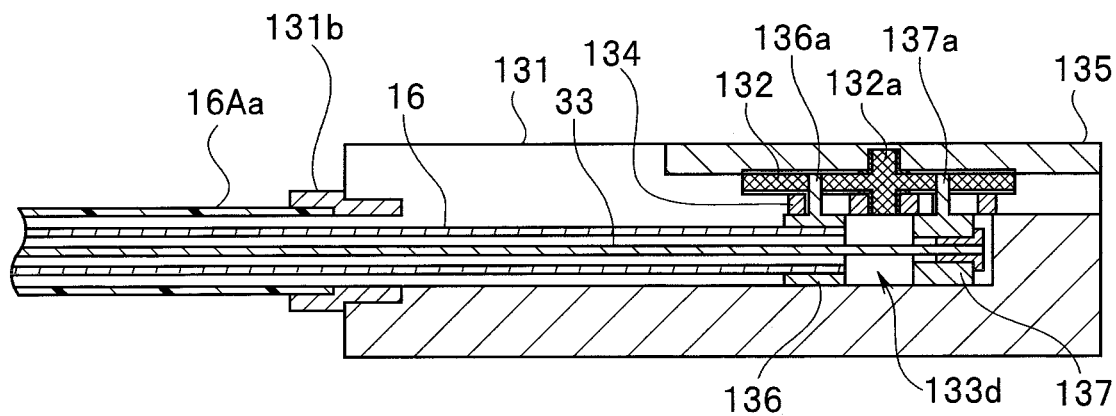
FIG. 83 is a partial cross-sectional view of the operation portion related to the thirteenth embodiment along the longitudinal axis.
Figure 84:
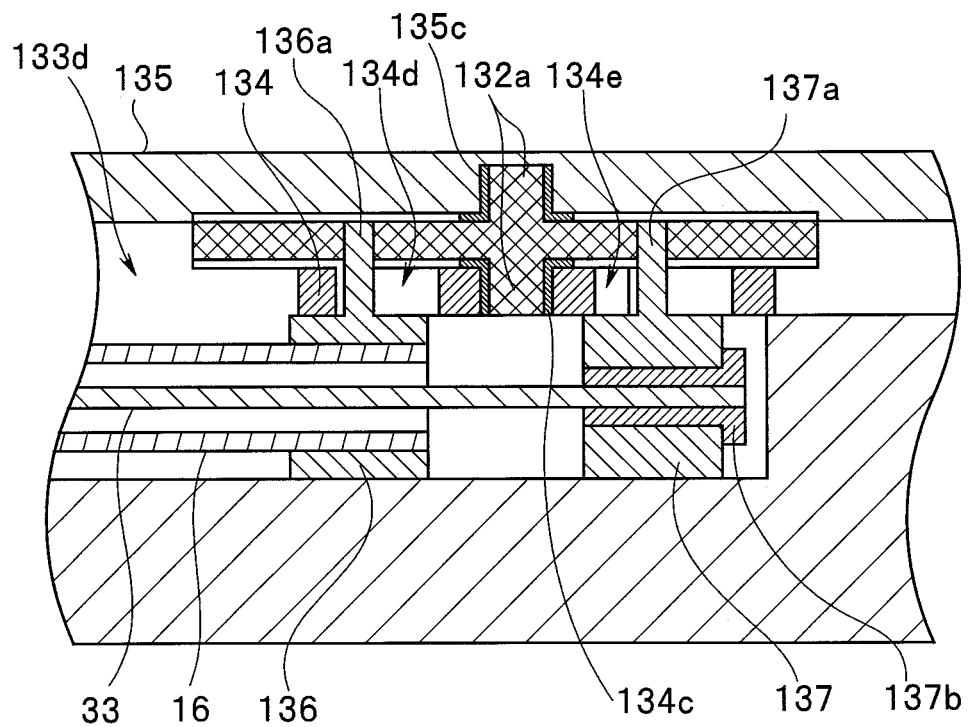
FIG. 84 is a partial cross-sectional view of the operation portion related to the thirteenth embodiment along the longitudinal axis.

FIG. 82 is an exploded view of the operation portion 12B. FIG. 83 is a partial cross-sectional view of the operation portion 12B along the longitudinal axis. FIG. 84 is a partial cross-sectional view of the operation portion 12B along the longitudinal axis.

FIG. 82 illustrates a configuration of components in the case 131. A pipe sleeve sealing plate 134 of a circular plate shape is disposed in addition to the circular disk handle 132 in the case 131. A recess 133*a* in which the pipe sleeve sealing plate 134 is disposed is formed in the case 131. Four screw holes 133*a*1 are formed at the recess 133*a*.

Four screw holes 134*a* are formed at the pipe sleeve sealing plate 134. Four screws 134*b* are screwed into the four screw holes 133*a*1 of the recess 133*a* through the four screw holes 134*a* so that the pipe sleeve sealing plate 134 is fixed to the recess 133*a*.

A bearing 134*c* is provided at a central part of a circular disk of the pipe sleeve sealing plate 134.

Two slits 134*d* and 134*e* are formed at the pipe sleeve sealing plate 134. The two slits 134*d* and 134*e* are formed so that longitudinal axes of the slits 134*d* and 134*e* are parallel to a longitudinal axis of a groove 133*d* to be described later when the pipe sleeve sealing plate 134 is fixed to the recess 133*a*.

A recess 133*b* in which the circular disk handle 132 is disposed is formed at the case 131. The circular disk handle 132 includes, at the center of a circular disk, a shaft portion 132*a* protruding in the up-down direction. The shaft portion 132*a* of the circular disk handle 132 on the lower side enters the bearing 134*c* when the circular disk handle 132 is disposed in the recess 133*b*. Two cam grooves 132*b* and 132*c* are formed at the circular disk handle 132.

A stepped portion 133*c* at which a lid member 135 is disposed is formed at the case 131. The lid member 135 is a plate member raised at a central part.

Four screw holes 135*a* are formed at the lid member 135. Four screws 135*b* are screwed into four screw holes 133*c*1 of the stepped portion 133*c* through the four screw holes 135*a* so that the lid member 135 is fixed to the stepped portion 133*c*.

A bearing 135*c* is provided at a substantially central portion of the lid member 135. The shaft portion 132*a* of the circular disk handle 132 on the upper side enters the bearing 135*c* when the lid member 135 is fixed on the stepped portion 133*c*.

The groove 133*d* is formed at the case 131 along the longitudinal axis. The groove 133*d* is formed across the recesses 133*a* and 133*b* and the stepped portion 133*c*. The groove 133*d* communicates with inside of the pipe sleeve 131*b* formed on the distal end side of the case 131 along the longitudinal axis.

Two pipe sleeves 136 and 137 are disposed inside the groove 133*d* and slidable along the longitudinal axis.

The proximal end portion of the coil sheath 16 is fixed to the pipe sleeve 136. The pipe sleeve 136 has a hole through which the wire 33 is inserted. The distal end fixation member 14K is connected to the distal end of the coil sheath 16 through the distal end pipe sleeve 16D.

The proximal end of the wire 33 is fixed to a pipe sleeve 137 through a wire fixation member 137*b*. The wire 33 is inserted into the coil sheath 16 through the hole of the pipe sleeve 136. The distal end of the wire 33 is connected to the proximal end portion of the distal end fixation member 14K.

Pins 136*a* and 137*a* protruding upward are provided to the pipe sleeves 136 and 137, respectively. The pin 136*a* enters the slit 134*d*, and the pin 137*a* enters the slit 134*e*.

The circular disk handle 132 is disposed between the lid member 135 and the pipe sleeve sealing plate 134 so that the pin 136*a* further enters the cam groove 132*b* through the slit 134*d* and the pin 137*a* further enters the cam groove 132*c* through the slit 134*e*. As described above, the pipe sleeve 136 includes the pin 136*a* that engages with the cam groove 132*b*, and is connected to the distal end movable member 15K. The pipe sleeve 137 includes the pin 137*a* that engages with the cam groove 132*c*, and is connected to the distal end fixation member 14K.

Figure 85:
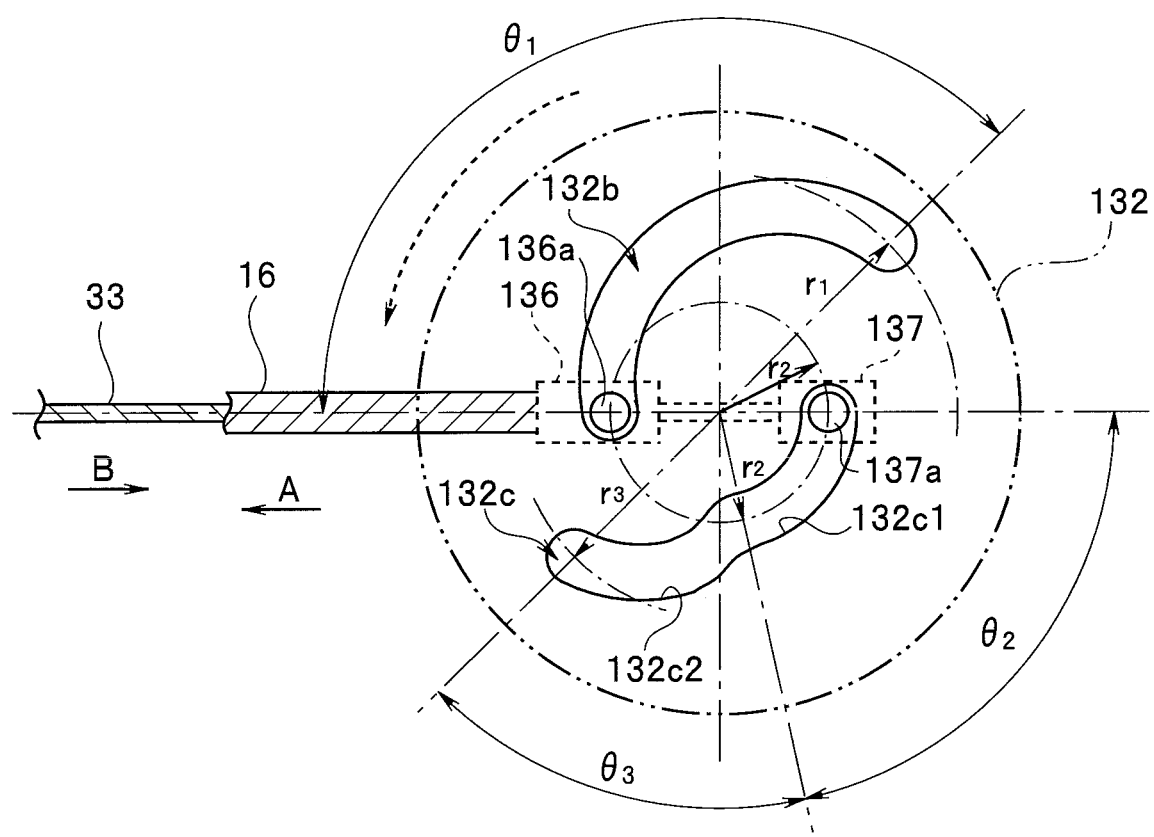
FIG. 85 is a diagram for description of shapes of two cam grooves formed at a circular disk handle related to the thirteenth embodiment.

FIG. 85 is a diagram for description of the shapes of the two cam grooves 132*b* and 132*c* formed at the circular disk handle 132. FIG. 85 illustrates an initial state in which the pin 136*a* is positioned at one end portion of the cam groove 132*b* and the pin 137*a* is positioned at one end portion of the cam groove 132*c*.

As illustrated with a dotted line, as the circular disk handle 132 is rotated anticlockwise by the examiner, the pin 136*a* moves along the cam groove 132*b* and eventually stops at the other end portion of the cam groove 132*b*. In other words, the pin 136*a* contacts the other end portion of the cam groove 132*b*, and the circular disk handle 132 cannot further rotate. The circular disk handle 132 rotates by an angle θ1 about the shaft portion 132*a*. A rotation radius r1 of the pin 136*a* increases as the pin 136*a* moves along the cam groove 132*b*.

The cam groove 132*b* is shaped in an arc when the circular disk handle 132 is viewed from above. The center of the arc is positioned shifted from the shaft portion 132*a* of the circular disk handle 132 toward a proximal end of the groove 133*d*. Thus, the pipe sleeve 136 and the coil sheath 16 move in the distal end direction of the groove 133*d* as the pin 136*a* moves along the cam groove 132*b*.

As the pin 136*a* moves along the cam groove 132*b*, the pin 137*a* moves along the cam groove 132*c* and eventually stops at the other end portion of the cam groove 132*c*.

The cam groove 132*c* includes a first groove region 132*c*1 and a second groove region 132*c*2. The first groove region 132*c*1 is shaped in a first arc, and the second groove region 132*c*2 is shaped in a second arc. The center of the first arc coincides with the center of the shaft portion 132*a* of the circular disk handle 132. A rotation radius r2 of the pin 137*a* is constant while the pin 137*a* moves in the first groove region 132*c*1. In this case, the circular disk handle 132 rotates by an angle θ2 about the shaft portion 132*a*.

The center of the second arc is positioned shifted from the center of the shaft portion 132*a* of the circular disk handle 132 in the distal end direction of the groove 133*d*. A rotation radius r3 of the pin 137*a* increases as the pin 137*a* moves in the second groove region 132*c*2. In this case, the circular disk handle 132 rotates by an angle θ3 about the shaft portion 132*a*. In this case, r1>r3 and θ1=θ2+θ3 hold.

Thus, the pipe sleeve 137 and the wire 33 do not move when the pin 137a moves along the first groove region 132c1. The pipe sleeve 137 and the wire 33 move in the proximal end direction of the groove 133d when the pin 137a moves along the second groove region 132c2 after the pin 137a moves along the first groove region 132c1. As described above, the circular disk handle 132 serves as a rotational operation member rotatable about the predetermined axis and including the cam groove 132b for moving the distal end movable member 15K toward the distal end side and the cam groove 132c for moving the distal end fixation member 14K toward the proximal end side.

(Operation)

The examiner inserts the treatment instrument 7 into the subject and positions the distal end grasping portion 11L near the foreign object OB. When the circular disk handle 132 is rotated in a state in which the foreign object OB is positioned on the distal end side of the distal end movable member 15K, the pin 137a does not move but the pin 136a moves in the cam groove 132b as the pin 137a moves in the first groove region 132c1. As a result, the distal end pipe sleeve 16D moves in the distal end direction, only the coil sheath 16 moves in a distal end direction A, and the grasping portion closes and lightly grasps the foreign object OB. In this case, a pushing amount d1 of the coil sheath 16 is (r1−r2)×(θ2/θ1) approximately.

Thereafter, when the circular disk handle 132 is further rotated, the pin 137a moves toward the proximal end side as the pin 137a moves in the second groove region 132c2. As a result, the distal end fixation member 14K moves in a proximal end direction B and firmly grasps the foreign object OB between the distal end fixation member 14K and the distal end movable member 15K. Specifically, when the circular disk handle 132 is rotated in a predetermined direction about the predetermined axis, the pin 136a engages with the cam groove 132b and moves the distal end movable member 15K in the distal end direction, and the pin 137a engages with the cam groove 132c and moves the distal end fixation member (14K) toward the proximal end side. In this case, a pushing amount d2 of the coil sheath 16 is (r1−r2)×(θ3/θ1) approximately, and a pulling amount d3 of the wire 33 is (r3−r2).

As described above, according to the above-described embodiment, it is possible to provide a treatment instrument with which it is easy to position the distal end grasping portion 11L relative to an object and collect the object.

In particular, it is possible to perform an operation of the coil sheath 16 and the wire 33 with a simple operation, which makes it easy to perform an operation of foreign object collection.

Fourteenth Embodiment

In the twelfth embodiment, the distal end fixation member and the movable member both having plate shapes sandwich the foreign object OB so that their facing surfaces approach each other, but in the present embodiment, two arm portions of a distal end fixation member, having plate shapes are disposed side by side, and the foreign object OB is sandwiched between two surfaces of the two arm portions, which are opposite to each other.

A configuration of the present embodiment includes components substantially the same as components of the above-described configurations of the first to thirteenth embodiments, and thus any identical component is denoted by the same reference sign and description of the component is omitted, and any different component will be described below in detail.

Figure 86:
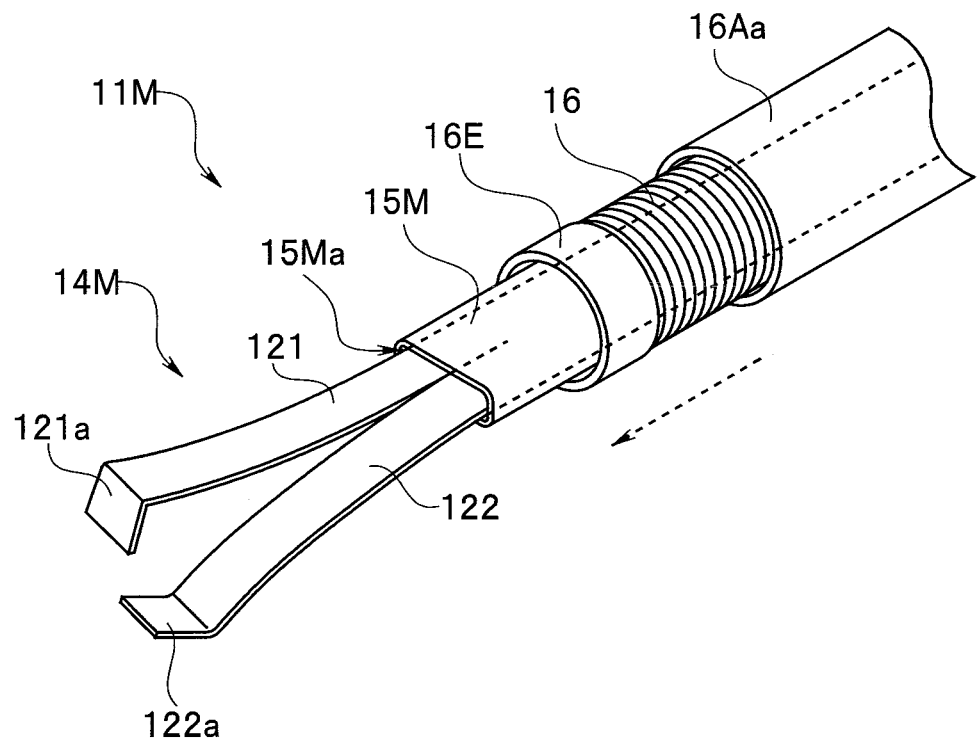
FIG. 86 is a perspective view of a distal end grasping portion of a fourteenth embodiment.

FIG. 86 is a perspective view of a distal end grasping portion 11M of the present embodiment. FIG. 86 illustrates the distal end grasping portion 11M when not grasping the foreign object OB.

Figure 87:
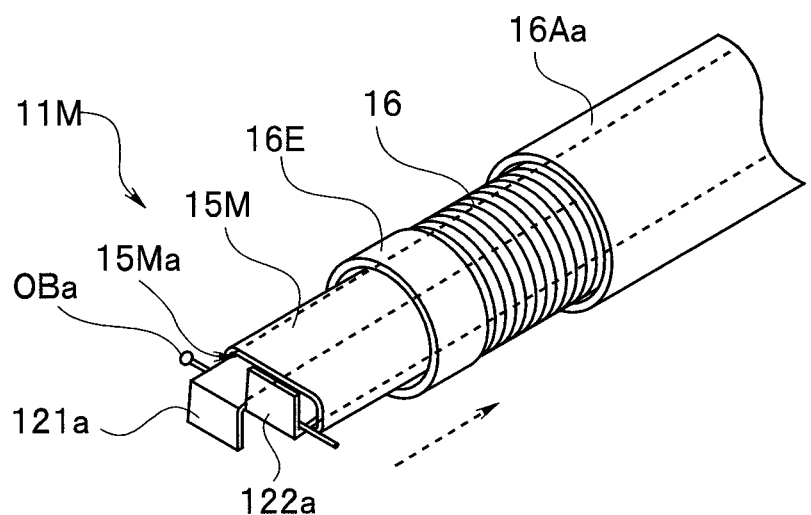
FIG. 87 is a perspective view of the distal end grasping portion related to the fourteenth embodiment when grasping a foreign object.

A pipe sleeve 16E is fixed to the distal end of the coil sheath 16. A distal end movable member 15M having a flat pipe shape is fixed inside the pipe sleeve 16E by a bonding agent or the like. As illustrated in FIG. 87, the distal end movable member 15M has a hole 15Ma of a shape deformed in accordance with the plate shape of a distal end fixation member 14M. The distal end fixation member 14M is slidably inserted into the hole 15Ma. As described above, the distal end movable member 15M is movable forward and backward along a longitudinal axis of the distal end grasping portion 11M and has the hole 15Ma formed along the longitudinal axis.

The distal end fixation member 14M having a plate shape is inserted into the distal end movable member 15M having a pipe shape. The distal end fixation member 14M is a plate member and includes a distal end part cut along the longitudinal axis. Two arm portions 121 and 122 having plate shapes and formed by cutting include bending portions 121a and 122a, respectively, on the distal end side. The bending portions 121a and 122a are bent in directions opposite to each other.

The two arm portions 121 and 122 are provided with permanent bends in advance so that the arm portions 121 and 122 are bent in directions opposite to each other with respect to the longitudinal axis of the distal end fixation member 14M when viewed in a direction orthogonal to the longitudinal axis of the distal end fixation member 14M and parallel to a plane portion of the distal end fixation member 14M. In other words, the arm portions 121 and 122 are bent in directions different from (opposite to) each other.

The bending portions 121a and 122a are formed to bend toward a longitudinal axis of a distal end fixation member 14L when viewed in the direction orthogonal to the longitudinal axis of the distal end fixation member 14M and parallel to the plane portion of the distal end fixation member 14M.

A proximal end part of the distal end fixation member 14M is fixed to the handle 19 through the wire 33. Accordingly, the distal end fixation member 14M moves forward and backward along a longitudinal axis of the distal end movable member 15M in accordance with forward and backward movement of the handle 19 along the longitudinal axis of the operation portion 12.

The proximal end part of the coil sheath 16 is fixed to the coil sheath slide operation portion 17b provided at the operation main body member 17 by a bonding agent or the like. Accordingly, the coil sheath 16 moves forward and backward in the outer sheath 16Aa in accordance with forward and backward movement of the coil sheath slide operation portion 17b along the longitudinal axis of the operation portion 12.

(Operation)

The examiner moves the outer sheath 16Aa and positions the distal end grasping portion 11M near the foreign object OB.

The examiner can push the coil sheath 16 in the distal end direction by pushing the coil sheath slide operation portion 17b of the operation portion 12 as illustrated with a dotted line arrow in FIG. 86. A distal end movable member 15L is pushed in the distal end direction as well. Then, when the handle 19 is pulled toward the hand side, the distal end fixation member 14M is pulled toward the proximal end side so that the arm portions 121 and 122 are closed as illustrated with a dotted line arrow in FIG. 87. FIG. 87 illustrates the distal end grasping portion 11M when the handle 19 is pulled toward the hand side.

The examiner positions the foreign object OB between the bending portions 121a and 122a and pushes the distal end movable member 15M in the distal end direction to lightly grasp the foreign object OB with the two arm portions 121 and 122, and then pulls the handle 19 toward the proximal end side. When the handle 19 is pulled toward the proximal end side, the arm portions 121 and 122 are closed so that the foreign object OB is firmly grasped while being pulled toward the hand side. As a result, when the foreign object OB is a foreign object OBa such as an elongated metal piece as illustrated in FIG. 87, the foreign object OBa is easily grasped and then strongly pulled toward the distal end pipe sleeve 16D as the handle 19 on the hand side is pulled, and accordingly, the grasped metal piece is solidly fixed.

The position of a distal end of the distal end grasping portion 11M does not change due to pushing of the coil sheath 16 when the foreign object OB is lightly grasped with distal end parts of the arm portions 121 and 122, and thus the foreign object OB can be reliably grasped.

As described above, according to the above-described embodiment, it is possible to provide a treatment instrument with which it is easy to position a grasping portion relative to an object and collect the object.

In particular, the foreign object OB is solidly sandwiched between the two arm portions 121 and 122 of the distal end grasping portion 11M while the position of the distal end at grasping is maintained, and thus the foreign object OB is unlikely to be dropped.

Fifteenth Embodiment

In the twelfth embodiment, the foreign object OB is sandwiched between the distal end fixation member and the movable member as the distal end fixation member having a plate shape is pulled toward the proximal end side, but in the present embodiment, facing surfaces of two plate members approach each other to sandwich the foreign object OB as the wire is pushed.

A configuration of the present embodiment includes components substantially the same as components of the above-described configurations of the first to fourteenth embodiments, and thus any identical component is denoted by the same reference sign and description of the component is omitted, and any different component will be described below in detail.

Figure 88:
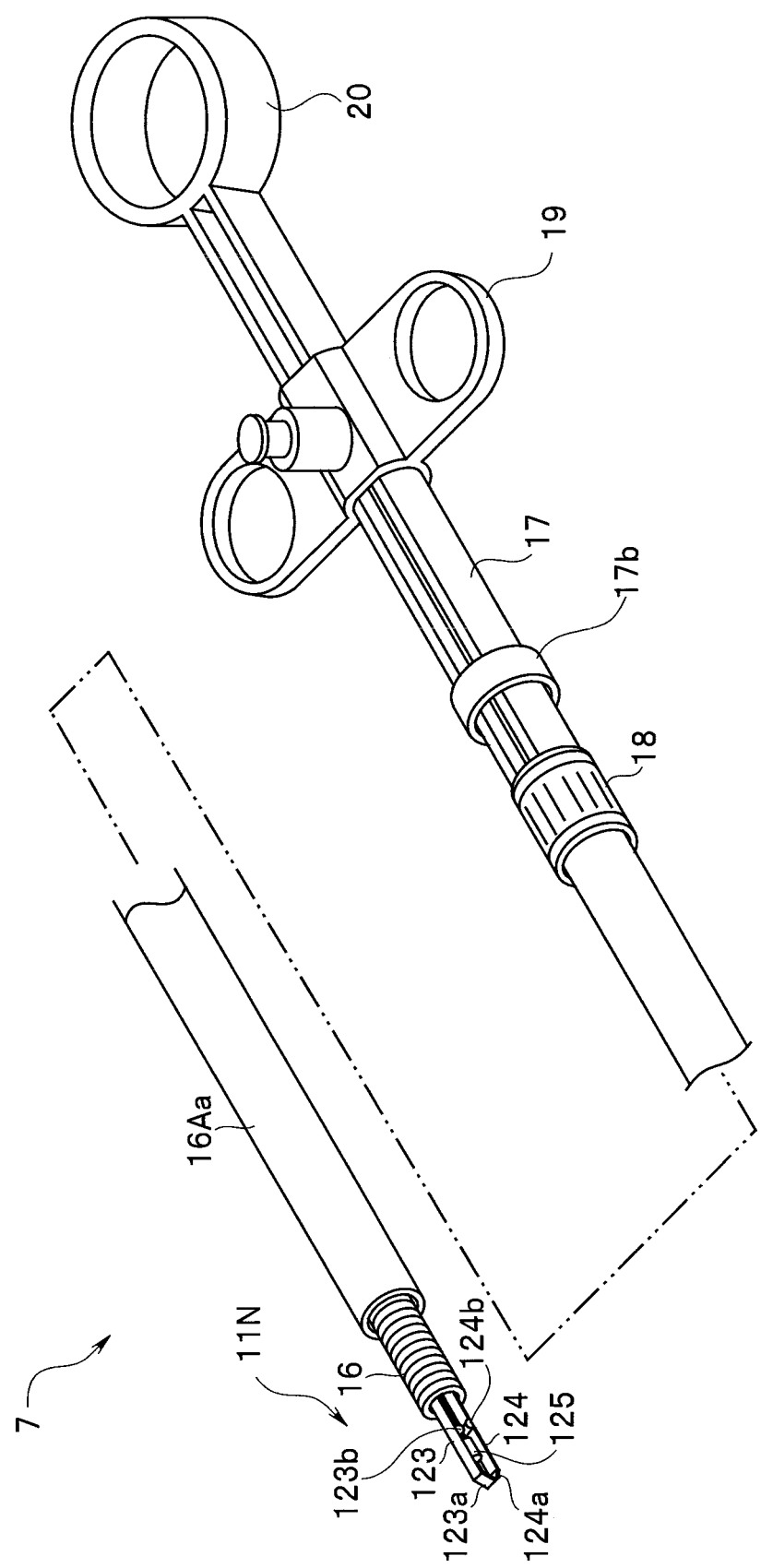
FIG. 88 is a perspective view of a treatment instrument of a fifteenth embodiment.
Figure 89:
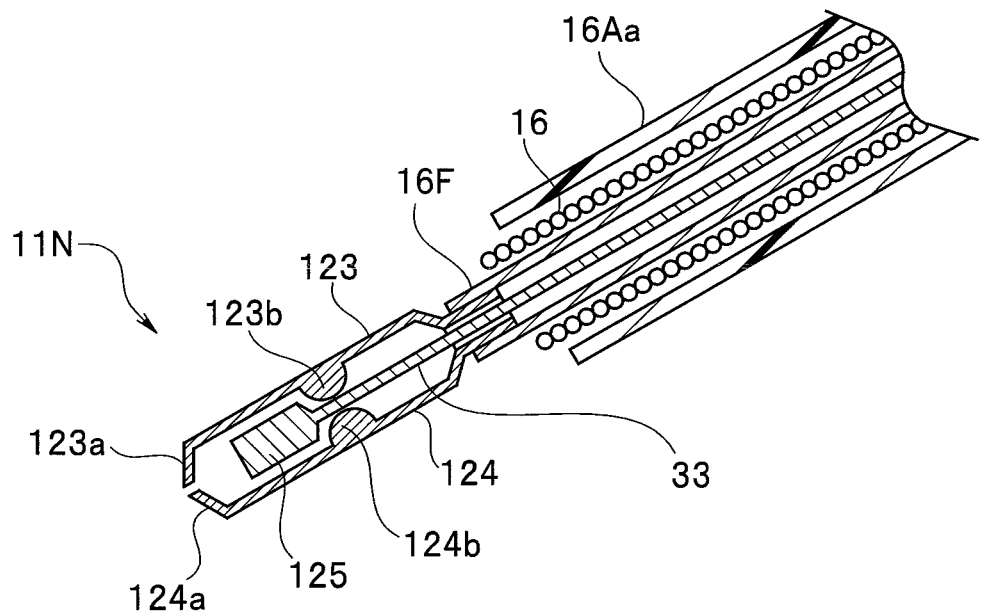
FIG. 89 is a cross-sectional view of a distal end grasping portion related to the fifteenth embodiment along the longitudinal axis.
Figure 90:
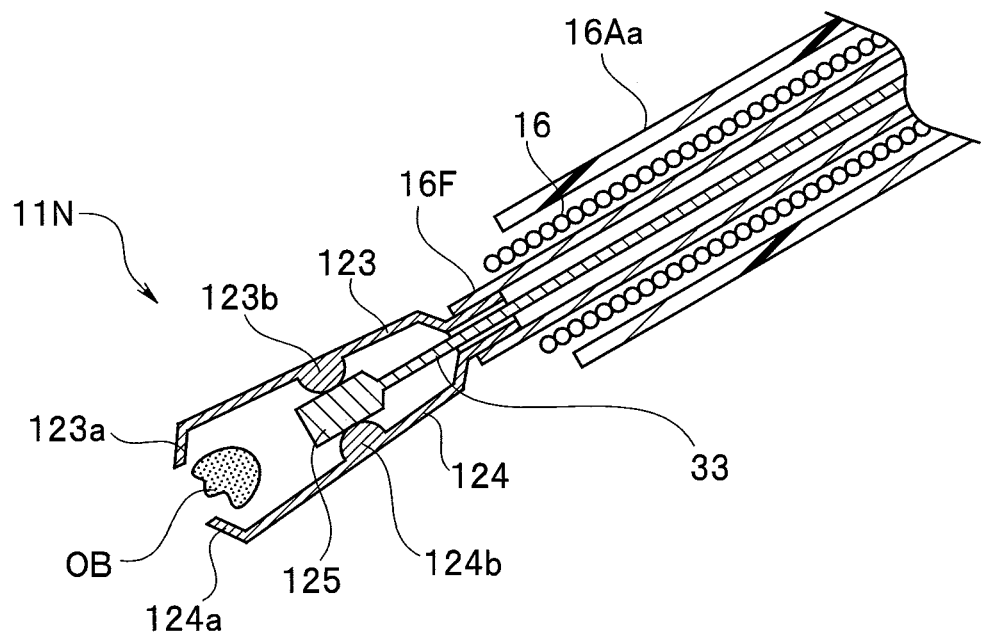
FIG. 90 is a cross-sectional view of the distal end grasping portion related to the fifteenth embodiment along the longitudinal axis.

FIG. 88 is a perspective view of the treatment instrument 7 of the present embodiment. FIGS. 89 and 90 are cross-sectional views of a distal end grasping portion 11N along the longitudinal axis.

The coil sheath 16 is inserted into the outer sheath 16Aa. In addition, an inner sheath 16F is inserted into the coil sheath 16. The coil sheath 16 is fixed to the coil sheath slide operation portion 17b.

Proximal end portions of two arm members 123 and 124 are fixed inside a distal end part of the inner sheath 16F by a bonding agent or the like. The arm members 123 and 124 having plate shapes are plate members having elasticity. The arm members 123 and 124 include bending portions 123a and 124a respectively, at their distal end portions. The two bending portions 123a and 124a are bent so that the bending portions 123a and 124a approach each other on the distal end side. The two arm members 123 and 124 include protrusions 123b and 124b at parts facing each other. In other words, the two protrusions 123b and 124b are provided facing the two arm members 123 and 124, respectively. The two arm members 123 and 124 serve as the distal end grasping portion 11N that grasps the foreign object OB.

The wire 33 is inserted into the inner sheath 16F. The wire 33 includes an increased-diameter portion 125 at a distal end part. The increased-diameter portion 125 includes a taper portion on the proximal end side. The wire 33 serves as a distal end movable member capable of moving forward and backward along the longitudinal axis of the distal end grasping portion 11N and including the increased-diameter portion 125 at a distal end. The two arm members 123 and 124 are disposed to sandwich the wire 33 as a distal end movable member.

The coil sheath 16 is provided outside the inner sheath 16F, and the inner sheath 16F is slidable inside the coil sheath 16. The distal end grasping portion 11N (two arm members 123 and 124) can be housed inside the coil sheath 16.

As described above, the two arm members 123 and 124 are closed when the increased-diameter portion 125 is positioned on the distal end side of the two protrusions 123b and 124b, and are opened when the increased-diameter portion 125 is positioned between the two protrusions 123b and 124b.

(Operation)

When the wire 33 is pushed toward the distal end side along the longitudinal axis of the distal end grasping portion 11N, the increased-diameter portion 125 is positioned on the distal end side of the two protrusions 123b and 124b as illustrated in FIG. 89. When the examiner pulls the handle 19 toward the proximal end side, the wire 33 is pulled toward the proximal end side along the longitudinal axis of the distal end grasping portion 11N. As a result, as illustrated in FIG. 90, the increased-diameter portion 125 enters between the two protrusions 123b and 124b and separates the two arm members 123 and 124 from each other. In other words, the increased-diameter portion 125 hits the two protrusions 123b and 124b and spreads the two arm members 123 and 124 apart by pushing.

The examiner moves a distal end of the outer sheath 16Aa close to the foreign object OB while the distal end grasping portion 11N (two arm members 123 and 124) is housed inside the coil sheath 16.

The examiner opens the distal end grasping portion (distal end portions of the two arm members 123 and 124) by pulling the wire 33 toward the proximal end side, and positions the foreign object OB between the two arm members 123 and 124.

In this state, the examiner closes the distal end grasping portion (distal end portions of the two arm members 123 and 124) by pushing the wire 33 toward the distal end side, thereby grasping the foreign object OB with the grasping portion. In this case, the foreign object OB is lightly grasped. In this state, when the coil sheath 16 is pushed by the coil sheath slide operation portion 17b, a distal end part of the coil sheath 16 covers an outer peripheral part of the grasping portion (two arm members 123 and 124) so that the foreign object OB is firmly grasped.

Thereafter, the coil sheath 16 is housed in the outer sheath 16Aa. and then the distal end grasping portion 11N can be taken out of the subject.

As described above, according to the above-described embodiment, it is possible to provide a treatment instrument with which it is easy to position a grasping portion relative to an object and collect the object.

In particular, the foreign object OB is solidly sandwiched between the two arm members 123 and 124 of the distal end grasping portion 11N, and thus the foreign object OB is unlikely to be dropped.

Sixteenth Embodiment

In the fourteenth embodiment, when the handle 19 is pulled toward the hand side, the two arm portions 121 and 122 of the distal end fixation member 14M close and sandwich the foreign object OB, but in the present embodiment, when the handle 19 is pulled toward the hand side, a distal end movable member pulls the foreign object OB toward a distal end of a sheath of a cylindrical shape so that the foreign object OB is sandwiched between a bending portion of the distal end movable member and a distal end surface of the sheath.

A configuration of the present embodiment is substantially the same as the above-described configuration of the first embodiment, and thus any identical component is denoted by the same reference sign and description of the component is omitted, and any different component will be described below in detail.

Figure 91:
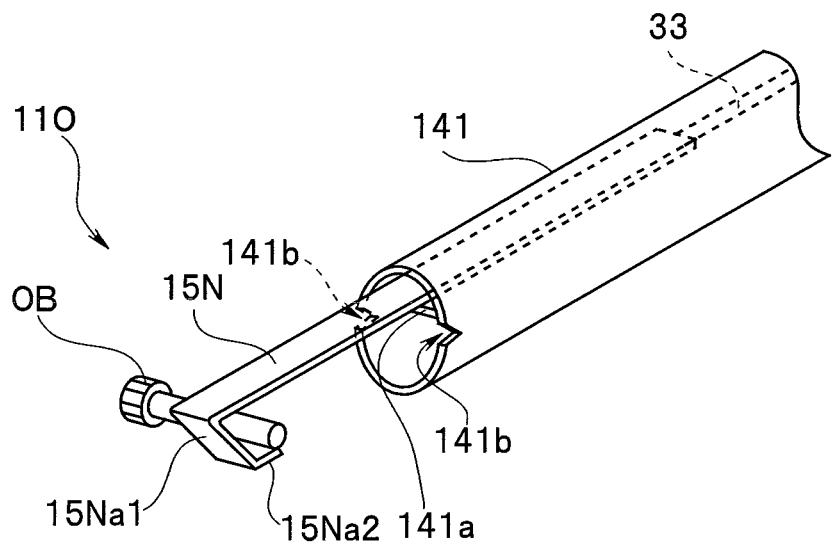
FIG. 91 is a perspective view of a distal end grasping portion of a sixteenth embodiment.
Figure 92:
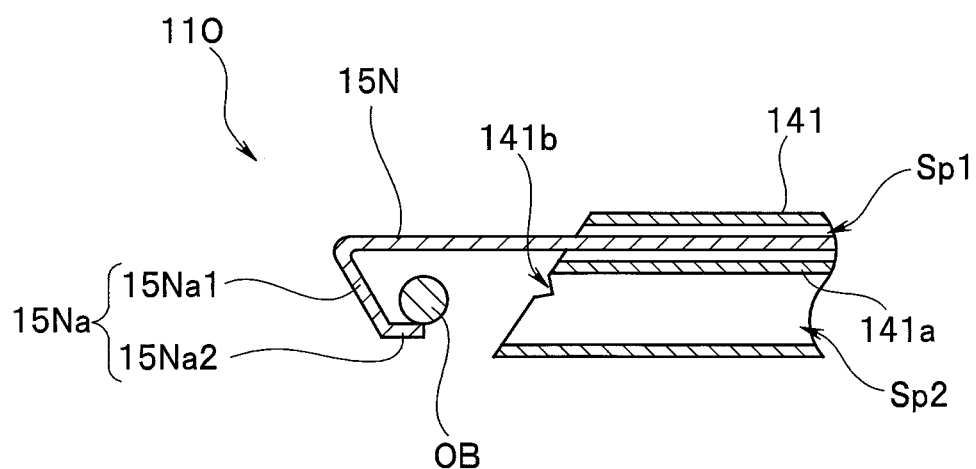
FIG. 92 is a cross-sectional view of the distal end grasping portion of the sixteenth embodiment along the longitudinal axis.

FIG. 91 is a perspective view of a distal end grasping portion 11O according to the present embodiment. FIG. 92 is a cross-sectional view of the distal end grasping portion 11O according to the present embodiment along the longitudinal axis.

An elongated sheath 141 has a cylindrical shape and includes a partition wall 141a in the longitudinal axial direction. A proximal end of the sheath 141 is connected to the operation portion 12. The sheath 141 is made of, for example, Teflon (registered trademark) or stainless steel. Part of a distal end movable member 15N is inserted into a space Sp1 on one side of the partition wall 141a in the sheath 141. The sheath 141 has another space Sp2 different from the space Sp1 into which the distal end movable member 15N is inserted. A cross-sectional area of the space Sp1 orthogonal to a longitudinal axis of the sheath 141 is smaller than a cross-sectional area of the space Sp2.

A distal end of the sheath 141 has an obliquely cut shape as illustrated in FIG. 92. In addition, two cutouts 141b are formed at an edge part of the sheath 141 on the distal end side. As illustrated in FIG. 91, the two cutouts 141b are formed at a tilt portion at the distal end of the sheath 141.

The distal end movable member 15N is a plate member and includes a hook portion 15Na at a distal end. A proximal end of the distal end movable member 15N is fixed to the distal end of the wire 33. The hook portion 15Na has a hook shape bent at two stages. A bending part 15Na1 at the first stage is bent by 90° or more relative to a longitudinal axis of the distal end movable member 15N, and a bending part 15Na2 at the second stage is bent so that a distal end part of the distal end movable member 15N faces in a direction parallel to the longitudinal axis of the distal end movable member 15N. In other words, the distal end part of the distal end movable member 15N is bent twice so that the distal end of the distal end movable member 15N faces to a distal end opening of the sheath 141. The tilt portion at the distal end of the sheath 141 is formed facing inside the hook portion 15Na.

As illustrated in FIG. 92, the partition wall 141a is formed near a central axis of the sheath 141 and along the central axis. The partition wall 141a is formed in the sheath 141 to prevent the distal end movable member 15N from rotating about the longitudinal axis of the distal end movable member 15N in the space Sp1.

Note that, in the present embodiment, the wire 33 is connected at the proximal end of the distal end movable member 15N, but the distal end movable member 15N may be extended to the handle 19 at a proximal end part, and the proximal end part may be fixed to the handle 19.

(Operation)

The examiner inserts the treatment instrument 7 into the channel 4a of the endoscope 2 or externally fixes the treatment instrument 7 to the endoscope 2, and then positions a distal end of the treatment instrument 7 so that the foreign object OB is hooked by the hook portion 15Na of the distal end movable member 15N, while observing inside of an examination object through the endoscope 2.

When the examiner pulls the wire 33 by pulling the handle 19 of the operation portion 12 toward the hand side in the state in which the foreign object OB is hooked by the hook portion 15Na, the foreign object OB moves toward a distal end of the sheath 141. When the foreign object OB contacts the tilt portion at the distal end of the sheath 141, the foreign object OB is sandwiched and grasped between inside of the hook portion 15Na and the tilt portion of the sheath 141 as illustrated in FIG. 92.

Figure 93:
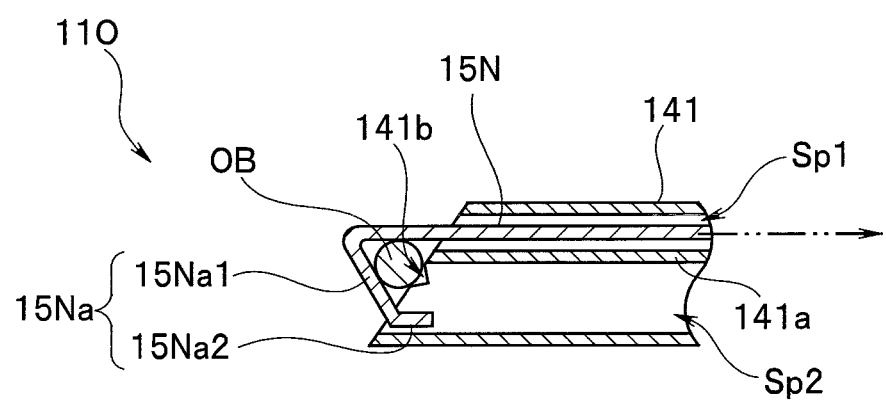
FIG. 93 is a cross-sectional view of the distal end grasping portion of the sixteenth embodiment, illustrating a state in which a foreign object enters two cutouts.

In particular, when the foreign object OB is an object such as an elongated screw as illustrated in FIGS. 91 and 92, the foreign object OB enters the two cutouts 141b and is firmly grasped. FIG. 93 is a cross-sectional view of the distal end grasping portion 11O, illustrating a state in which the foreign object OB enters the two cutouts 141b. In this case, the bending part 15Na2 of the hook portion 15Na enters the space Sp2.

Note that, when the foreign object OB is a soft object, the foreign object OB is grasped so that part of the foreign object OB enters the space Sp2.

Thus, according to the present embodiment, it is possible to achieve, with a simple structure, a treatment instrument that can grasp the foreign object OB and is unlikely to drop the foreign object OB after grasping.

When the treatment instrument 7 of the present embodiment is used in combination with the endoscope 2, the endoscope 2 having a small diameter may be inserted into the space Sp2 of the sheath 141 and positioned at the distal end of the sheath 141, and the foreign object OB may be accessed while inside of an examination object is observed based on an endoscope image. In this case, it is possible to reliably check that the foreign object OB is positioned inside the distal end of the sheath 141 or the space Sp2, while protruding the endoscope 2 from the distal end of the sheath 141 and pulling the endoscope 2 into the sheath 141, which is advantageous.

Seventeenth Embodiment

In the sixteenth embodiment, the foreign object OB is grasped between the hook portion 15Na of the distal end movable member 15N and the tilt portion at the distal end of the sheath 141, but in the present embodiment, the foreign object OB is grasped by a distal end movable member including a plurality of plate members having elasticity and is housed in a tubular member.

A configuration of the present embodiment is substantially the same as the above-described configuration of the first embodiment, and thus any identical component is denoted by the same reference sign and description of the component is omitted, and any different component will be described below in detail.

Figure 94:
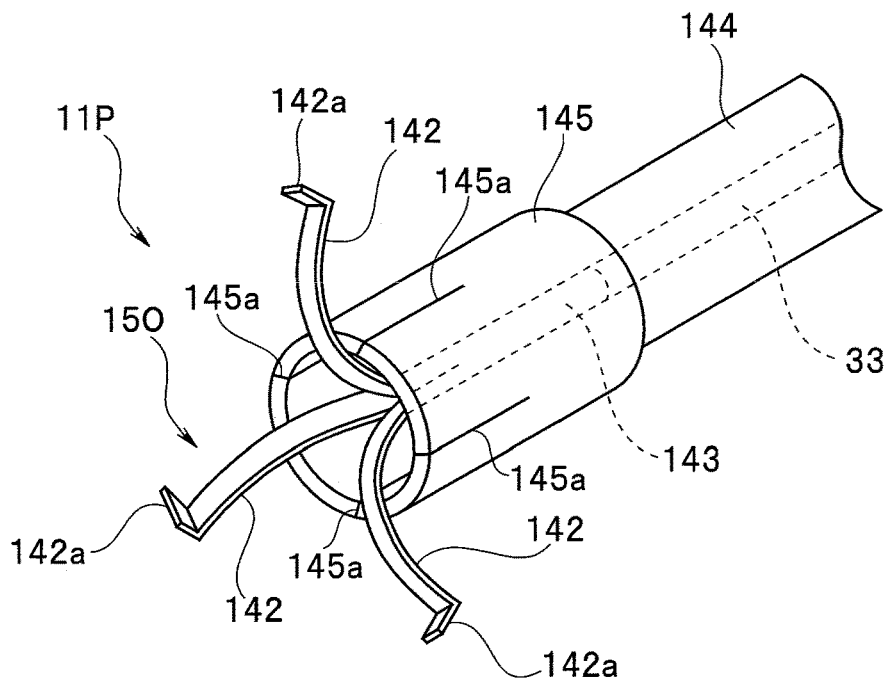
FIG. 94 is a perspective view of a distal end grasping portion of a seventeenth embodiment.

FIG. 94 is a perspective view of a distal end grasping portion 11P of the present embodiment. As illustrated in FIG. 94, a distal end movable member 15O includes a plurality (in this example, three) of arms 142 at a distal end part. In this example, the distal end movable member 15O includes the three arms 142 and a pipe shape portion 143. Each arm 142 has an elongated plate shape. In this example, the three arms 142 are formed by providing, at three places at equal intervals about a longitudinal axis of one pipe member, slits in a longitudinal axial direction of the pipe member from the distal end side of the pipe member and performing fabrication to deform each arm 142 into a substantially flat plate shape, the pipe member being made of metal (for example, stainless steel) and having a cylindrical shape. The three arms 142 serve as the distal end movable member 15O. The pipe shape portion 143 is a proximal end side part of the one cylindrical pipe member where the three slits are not positioned.

Note that, in this example, the three arms 142 and the pipe shape portion 143 are formed of one pipe, but the distal end movable member 15O may be formed by fixing three plate members corresponding to the three arms 142 on the distal end side of a pipe member corresponding to the pipe shape portion 143 by welding or the like. The distal end of the wire 33 is fixed at a proximal end of the pipe shape portion 143 by a bonding agent or the like.

Accordingly, the three arms 142 are disposed in a circumferential direction of the pipe shape portion 143, and the arms 142 are formed to extend from the pipe shape portion 143 in the distal end direction along a longitudinal axis of the pipe shape portion 143. Hook portions 142a bent in the inward radial direction are formed at distal ends of the respective arms 142. The three arms 142 serve as a grasping portion that grasps the foreign object OB. The grasping portion includes three divided plate members at a distal end part and includes the hook portions 142a at distal ends of the respective plate members.

In addition, each arm 142 is provided with a permanent bend to flare at a distal end side part. As illustrated in FIG. 94, the arms 142 are provided with permanent bends so that the three distal end side parts of the three arms 142 are separated from each other. As described later, the three hook portions 142a are formed so that the three hook portions 142a move toward an axial direction of the pipe shape portion 143 (in other words, in the inward radial direction) when the distal end parts of the three arms 142 are closed.

The pipe shape portion 143 of the distal end movable member 15O is inserted into a sheath 144. A proximal end of the sheath 144 is connected to the operation portion 12. The sheath 144 is made of, for example, Teflon (registered trademark) or stainless steel. A tubular member 145 having a cylindrical shape is connected and fixed to a distal end of the sheath 144. The tubular member 145 has flexibility and elasticity. The tubular member 145 is made of, for example, urethane resin. A plurality of slits 145a extending in a central axis direction of the tubular member 145 are formed in the circumferential direction at a distal end side part of the tubular member 145.

As illustrated in FIG. 94, when the handle 19 is operated and the wire 33 is pushed toward the distal end side and positioned outside the tubular member 145, the three arms 142 are opened and separated from each other on the distal end side of the tubular member 145. As described later, the distal end parts of the three arms 142 are closed as the three arms 142 are pulled into the tubular member 145. The three arms 142 move forward and backward inside the sheath 144 in accordance with forward and backward movement of the wire 33.

(Operation)

Figure 95:
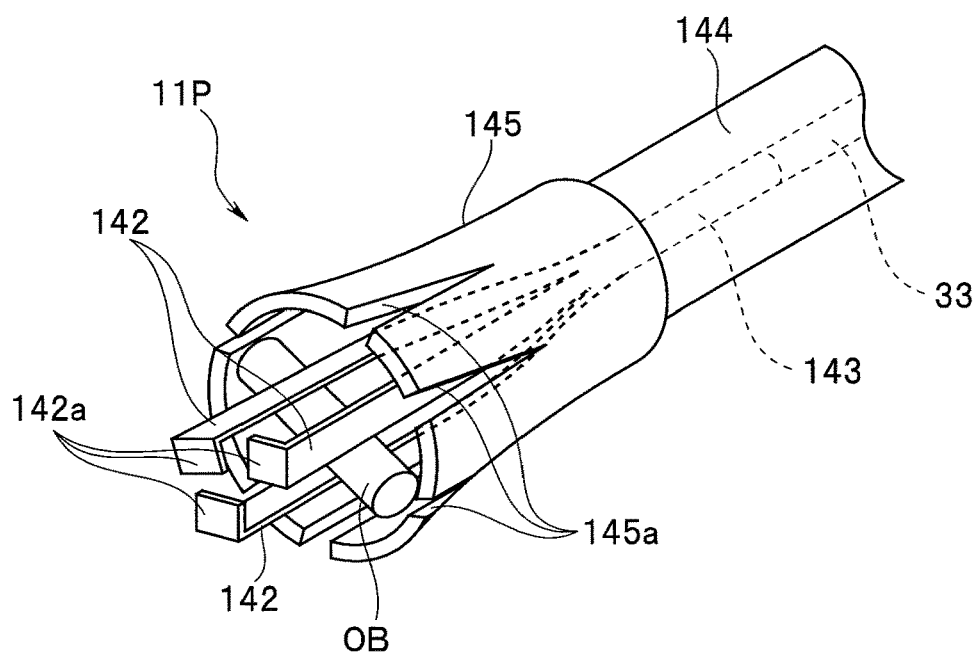
FIG. 95 is a perspective view of the distal end grasping portion of the seventeenth embodiment, illustrating a state in which a foreign object is grasped.

FIG. 95 is a perspective view of the distal end grasping portion 11P of the present embodiment, illustrating a state in which the foreign object OB is grasped. The examiner inserts the treatment instrument 7 into the channel 4a of the endoscope 2 or externally fixes the treatment instrument 7 to the endoscope 2, and then positions the foreign object OB inside the three arms 142 while observing inside of an examination object through the endoscope 2.

When the examiner pulls the wire 33 by moving the handle 19 toward the hand side in the state in which the foreign object OB is positioned inside the three arms 142, the three arms 142 are pulled into the tubular member 145 while being closed. The foreign object OB is grasped inside the three arms 142 by the distal end parts of the three arms 142 when pulled into the tubular member 145.

When the wire 33 is further pulled, the foreign object OB is grasped by the three arms 142 and moved and firmly housed into the tubular member 145 as illustrated in FIG. 95. At a distal end part of the tubular member 145, apart corresponding to the slits 145a is opened by the foreign object OB moved inside. In other words, the diameter of part of the tubular member 145 on the distal end side is increased in accordance with the size of the foreign object OB.

Force that sets back the shape of the part having the increased diameter is generated at the three arms 142, and the tubular member 145 firmly fixes the foreign object OB housed inside by enfolding the foreign object OB.

Thus, according to the present embodiment, when the wire 33 is pulled toward the hand side, the three arms 142 close and grasp the foreign object OB, and then the foreign object OB is firmly fixed and housed in the tubular member 145.

In particular, the three arms 142 grasp the foreign object OB by closing, and thus are less likely to contact an object such as a nearby wall or a floor and can grasp the foreign object OB having a complicate shape, and furthermore, the foreign object OB is housed in the tubular member 145 and thus unlikely to be dropped once grasped.

Note that, in the present embodiment, bending directions of the hook portions 142a at distal ends of the three arms 142 are set to align with an inward radial direction of the pipe shape portion 143, and the positions of the three hook portions 142a are the same in a longitudinal axial direction of the sheath 144, but at least one of the three positions of the three hook portions 142a in the longitudinal axial direction of the sheath 144 may be shifted relative to the positions of the other arms 142 in accordance with the shape and size of the foreign object OB to be grasped. When the position of at least one of the plurality of arms 142 in the longitudinal axial direction of the sheath 144 are shifted from the positions of the other arms 142, the size of a gap among the plurality of arms 142 in a direction orthogonal to the longitudinal axial direction of the sheath 144 at grasping can be reduced to easily grasp the foreign object OB that is smaller.

Eighteenth Embodiment

In the sixteenth embodiment, the foreign object OB is grasped between the hook portion of the distal end movable member and the tilt portion at the distal end of the sheath, but in the present embodiment, the foreign object OB is grasped between a deformable fixation portion and a hook portion of a distal end movable member.

A configuration of the present embodiment is substantially the same as the above-described configurations of the first and sixteenth embodiments, and thus any identical component is denoted by the same reference sign and description of the component is omitted, and any different component will be described below in detail.

Figure 96:
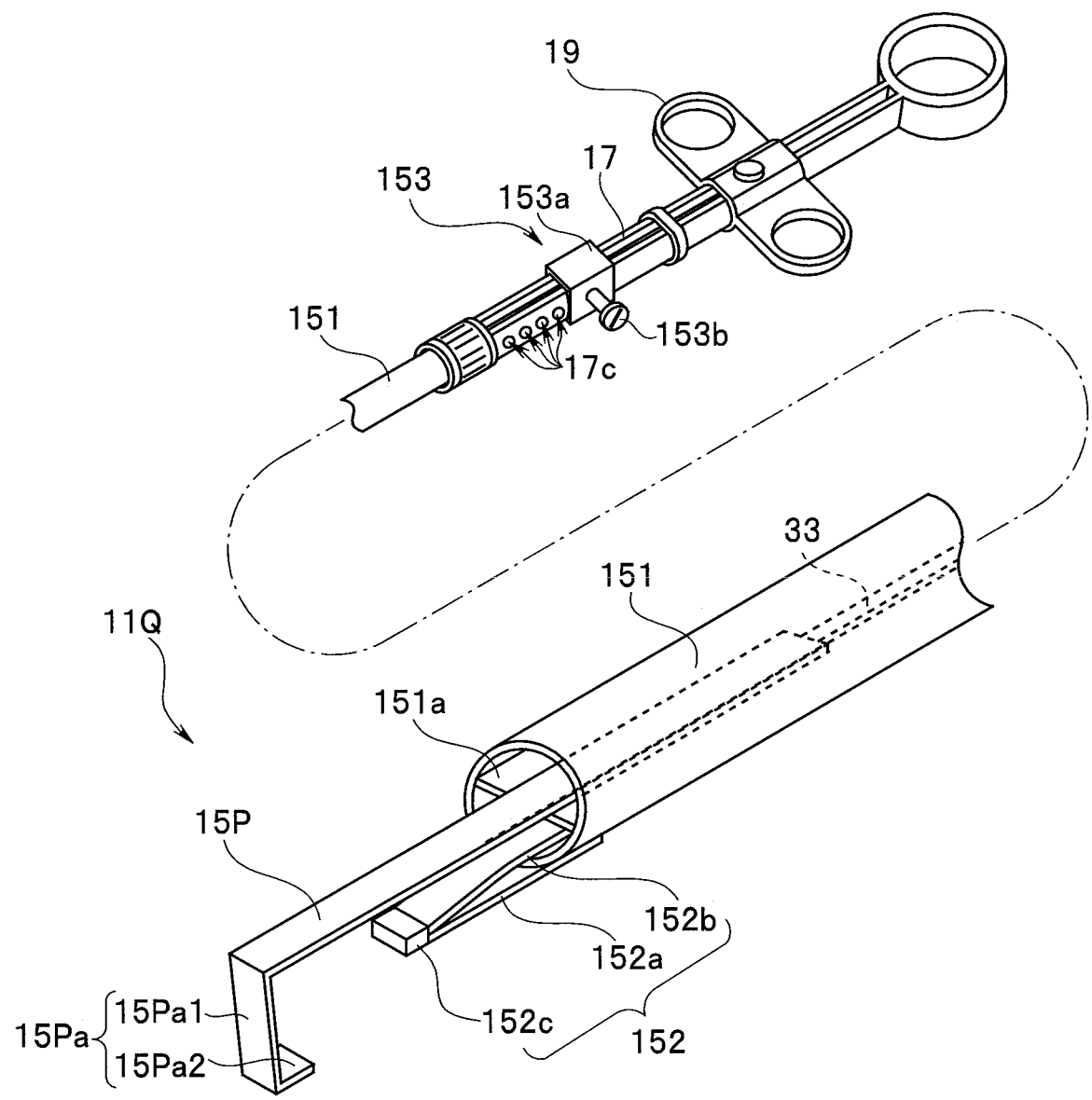
FIG. 96 is a perspective view of a treatment instrument of an eighteenth embodiment.

FIG. 96 is a perspective view of the treatment instrument 7 according to the present embodiment. A lower part of FIG. 96 illustrates a distal end grasping portion 11Q. The treatment instrument 7 includes an elongated sheath 151. The elongated sheath 151 has a cylindrical shape and includes a partition wall 151a in the longitudinal axial direction. A proximal end of the sheath 151 is connected to the operation portion 12. The sheath 151 is made of, for example, Teflon (registered trademark) or stainless steel. A distal end movable member 15P is inserted into a space Sp1 on one side of the partition wall 151a in the sheath 151.

The distal end movable member 15P is a plate member and includes a hook portion 15Pa at a distal end part. A proximal end of the distal end movable member 15P is connected to the distal end of the wire 33. Accordingly, the examiner can move the distal end movable member 15P forward and backward along the longitudinal axis by moving the handle 19 of the operation portion 12 forward and backward. The hook portion 15Pa has a hook shape bent at two stages. In other words, the distal end movable member 15N includes the hook portion 15Pa at a distal end. A bending part 15Pa1 at the first stage is bent at right angle relative to the longitudinal axis of the distal end movable member 15P, and a bending part 15Pa2 at the second stage is bent at right angle relative to the bending part 15Pa1 at the first stage so that a distal end of the distal end movable member 15P faces in a direction parallel to the longitudinal axis of the distal end movable member 15P. In other words, the distal end part of the distal end movable member 15P is bent twice so that the distal end of the distal end movable member 15P faces to the proximal end side.

In addition, a fixation portion 152 is provided at a distal end of the sheath 151. The fixation portion 152 includes a support plate 152a and a movable plate 152b. The sheath 151 has another space Sp2 different from the space Sp1 into which the distal end movable member 15P is inserted. The spaces Sp1 and Sp2 are divided from each other by the partition wall 151a. The movable plate 152b having a plate shape is inserted into the space Sp2. The support plate 152a is a plate member made of metal (for example, stainless steel) and has elasticity. A proximal end portion of the support plate 152a is fixed to an outer peripheral surface of a distal end part of the sheath 151 by bonding, welding, or the like so that a longitudinal axis of the support plate 152a is parallel to a longitudinal axis of the sheath 151. A distal end of the support plate 152a is fixed to a distal end of the movable plate 152b by a connection pipe sleeve 152c. The movable plate 152b is an elongated plate member made of metal (for example, stainless steel) and has elasticity. The movable plate 152b is inserted into the sheath 151 and extended to the operation portion 12.

The connection pipe sleeve 152c is, for example, a metal member having a rectangular tubular shape (or bottomed rectangular tubular shape) and holds a distal end part of the support plate 152a and a distal end part of the movable plate 152b inside. For example, the distal end part of the support plate 152a and the distal end part of the movable plate 152b are fixed to the connection pipe sleeve 152c by fitting the distal end part of the support plate 152a and the distal end part of the movable plate 152b into the connection pipe sleeve 152c and then swaging the distal end part of the support plate 152a and the distal end part of the movable plate 152b by external force.

The operation portion 12 of the treatment instrument 7 of the present embodiment includes the handle 19 connected to the wire 33, and a fixation-portion positioning portion 153. The fixation-portion positioning portion 153 includes a positioning member 153a and a position fixation pin 153b. The pin 153b is, for example, a bar-shaped member but may be a screw.

A proximal end of the movable plate 152b is fixed inside the positioning member 153a by welding, bonding, or the like.

The positioning member 153a has such a shape that the positioning member 153a is slidable along the longitudinal axis of the operation main body member 17 on an outer peripheral surface of the operation main body member 17. The positioning member 153a has, for example, an angled-U shape as illustrated in FIG. 96, and the operation main body member 17 can be disposed inside the angled-U shape. Note that the positioning member 153a may have a cylindrical shape surrounding an outer peripheral portion of the operation main body member 17.

A plurality of holes 17c are formed in the operation main body member 17 along the longitudinal axis of the operation main body member 17. A distal end part of the above-described pin 153b, which is pushed from outside the positioning member 153a toward inside, can be fitted into each hole 17c. Accordingly, the position of the positioning member 153a in a longitudinal axial direction of the operation main body member 17 is changed when a hole 17c into which the pin 153b is fitted is changed.

(Operation)

When having found the foreign object OB, the examiner changes a necessary bending shape of the fixation portion 152 or a necessary tilt of the distal end part of the movable plate 152b in accordance with the size or shape of the foreign object OB to be grasped. For example, a protrusion amount of the movable plate 152b from a distal end opening of the sheath 151 in the distal end direction is largest when the pin 153b is fitted into a hole 17c at a position closest to the distal end side among the plurality of holes 17c in the operation main body member 17. The protrusion amount of the movable plate 152b from the distal end opening of the sheath 151 in the distal end direction is smallest when the pin 153b is fitted into a hole 17c at a position closest to the proximal end side among the plurality of holes 17c in the operation main body member 17. When the pin 153b is fitted into none of the holes 17c, the movable plate 152b extends straight as illustrated in FIG. 96 by the elasticity of the movable plate 152b.

Figure 97:
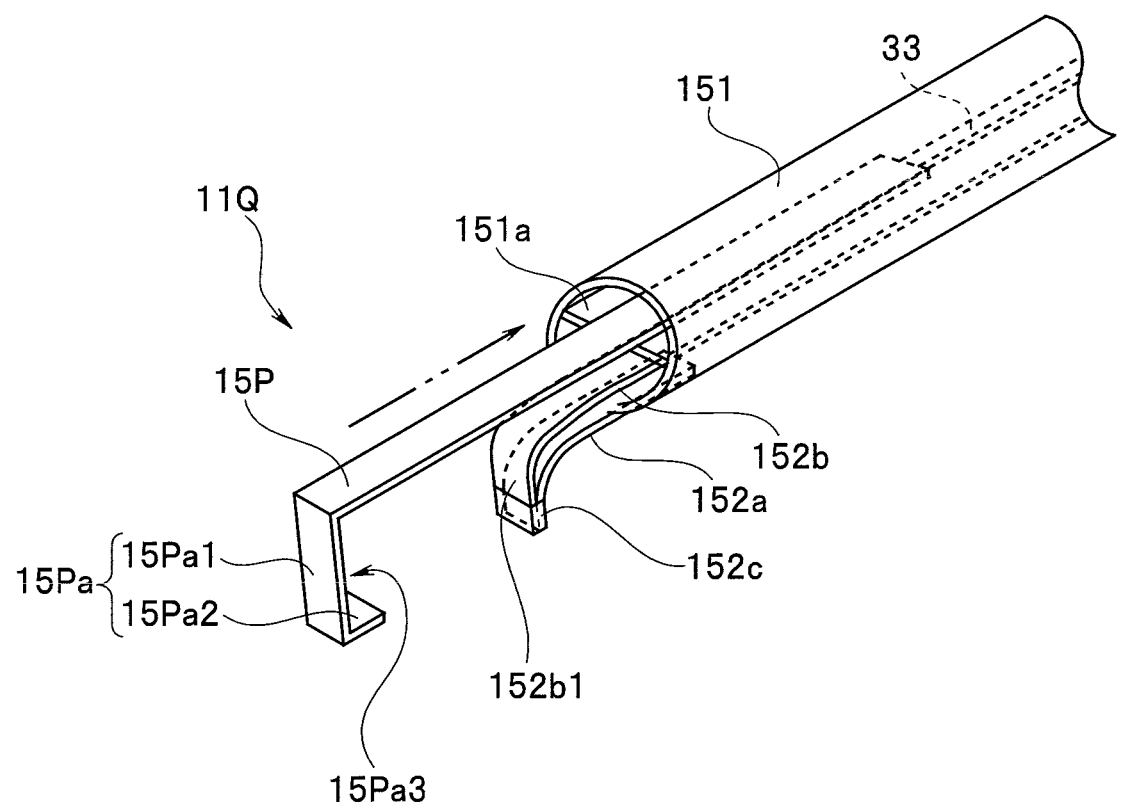
FIG. 97 is a diagram illustrating an example of a state in which a fixation portion is deformed of the eighteenth embodiment.

FIG. 97 is a diagram illustrating an example of the distal end grasping portion 11Q in a state in which the fixation portion 152 is deformed. FIG. 97 illustrates a state in which the support plate 152a and the movable plate 152b have deformed as a result of protrusion of the movable plate 152b in the distal end direction and the connection pipe sleeve 152c has moved in a direction departing from the distal end movable member 15P.

As the movable plate 152b is pushed to the distal end side of the sheath 151, the distal end of the movable plate 152b pushes the connection pipe sleeve 152c in the distal end direction. However, since the connection pipe sleeve 152c is fixed to the distal end of the support plate 152a, the connection pipe sleeve 152c at the distal end of the movable plate 152b moves in an outward radial direction of the sheath 151.

As illustrated in FIG. 97, the fixation portion 152 bends as the movable plate 152b is pushed in the distal end direction. A bending shape of the fixation portion 152 changes in accordance with a pushing amount of the movable plate 152b. Thus, the fixation portion 152 largely bends when the pushing amount of the movable plate 152b is large. When the fixation portion 152 bends, a surface 152b1 of the movable plate 152b faces a proximal end side surface 15Pa3 of the hook portion 15Pa of the distal end movable member 15P. The pushing amount of the movable plate 152b is changeable depending on the position of the positioning member 153a in the longitudinal axial direction of the operation main body member 17. As the pushing amount of the movable plate 152b increases, the area of the surface 152b1 facing the proximal end side surface 15Pa3 of the hook portion 15Pa of the distal end movable member 15P increases or the tilt of the surface 152b1 of the movable plate 152b relative to a central axis of the sheath 151 increases.

Thus, the examiner adjusts a bending amount of the fixation portion 152 by adjusting the pushing amount of the movable plate 152b in accordance with the size of the foreign object OB. Then, when the handle 19 is operated to move the distal end movable member 15P toward the proximal end side as illustrated with a dashed and double-dotted line while the foreign object OB is positioned between the hook portion 15Pa and the fixation portion 152, the foreign object OB can be firmly grasped between the hook portion 15Pa and the fixation portion 152.

According to the present embodiment, the bending shape of the fixation portion 152 or the tilt of the distal end part of the movable plate 152b can be changed in accordance with the size or shape of the foreign object OB, and thus various kinds of foreign objects can be easily grasped.

Nineteenth Embodiment

With the treatment instrument of the eighteenth embodiment, the foreign object OB positioned on a side of the treatment instrument 7 can be grasped between the hook portion 15Pa and the fixation portion 152 of the distal end movable member, but a treatment instrument of the present embodiment not only can grasp the foreign object OB on a side of the treatment instrument 7 but also can hold the foreign object OB on a front side of the treatment instrument 7.

A configuration of the present embodiment is substantially the same as the above-described configurations of the first and eighteenth embodiments, and thus any identical component is denoted by the same reference sign and description of the component is omitted, and any different component will be described below in detail.

Figure 98:
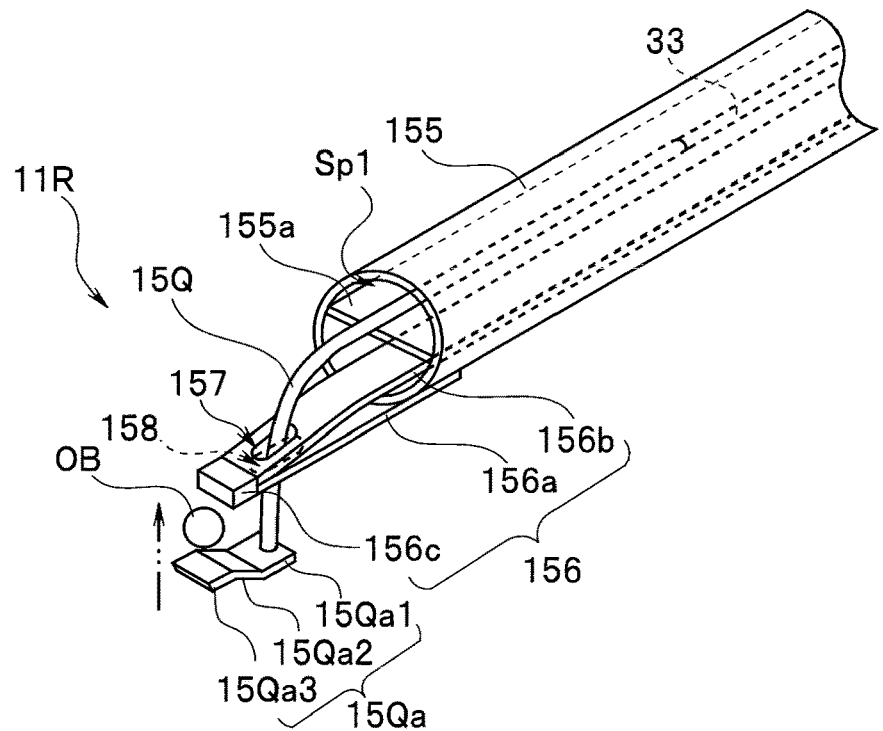
FIG. 98 is a perspective view of a distal end grasping portion of a nineteenth embodiment.

FIG. 98 is a perspective view of a distal end grasping portion 11R according to the present embodiment. An elongated sheath 155 has a cylindrical shape and includes a partition wall 155a in the longitudinal axial direction. A proximal end of the sheath 155 is connected to the operation portion 12. The sheath 155 is made of, for example, Teflon (registered trademark) or stainless steel. A distal end movable member 15Q is inserted into a space Sp1 on one side of the partition wall 155a in the sheath 155. The partition wall 155a is formed in the sheath 155 to prevent the distal end movable member 15Q having a plate shape from rotating about a longitudinal axis of the distal end movable member 15Q in the space Sp1.

The distal end movable member 15Q is a wire and includes a movable portion 15Qa at a distal end. A proximal end of the distal end movable member 15Q is fixed to the distal end of the wire 33. Accordingly, the examiner can move the distal end movable member 15Q forward and backward in the longitudinal axial direction by moving the handle 19 forward and backward. Note that the distal end movable member 15Q may be the distal end part of the wire 33.

The movable portion 15Qa of the distal end movable member 15Q is a plate member and includes a connection portion 15Qa1, a tilt portion 15Qa2, and a grasping portion 15Qa3. The connection portion 15Qa1 is a part connected and fixed to the distal end of the distal end movable member 15Q. The tilt portion 15Qa2 is a part between the connection portion 15Qa1 and the grasping portion 15Qa3 and is a part tilted at a predetermined angle relative to a surface of the connection portion 15Qa1 and a surface of the grasping portion 15Qa3.

A fixation portion 156 is provided and fixed to a distal end of the sheath 155. The fixation portion 156 includes a support plate 156a and a movable plate 156b. The sheath 155 has another space Sp2 different from the space Sp1 into which the distal end movable member 15Q is inserted. The spaces Sp1 and Sp2 are divided from each other by the partition wall 155a. The movable plate 156b having a plate shape is inserted into the space Sp2. The support plate 156a is a plate member made of metal (for example, stainless steel) and has elasticity. One end of the support plate 156a is fixed to an outer peripheral surface of a distal end part of the sheath 155 by bonding, welding, or the like so that a longitudinal axis of the support plate 156a is parallel to a longitudinal axis of the sheath 155. A distal end of the support plate 156a is fixed to a distal end of the movable plate 156b by a connection pipe sleeve 156c. The movable plate 156b is an elongated plate member made of metal (for example, stainless steel) and has elasticity. The movable plate 156b is inserted into the sheath 155 and extended to the operation portion 12.

The connection pipe sleeve 156c is, for example, a metal member having a rectangular tubular shape (or bottomed rectangular tubular shape) and holds a distal end part of the support plate 156a and a distal end part of the movable plate 156b inside. For example, the distal end part of the support plate 156a and the distal end part of the movable plate 156b are fixed to the connection pipe sleeve 156c by fitting the distal end part of the support plate 156a and the distal end part of the movable plate 156b into the connection pipe sleeve 156c and then swaging the distal end part of the support plate 156a and the distal end part of the movable plate 156b into the connection pipe sleeve 156c by external force.

A hole 157 is formed near the connection pipe sleeve 156c at the distal end part of the support plate 156a. A hole 158 is formed near the connection pipe sleeve 156c at the distal end part of the movable plate 156b. The two holes 157 and 158 have sizes with which the distal end movable member 15Q can be inserted into the holes 157 and 158.

The operation portion 12 of the treatment instrument 7 of the present embodiment includes the handle 19 connected to the wire 33, and the fixation-portion positioning portion 153 (FIG. 96). A proximal end of the movable plate 156b is fixed inside the positioning member 153a by welding, bonding, or the like.

(Operation)

The examiner inserts the treatment instrument 7 into the channel 4a of the endoscope 2 or externally fixes the treatment instrument 7 to the endoscope 2, and then changes the shape of the fixation portion 156 in accordance with the position of the foreign object OB to be grasped when having found the foreign object OB while observing inside of an examination object through the endoscope 2. When the foreign object OB is to be grasped on a front side of the treatment instrument 7, one hole 17c to which the pin 153b is to be fitted is selected so that a longitudinal axis of the movable plate 156b is substantially parallel to the longitudinal axis of the sheath 155 as illustrated in FIG. 98. When the foreign object OB is to be grasped on a side of the treatment instrument 7, one hole 17c to which the pin 153b is to be fitted is selected so that the distal end part of the movable plate 156b is substantially orthogonal to the longitudinal axis of the sheath 155 as illustrated in FIG. 99.

Figure 99:
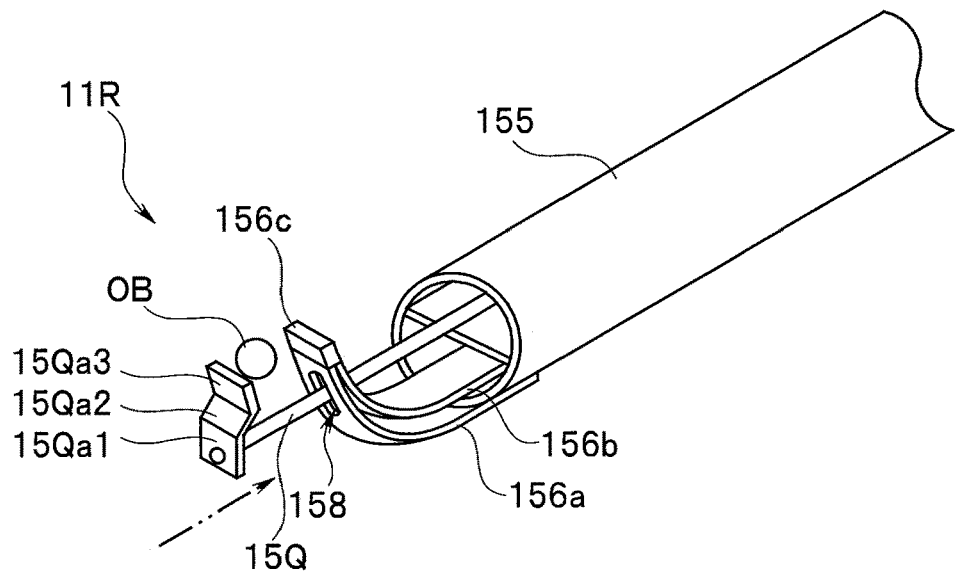
FIG. 99 is a perspective view of the distal end grasping portion of the nineteenth embodiment in a state in which a movable plate is pulled in the proximal end direction.

FIG. 99 is a perspective view of the distal end grasping portion 11R of the present embodiment in a state in which the movable plate 156b is pulled in the proximal end direction.

In the state illustrated in FIG. 98, when the handle 19 is pulled toward the hand side, the movable portion 15Qa moves toward the support plate 156a and the connection pipe sleeve 156c as illustrated with a dashed and double-dotted line. As a result, the foreign object OB on the front side of the treatment instrument 7 is grasped between the grasping portion 15Qa3 of the movable portion 15Qa and the support plate 156a or the connection pipe sleeve 156c.

In the state illustrated in FIG. 99, when the handle 19 is pulled toward the hand side, the movable portion 15Qa moves toward the support plate 156a and the connection pipe sleeve 156c as illustrated with a dashed and double-dotted line. As a result, the foreign object OB on a side of the treatment instrument 7 is grasped between the grasping portion 15Qa3 of the movable portion 15Qa and the support plate 156a or the connection pipe sleeve 156c.

Note that the fixation portion 156 can be bent so that the foreign object OB obliquely on the front side can be grasped, depending on selection of a hole 17c to which the pin 153b is fitted.

According to the present embodiment, postures of the movable portion 15Qa and the fixation portion 156 can be changed when the foreign object OB is to be grasped, and thus the foreign object OB can be easily collected.

Twentieth Embodiment

In the treatment instrument of the sixteenth embodiment, only the distal end movable member moves toward the proximal end side and the foreign object OB is grasped between the hook portion 15Na of the distal end movable member that moves and a distal end portion of the sheath 141, but in a treatment instrument of the present embodiment, a hook portion of a distal end movable member moves toward the proximal end side and a distal end fixation portion facing the hook portion moves toward the distal end side, and accordingly, the foreign object OB is grasped between the hook portion and the distal end fixation portion.

A configuration of the present embodiment is substantially the same as the above-described configuration of the first embodiment, and thus any identical component is denoted by the same reference sign and description of the component is omitted, and any different component will be described below in detail.

Figure 100:
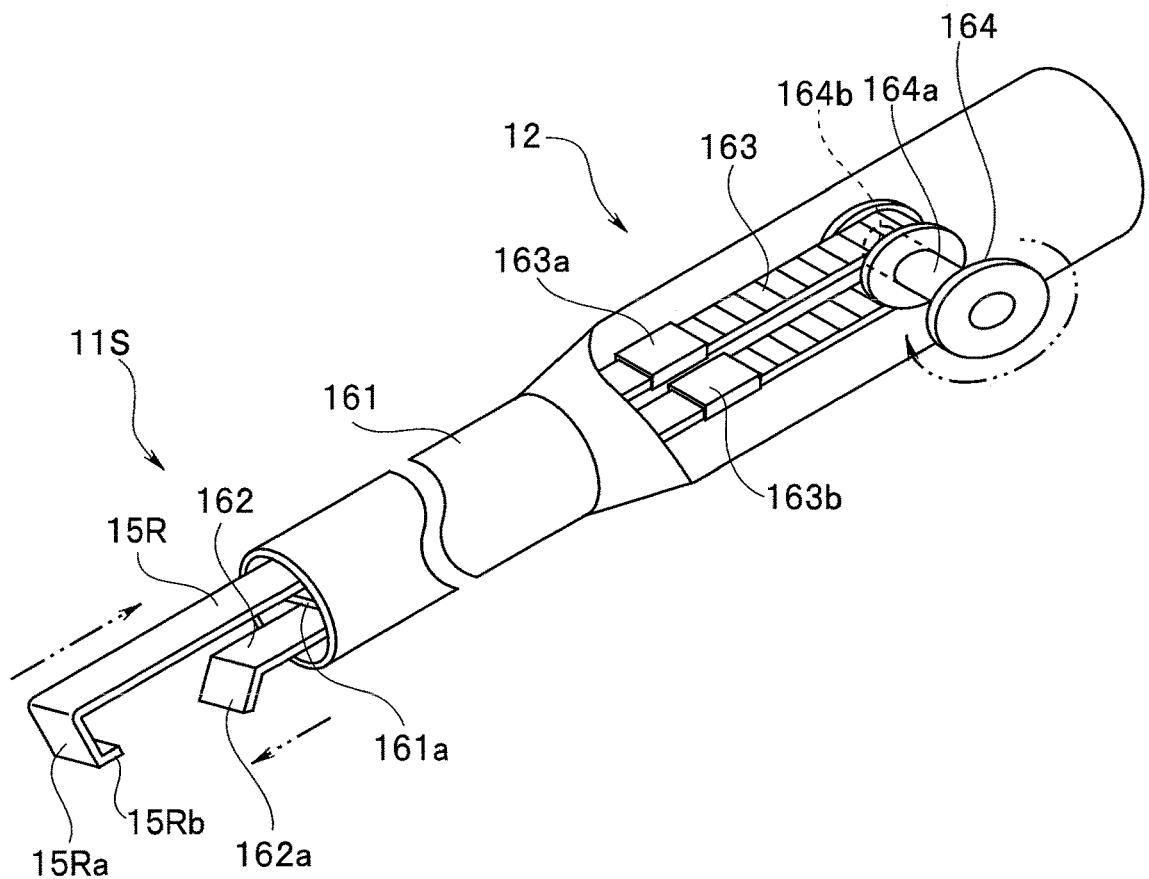
FIG. 100 is a perspective view of a treatment instrument of a twentieth embodiment.

FIG. 100 is a perspective view of a treatment instrument of the present embodiment. The treatment instrument 7 includes an elongated sheath 161, and the operation portion 12 provided at a proximal end of the sheath 161. A distal end grasping portion 11S is provided at a distal end of the sheath 161. The elongated sheath 161 has a cylindrical shape and includes a partition wall 161a in the longitudinal axial direction inside. The proximal end of the sheath 161 is connected to the operation portion 12. The sheath 161 is made of, for example, Teflon (registered trademark) or stainless steel. A distal end movable member 15R is inserted into a space Sp1 on one side of the partition wall 161a in the sheath 161. The sheath 161 has another space Sp2 different from the space Sp1 in which the distal end movable member 15R is inserted. A distal end fixation member 162 having a plate shape is inserted into the space Sp2. The distal end fixation member 162 is a movement member that moves in the distal end direction when the foreign object OB is to be grasped as described later.

The partition wall 161a is formed in the sheath 161 to prevent the distal end movable member 15R having a plate shape and the distal end fixation member 162 having a plate shape from rotating about a longitudinal axis of the distal end movable member 15R and a longitudinal axis of the distal end fixation member 162, respectively, in the spaces Sp1 and Sp2.

The distal end movable member 15R is a plate member. A proximal end of the distal end movable member 15R is fixed to one end of a chain 163 by a connection clasp 163a. A proximal end of the distal end fixation member 162 is fixed to the other end of the chain 163 by a connection clasp 163b.

The distal end fixation member 162 is a plate member and includes a tilt portion 162a at a distal end part. The tilt portion 162a is a part bent at an angle smaller than 90° relative to the longitudinal axis of the distal end fixation member 162.

A distal end part of the distal end movable member 15R has a hook shape bent at two stages. Specifically, the distal end movable member 15R includes a hook portion 15Ra at a distal end. A bending part 15Ra1 at the first stage is bent by 90° or more relative to the longitudinal axis of the distal end movable member 15R, and a bending part 15Ra2 at the second stage is bent so that the distal end of the distal end movable member 15R faces to the distal end of the sheath 161. In other words, the distal end part of the distal end movable member 15R is bent twice so that the distal end of the distal end movable member 15R faces to a distal end opening of the sheath 161. The tilt portion 162a is formed facing inside the hook portion 15Ra.

The chain 163 is meshed with a gear 164b attached to a rotation shaft 164a of an operation handle 164 of the operation portion 12. As the operation handle 164 is operated and rotated about an axis of the rotation shaft 164a, the chain 163 pushes the distal end movable member 15R in the distal end direction and pulls the distal end fixation member 162 in the proximal end direction, or pulls the distal end movable member 15R in the proximal end direction and pushes the distal end fixation member 162 in the distal end direction, in accordance with the rotation.

(Operation)

The examiner inserts the treatment instrument 7 into the channel 4a of the endoscope 2 or externally fixes the treatment instrument 7 to the endoscope 2, and then positions the distal end of the treatment instrument 7 so that the foreign object OB to be collected is hooked by the hook portion 15Ra of the distal end movable member 15R, when having found the foreign object OB while observing inside of an examination object through the endoscope 2.

The chain 163 moves as the examiner rotates the operation handle 164 in a direction illustrated with a dashed and double-dotted line. In accordance with the movement of the chain 163, the distal end movable member 15R moves in the proximal end direction and the distal end fixation member 162 moves in the distal end direction. Since the proximal end of the distal end movable member 15R and the proximal end of the distal end fixation member 162 are connected to both ends of the chain 163, the movement of the distal end movable member 15R in the distal end direction coordinates with the movement of the distal end fixation member 162 in the proximal end direction.

Accordingly, the foreign object OB is sandwiched and grasped between the hook portion 15Ra and the tilt portion 162a. In particular, since the distal end fixation member 162 moves as well, a moving amount of the distal end movable member 15R decreases and thus the examiner is less likely to fail to grasp.

Figure 101:
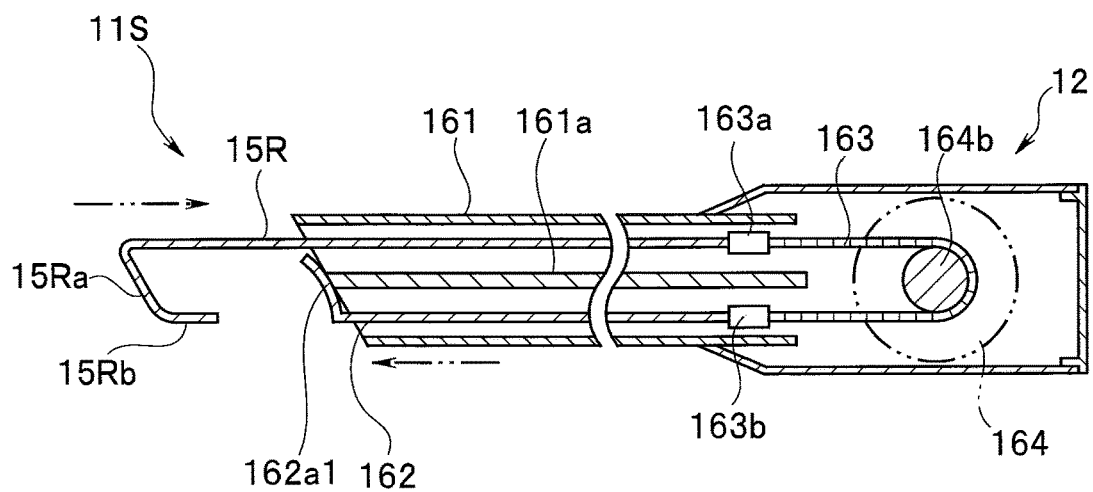
FIG. 101 is a cross-sectional view of a distal end grasping portion according to a modification of the twentieth embodiment along the longitudinal axis.

Note that, in FIG. 100, the tilt portion 162a is tilted in a direction opposite to the distal end movable member 15R with respect to the longitudinal axis of the distal end fixation member 162, but as illustrated in FIG. 101, a tilt portion 162a1 may be tilted on a side closer to the distal end movable member 15R with respect to the longitudinal axis of the distal end fixation member 162. FIG. 101 is a cross-sectional view of the distal end grasping portion 11S according to a modification of the present embodiment along the longitudinal axis. A distal end side surface of the tilt portion 162a1 may have a concave shape in the distal end direction in FIG. 101. With the concave shape of the distal end side surface of the tilt portion 162a1, the foreign object OB can be firmly grasped.

Twenty-First Embodiment

In the treatment instrument of the sixteenth embodiment, the distal end movable member is a plate member and includes the hook portion 15Na at a distal end, but in a treatment instrument of the present embodiment, a distal end movable member includes a coil of a circular cone shape at a distal end so that the foreign object OB is grasped between the coil of the circular cone shape and a distal end fixation portion.

A configuration of the present embodiment is substantially the same as the above-described configurations of the first and eighteenth embodiments, and thus any identical component is denoted by the same reference sign and description of the component is omitted, and any different component will be described below in detail.

Figure 102:
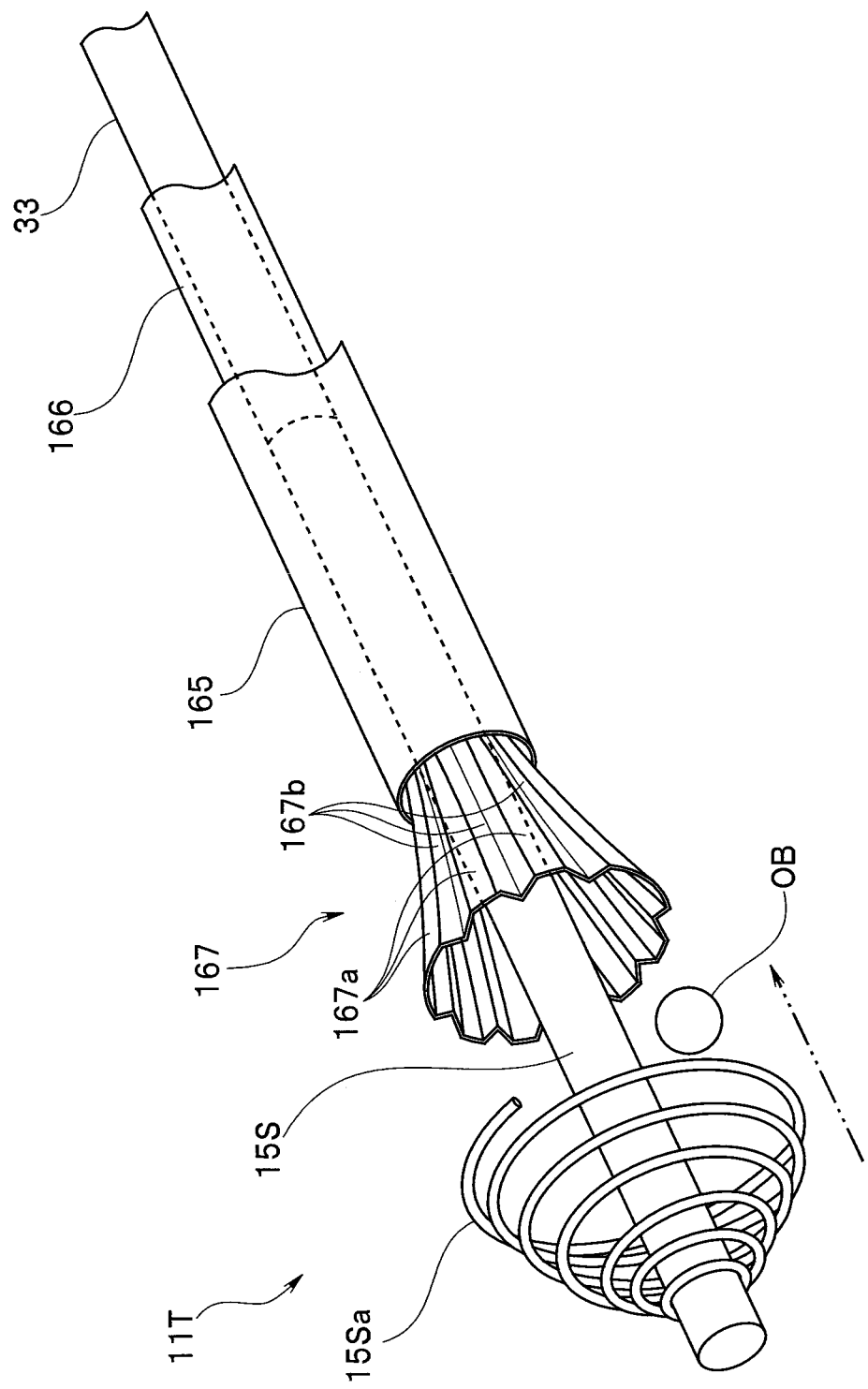
FIG. 102 is a perspective view of a distal end grasping portion of a treatment instrument of a twenty-first embodiment.

FIG. 102 is a perspective view of a distal end grasping portion 11T of the treatment instrument 7 of the present embodiment. The treatment instrument 7 includes an elongated sheath 165. A proximal end of the sheath 165 is connected to the operation portion 12. The elongated sheath 165 has a cylindrical shape. The sheath 165 is made of, for example, Teflon (registered trademark) or stainless steel.

A distal end movable member 15S is a wire having elasticity. A coil 15Sa having an umbrella shape is attached and fixed to a distal end of the distal end movable member 15S. The coil 15Sa is made of elastic metal such as stainless steel and has a substantially circular cone shape. The coil 15Sa is provided at the distal end of the distal end movable member 15S so that inner and outer diameters of the coil 15Sa are smaller on the distal end side and larger on the proximal end side. In other words, the coil 15Sa is attached to the distal end movable member 15S so that the apex of a circular cone is positioned on the distal end side of the distal end movable member 15S.

A proximal end of the distal end movable member 15S is connected to the distal end of the wire 33 by bonding, welding, or the like. The proximal end of the wire 33 is connected to the handle 19 illustrated in FIG. 96. The examiner can move the distal end movable member 15S forward and backward along the longitudinal axis by moving the handle 19 of the operation portion 12 forward and backward.

A pipe 166 is inserted into the sheath 165. The distal end movable member 15S and the wire 33 are inserted into the pipe 166. The pipe 166 is made of resin, stainless steel, or the like and has elasticity and flexibility. A distal end part of the pipe 166 includes an increased-diameter portion 167 as a distal end fixation member.

The increased-diameter portion 167 may be formed by fabricating the distal end part of the pipe 166 or may be another member connected and fixed to a distal end of the pipe 166 by bonding, welding, or the like.

The increased-diameter portion 167 includes a plurality of strip shape parts 167a. For example, the plurality of strip shape parts 167a are parts formed by providing slits along a longitudinal axis of the pipe 166 to the distal end part of the pipe 166, and provided in the circumferential direction. In addition, each strip shape part 167a is provided with a permanent bend that flares in the outward radial direction. A plurality of flexible resin members 167b are fixed between the plurality of strip shape parts 167a by bonding or the like to fill gaps between the plurality of strip shape parts 167a being spread. In other words, each resin member 167b is attached between two adjacent strip shape parts 167a while the strip shape parts 167a are bent by the permanent bends.

When housed in the sheath 165, the increased-diameter portion 167 is closed like folding an umbrella. Outside the sheath 165, the increased-diameter portion 167 has a shape like a horn.

A proximal end of the pipe 166 is fixed to the fixation-portion positioning portion 153 illustrated in FIG. 96. Accordingly, the examiner can adjust the position of the pipe 166 relative to the sheath 165 in the longitudinal axial direction by changing the position of the pin 153b relative to the positioning member 153a.

A distal end part of the increased-diameter portion 167 opens when the increased-diameter portion 167 protrudes from a distal end opening of the sheath 165. FIG. 102 illustrates a state in which the increased-diameter portion 167 protrudes from the distal end opening of the sheath 165 and the distal end part of the increased-diameter portion 167 opens.

The increased-diameter portion 167 is an elastic member provided with such a permanent bend that a distal end side part opens in a natural state. Accordingly, the increased-diameter portion 167 being housed in the sheath 165 opens when moved out of the sheath 165.

The examiner can protrude the increased-diameter portion 167 from the distal end opening of the sheath 165 or house the increased-diameter portion 167 inside a distal end portion of the sheath 165 by changing a hole 17c into which the pin 153b of the fixation-portion positioning portion 153 illustrated in FIG. 96 is fitted.

(Operation)

The examiner inserts the treatment instrument 7 into the channel 4a of the endoscope 2 or externally fixes the treatment instrument 7 to the endoscope 2, and then positions the distal end of the treatment instrument 7 so that the foreign object OB to be collected is hooked by the coil 15Sa of the distal end movable member 15S, when having found the foreign object OB while observing inside of an examination object through the endoscope 2.

The examiner operates the fixation-portion positioning portion 153 to push the pipe 166 in the distal end direction and open the increased-diameter portion 167.

The coil 15Sa moves toward the proximal end side as illustrated with a dashed and double-dotted line when the handle 19 is moved toward the proximal end side while the increased-diameter portion 167 is opened. The foreign object OB is sandwiched between the increased-diameter portion 167 and the coil 15Sa and housed inside the increased-diameter portion 167 and the coil 15Sa.

In this manner, the foreign object OB can be housed inside the coil 15Sa and the increased-diameter portion 167 and grasped and collected with stable grasping force.

Twenty-Second Embodiment

In a treatment instrument of the twenty-first embodiment, the coil 15Sa is provided at the distal end of the distal end movable member 15S, and the increased-diameter portion 167 that can protrude is provided at a distal end of the sheath 165, but in a treatment instrument of the present embodiment, a plate member is provided at a distal end of a distal end movable member and an increased-diameter portion is provided at a distal end of a sheath so that the foreign object OB is grasped between the plate member and the increased-diameter portion.

A configuration of the present embodiment is substantially the same as the above-described configurations of the first, eighteenth, and twenty-first embodiments, and thus any identical component is denoted by the same reference sign and description of the component is omitted, and any different component will be described below in detail.

Figure 103:
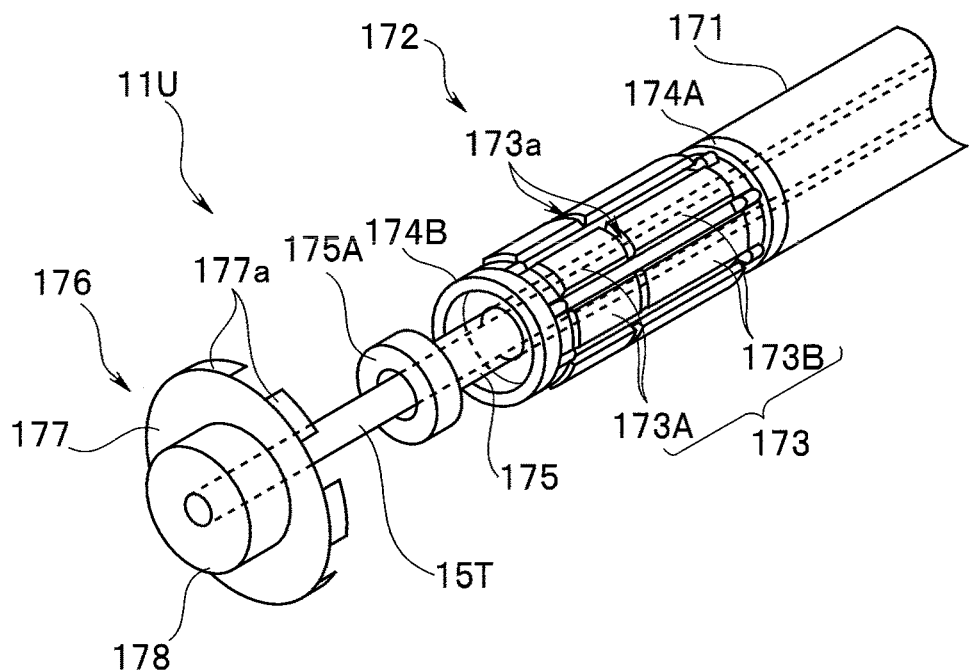
FIG. 103 is a perspective view of a distal end grasping portion of a treatment instrument of a twenty-second embodiment.

FIG. 103 is a perspective view of the distal end grasping portion 11U of the treatment instrument 7 of the present embodiment. The treatment instrument 7 includes an elongated sheath 171. A proximal end of the sheath 171 is connected to the operation portion 12. The elongated sheath 171 has a cylindrical shape. The sheath 171 is made of, for example, Teflon (registered trademark) or stainless steel.

An increased-diameter portion 172 is provided at a distal end of the sheath 171. The increased-diameter portion 172 includes a plurality (in this example, eight) plate members 173 and two caps 174A and 174B. The plate members 173 and the two caps 174A and 174B are made of resin or metal such as stainless steel. FIG. 103 illustrates a state in which the increased-diameter portion 172 is closed. In the state in which the increased-diameter portion 172 is closed, longitudinal axes of the plurality (in this example, eight) of plate members 173 are parallel to a longitudinal axis of the sheath 171.

Figure 104:
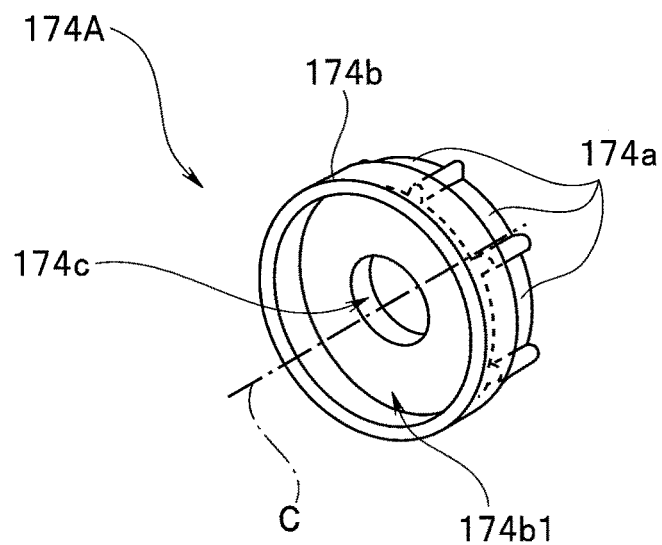
FIG. 104 is a perspective view of a cap of the twenty-second embodiment.

FIG. 104 is a perspective view of the cap 174A. The caps 174A and 174B have the same structure and the same shape, and thus the structure and shape of the cap 174A will be described below. The cap 174A has a ring shape. The cap 174A has a plurality (eight) of recesses 174a at an outer peripheral portion on one side in a direction of a central axis C of the cap 174A. The cap 174A includes a ring shape portion 174b at a part on the other side in the direction of the central axis C of the cap 174A. The ring shape portion 174b is formed to cover part of the plurality of recesses 174a.

The cap 174A has a recess 174b1 inside the ring shape portion 174b. The recess 174b1 has such an inner diameter that a support member 175A to be described later can enter the recess 174b1, and includes a bottom portion that the support member 175A can hit. In addition, the cap 174A has a hole 174c along the central axis C of the ring shape. The hole 174c has such an inner diameter that a pipe member 175 to be described later is inserted and slidable in the hole 174c.

The ring shape portion 174b of the cap 174A is fixed to the distal end of the sheath 171 by bonding or welding. Accordingly, the plurality of recesses 174a are disposed on the distal end side of the cap 174A fixed to the distal end of the sheath 171. Proximal end side parts of the plurality of plate members 173 are fixed to the plurality of recesses 174a by bonding or the like while the proximal end side part of each plate member 173 is inside the ring shape portion 174b.

Another cap 174B is fixed to distal end parts of the plate members 173. Distal end side parts of the plurality of plate members 173 are fixed to the plurality of recesses 174a by bonding or the like while part of the distal end side part of each plate member 173 is inside the ring shape portion 174b of the cap 174B.

As illustrated in FIG. 103, the plurality of plate members 173 are disposed in a circumferential direction of the sheath 171. A slit 173a is formed at an outside surface of each of the plurality of plate members 173. Each slit 173a is positioned on the distal end side of a center position of the corresponding plate member 173 in the longitudinal axial direction. Each plate member 173 includes a distal end side part 173A on the distal end side of the corresponding slit 173a, and a proximal end side part 173B on the proximal end side of the slit 173a.

As described later, when the cap 174B on the distal end side is pulled toward the proximal end side, the plurality of slits 173a move in an outward radial direction of the sheath 171. As a result, an outside surface of each distal end side part 173A tilts relative to the longitudinal axis of the sheath 171 and faces in the distal end direction, and an outside surface of each proximal end side part 173B tilts relative to the longitudinal axis of the sheath 171 and faces in the proximal end direction. Thus, the plate members 173 can be bent outward because of the slits 173a.

The pipe member 175 having elasticity is inserted into the sheath 171. The pipe member 175 is made of, for example, stainless steel. The support member 175A having a ring shape is fixed to a distal end of the pipe member 175 by bonding or the like. A proximal end of the pipe member 175 is fixed to the fixation-portion positioning portion 153 illustrated in FIG. 96. Accordingly, the examiner can change the position of the pipe member 175 relative to the sheath 171 in the longitudinal axial direction by changing the position of the pin 153b relative to the positioning member 153a.

A distal end movable member 15T is slidably inserted into the pipe member 175. The distal end movable member 15T is a wire having elasticity. A fixation portion 176 is attached and fixed to a distal end of the distal end movable member 15T.

Figure 105:
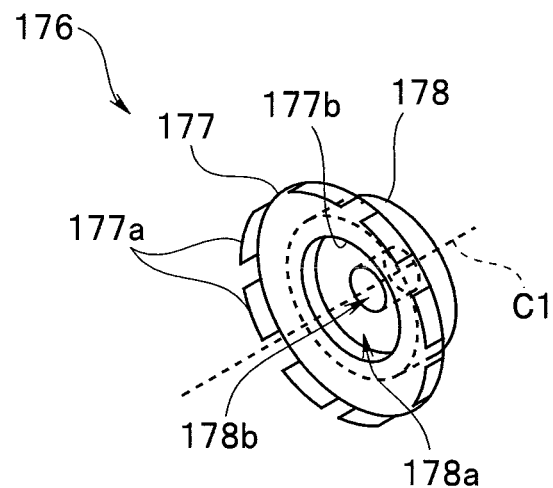
FIG. 105 is a perspective view of a fixation portion of the twenty-second embodiment.

FIG. 105 is a perspective view of the fixation portion 176. The fixation portion 176 includes a plate member 177 having a circular plate shape, and a fixation member 178. The plate member 177 includes a plurality (in this example, eight) of tooth portions 177a at an outer peripheral portion. The plurality of tooth portions 177a are disposed at equal intervals along the circumference of the circular shape.

The fixation member 178 has a cylindrical shape and has a recess 178a having a circular shape on the proximal end side. In addition, the fixation member 178 has a hole 178b along a central axis C1. An inner diameter of the recess 178a is slightly larger than an outer diameter of the support member 175A. A distal end part of the distal end movable member 15T is fitted to the hole 178b, and the distal end part of the distal end movable member 15T is fixed to the fixation member 178 by a bonding agent or the like.

The plate member 177 has an opening 177b having an inner diameter equal to the inner diameter of the recess 178a The plate member 177 is fixed to a proximal end surface of the fixation member 178 by a bonding agent or the like so that the opening 177b and the hole 178b coincide with each other. The recess 178a has such a size that the ring shape portion 174b of the cap 174B can be housed in the recess 178a. As illustrated in FIG. 105, the plurality of tooth portions 177a are formed to protrude in the proximal end direction of the fixation member 178 along the central axis C1.

As described above, the fixation portion 176 is provided at the distal end of the distal end movable member 15T, and the distal end movable member 15T is movable forward and backward in a longitudinal axial direction of the distal end movable member 15T through a forward and backward movement operation of the handle 19. With the support member 175A fixed to the pipe member 175, it is possible to change the position of the pipe member 175 in the longitudinal axial direction by changing a position at which the pin 153b of the fixation-portion positioning portion 153 is fixed.

(Operation)

The examiner inserts the treatment instrument 7 into the channel 4a of the endoscope 2 or externally fixes the treatment instrument 7 to the endoscope 2, and then positions the distal end of the treatment instrument 7 so that the foreign object OB to be collected is hooked by the fixation portion 176 of the distal end movable member 15T, when having found the foreign object OB while observing inside of an examination object through the endoscope 2.

The examiner operates the fixation-portion positioning portion 153 to pull the pipe member 175 in the proximal end direction. The support member 175A enters the recess 174b1 of the cap 174B through movement of the pipe member 175 in the proximal end direction, and pushes the cap 174B toward the proximal end side through further movement of the pipe member 175 in the proximal end direction.

The increased-diameter portion 172 opens when the cap 174B is pushed toward the proximal end side. Specifically, the increased-diameter portion 172 opens when the plurality of plate members 173 bend and protrude outward at the slits 173a. The examiner can bend the plate members 173 outward so that the distal end side part 173A of each plate member 173 is orthogonal to the longitudinal axis of the sheath 171, by adjusting the position at which the pin 153b is fixed.

Figure 106:
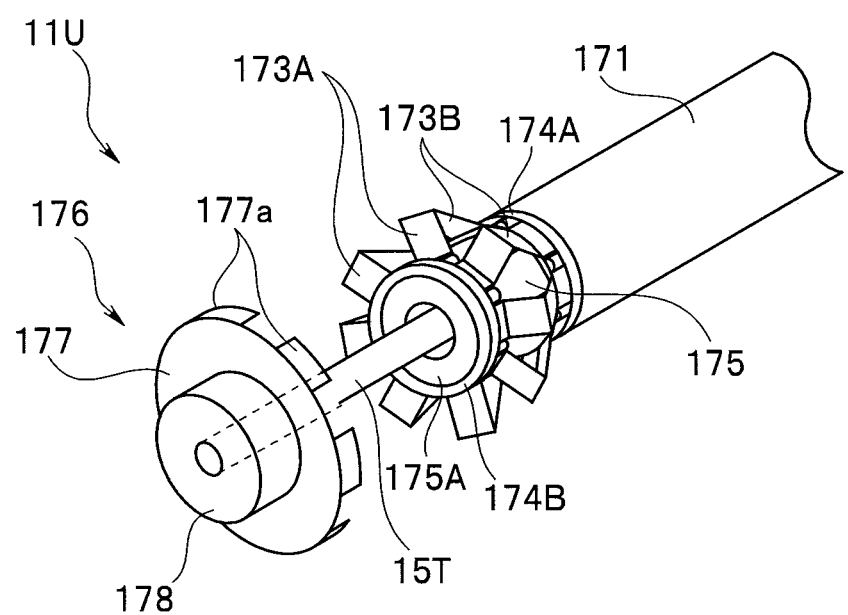
FIG. 106 is a perspective view of the distal end grasping portion of the twenty-second embodiment, illustrating a state in which an increased-diameter portion is opened.

FIG. 106 is a perspective view of a distal end grasping portion 11U, illustrating a state in which the increased-diameter portion 172 is opened. In the state illustrated in FIG. 106, as the examiner operates the handle 19 to pull the wire 33 in the proximal end direction, the fixation portion 176 moves toward the plurality of distal end side parts 173A. The foreign object OB is grasped between a proximal end side surface of the fixation portion 176 and the plurality of distal end side parts 173A. Accordingly, the plurality of distal end side parts 173A function as a distal end fixation member. The foreign object OB, when moving toward the plurality of distal end side parts 173A as well, is firmly held at the fixation portion 176 by the plurality of tooth portions 177a of the fixation portion 176.

Moreover, since the fixation portion 176 has the recess 178a, the foreign object OB enters the recess 178a and can be firmly grasped and collected between the proximal end side surface of the fixation portion 176 and the plurality of distal end side parts 173A.

The distal end grasping portion 11U of the present embodiment can collect the foreign object OB having a relatively large size.

Twenty-Third Embodiment

In the treatment instrument of the sixteenth embodiment, the foreign object OB is grasped between the hook portion 15Na of the distal end movable member 15N and the tilt portion at the distal end of the sheath 141, but in a treatment instrument of the present embodiment, the foreign object OB is housed in a housing body so that a forceps grasping the foreign object OB does not rotate about a longitudinal axis of the treatment instrument.

A configuration of the present embodiment is substantially the same as the above-described configurations of the first and sixteenth embodiments, and thus any identical component is denoted by the same reference sign and description of the component is omitted, and any different component will be described below in detail.

Figure 107:
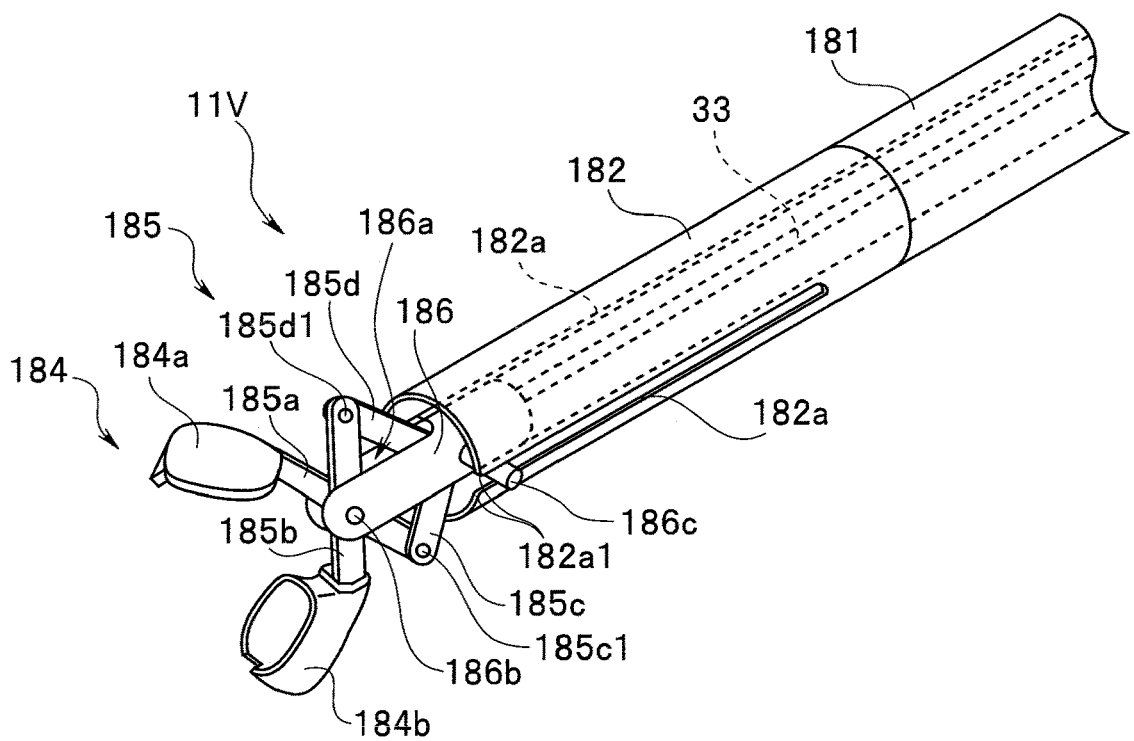
FIG. 107 is a perspective view of a distal end grasping portion of a treatment instrument of a twenty-third embodiment.

FIG. 107 is a perspective view of the distal end grasping portion 11V of the treatment instrument 7 of the present embodiment. A fixation portion 182 is fixed on the distal end side of a sheath 181 by bonding, welding, or the like. A proximal end of the sheath 181 is connected to the operation portion 12. The sheath 181 is made of, for example, Teflon (registered trademark) or stainless steel.

The fixation portion 182 is a tubular member made of resin or metal such as stainless steel and has two penetration slits 182a along a central axis of the fixation portion 182. Each penetration slit 182a has a predetermined length from a distal end of the fixation portion 182. A curved surface (or tilted surface) 182a1 that expands at a distal end part is formed at a distal end part of each penetration slit 182a so that the foreign object OB can be easily guided into the penetration slit 182a. The proximal end of the sheath 181 is connected to the operation portion 12.

The sheath 181 and the fixation portion 182 both have cylindrical shapes and substantially equal outer diameters. A forceps 183 can be inserted into the sheath 181 and the fixation portion 182. Note that, in this example, the fixation portion 182 is a member separated from the sheath 181, but may be a distal end part of the sheath 181.

The forceps 183 includes a grasping portion 184, a link mechanism 185, and a support body 186. The forceps 183 is made of, for example, metal such as stainless steel. The grasping portion 184 includes two cup-shaped portions 184a and 184b. The link mechanism 185 includes four arms 185a, 185b, 185c1, and 185d1.

Proximal ends of the cup-shaped portions 184a and 184b are fixed to distal ends of the two arms 185a and 185b of the link mechanism 185 by welding or the like. Proximal ends of the arms 185a and 185b are connected to distal ends of the arms 185c and 185d, respectively, through shaft members 185c1 and 185d1.

The support body 186 has a cylindrical shape and is slidably disposed in the fixation portion 182. A proximal end of the support body 186 is fixed to the distal end of the wire 33. Accordingly, the support body 186 slides in the fixation portion 182 in the longitudinal axial direction in accordance with forward and backward movement of the wire 33 in the longitudinal axial direction.

Two penetration grooves 186a are formed at a distal end side part of the support body 186. The four arms 185a. 185b, 185c, and 185d are disposed in widths of the two penetration grooves 186a. A shaft member 186b penetrates through a substantially central portion between the two arms 185a and 185b. The shaft member 186b is provided at the support body 186 in a direction orthogonal to a plane passing through the two penetration grooves 186a. The three shaft members 186b, 185c1, and 185d1 are provided in parallel to the direction orthogonal to the plane passing through the two penetration grooves 186a.

Proximal ends of the two arms 185c and 185d are connected to a shaft member (not illustrated) connected to a forceps wire (not illustrated). As the forceps wire is pulled in the proximal end direction, the distal ends of the two arms 185c and 185d move to close and the link mechanism 185 moves to close the cup-shaped portions 184a and 184b. As the forceps wire is pushed in the distal end direction, the distal ends of the two arms 185c and 185d move to separate from each other and the link mechanism 185 moves to open the cup-shaped portions 184a and 184b.

In other words, the forceps 183 performs opening and closing operation in accordance with forward and backward movement of the forceps wire in the longitudinal axial direction.

Two pins 186c are provided to the support body 186. The pins 186c protrude in an outward radial direction of the support body 186 having a cylindrical shape and pass through the respective penetration slits 182a. The support body 186 is slidable in the longitudinal axial direction of the fixation portion 182 while the two pins 186c are in the two penetration slits 182a. Accordingly, the pins 186c are pins for positioning relative to the fixation portion 182 and have a function to prevent the support body 186 from rotating about the central axis of the fixation portion 182.

The two cup-shaped portions 184a and 184b are formed so that a plane including a part where the two cup-shaped portions 184a and 184b contact each other passes through the two penetration slits 182a when the forceps 183 is housed in the fixation portion 182.

(Operation)

Figure 108:
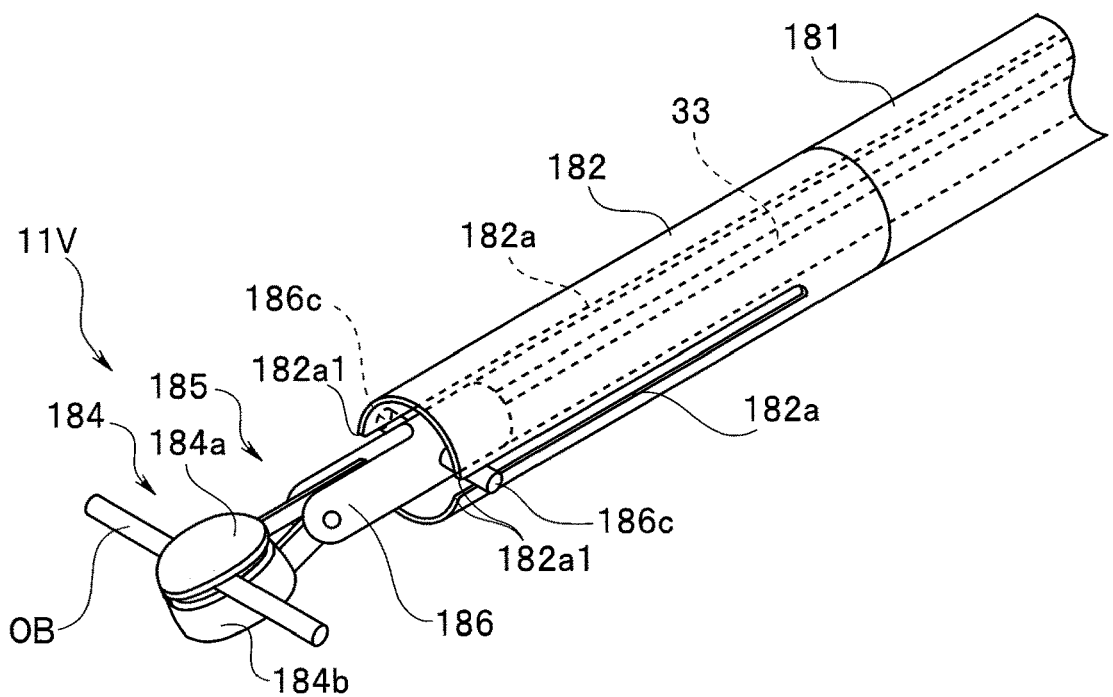
FIG. 108 is a perspective view of the distal end grasping portion of the twenty-third embodiment, illustrating a state in which a foreign object is grasped.

The examiner inserts the treatment instrument 7 into the channel 4a of the endoscope 2 or externally fixes the treatment instrument 7 to the endoscope 2, and then grasps the foreign object OB to be collected by using the forceps 183 when having found the foreign object OB while observing inside of an examination object through the endoscope 2. FIG. 108 is a perspective view of a distal end grasping portion V, illustrating a state in which the foreign object OB is grasped. In FIG. 108, the foreign object OB is an elongated object such as a wire.

As the examiner pulls the wire 33 in the proximal end direction while the foreign object OB is grasped by the forceps 183, the support body 186 slides in the fixation portion 182 and moves in the proximal end direction. The support body 186 is housed in the fixation portion 182 and movable in the fixation portion 182 until each pin 186c contacts a proximal end portion of the corresponding penetration slit 182a.

Figure 109:
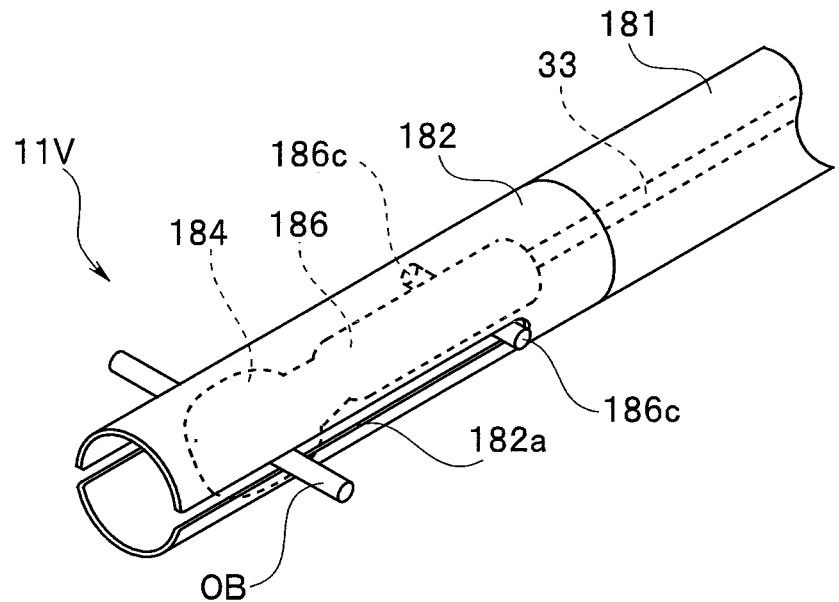
FIG. 109 is a perspective view of the distal end grasping portion of the twenty-third embodiment, illustrating a state in which a support body is housed in a fixation portion.

FIG. 109 is a perspective view of the distal end grasping portion V, illustrating a state in which the support body 186 is housed in the fixation portion 182. In this example, since the foreign object OB is a thin straight wire or the like and the plane including the part where the two cup-shaped portions 184a and 184b contact each other passes through the two penetration slits 182a, the foreign object OB passes through the two penetration slits 182a while being grasped by the forceps 183. FIG. 109 illustrates a state in which each pin 186c is in contact with the proximal end portion of the corresponding penetration slit 182a.

Accordingly, the foreign object OB grasped when each pin 186c is in contact with the proximal end portion of the corresponding penetration slit 182a is firmly grasped by the forceps 183 and enters the two penetration slits 182a, and thus is unlikely to be dropped at collection. Note that the foreign object OB grasped is firmly grasped by the forceps 183 even when each pin 186c is not in contact with the proximal end portion of the corresponding penetration slit 182a.

Note that, in the above-described example, the forceps 183 includes the link mechanism 185, but may be a forceps using a plate spring.

Figure 110:
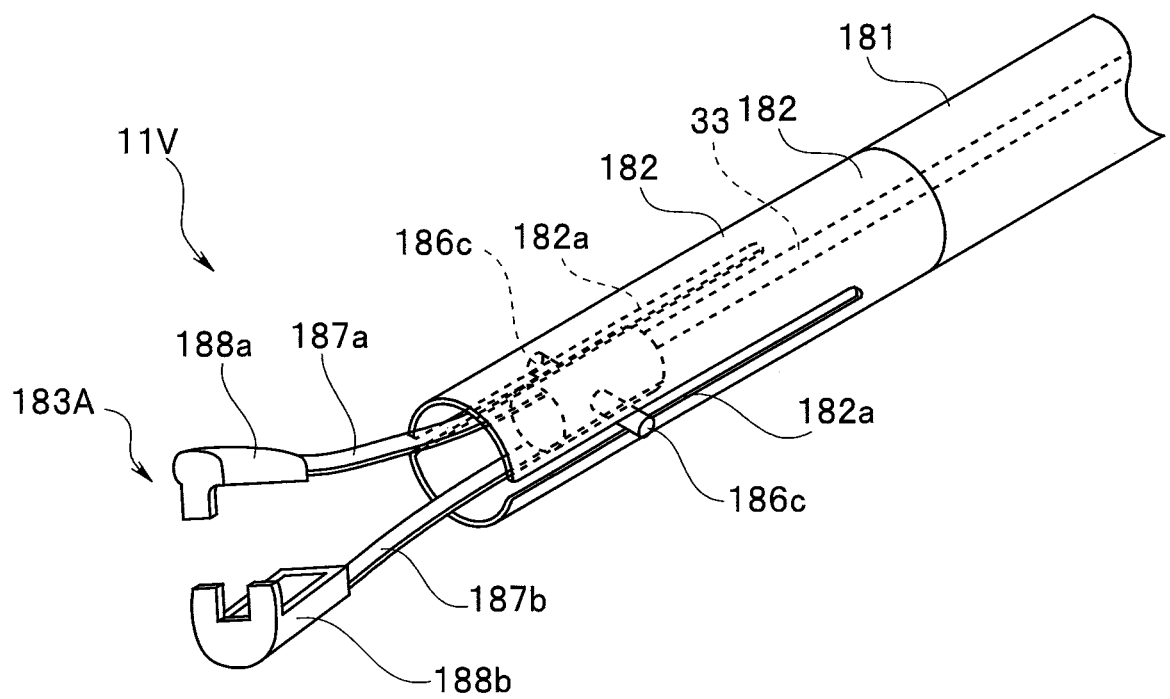
FIG. 110 is a perspective view of a distal end grasping portion including forceps using a plate spring according to a modification of the twenty-third embodiment.

FIG. 110 is a perspective view of the distal end grasping portion V including a forceps using a plate spring according to a modification of the present embodiment. The support body 186 includes two plate members 187a and 187b extending on the distal end side. The two plate members 187a and 187b are provided with such permanent bends that the two plate members 187a and 187b separate from each other, and are in shapes separating from each other when protruding from the distal end of the fixation portion 182 as illustrated in FIG. 110.

Two cup-shaped members 188a and 188b are provided at distal ends of the two plate members 187a and 187b, respectively. The two plate members 187a and 187b including the two cup-shaped members 188a and 188b constitute a forceps 183A.

The distal end of the wire 33 is connected to the proximal end of the support body 186. As the wire 33 moves toward the distal end side, the two plate members 187a and 187b separate from each other as illustrated in FIG. 110, and as a result, the two cup-shaped members 188a and 188b open. As the wire 33 moves toward the proximal end side, the two plate members 187a and 187b approach each other, and as a result, the two cup-shaped members 188a and 188b close. The two cup-shaped members 188a and 188b have such profile sizes that the two cup-shaped members 188a and 188b can be housed in the fixation portion 182 in a state in which the two cup-shaped members 188a and 188b close and grasp the foreign object OB.

In a case of the treatment instrument illustrated in FIG. 110, since the forceps 183A is closed only by pulling the wire 33 toward the proximal end side, the forceps wire for closing the forceps 183 is unnecessary unlike the forceps 183 illustrated in FIGS. 107 to 109.

In FIG. 110 as well, the support body 186 is provided with the two pins 186c passing through the two penetration slits 182a. Accordingly, when the foreign object OB is an object such as a wire, the foreign object OB can enter the two penetration slits 182a, similarly to FIG. 109.

As described above, in the present embodiment, since the forceps is used to grasp the foreign object OB, grasping force for grasping the foreign object OB is large and the foreign object OB is unlikely to be dropped at collection.

Twenty-Fourth Embodiment

In the treatment instrument of the twenty-third embodiment, the fixation portion 182 is provided with the two penetration slits 182a that the two pins 186c of the forceps 183 enter, but in a treatment instrument of the present embodiment, no pin is provided at a forceps, and a fixation portion has elasticity and increases the diameter to grasp a foreign object.

A configuration of the present embodiment is substantially the same as the above-described configurations of the first and twenty-third embodiments, and thus any identical component is denoted by the same reference sign and description of the component is omitted, and any different component will be described below in detail.

Figure 111:
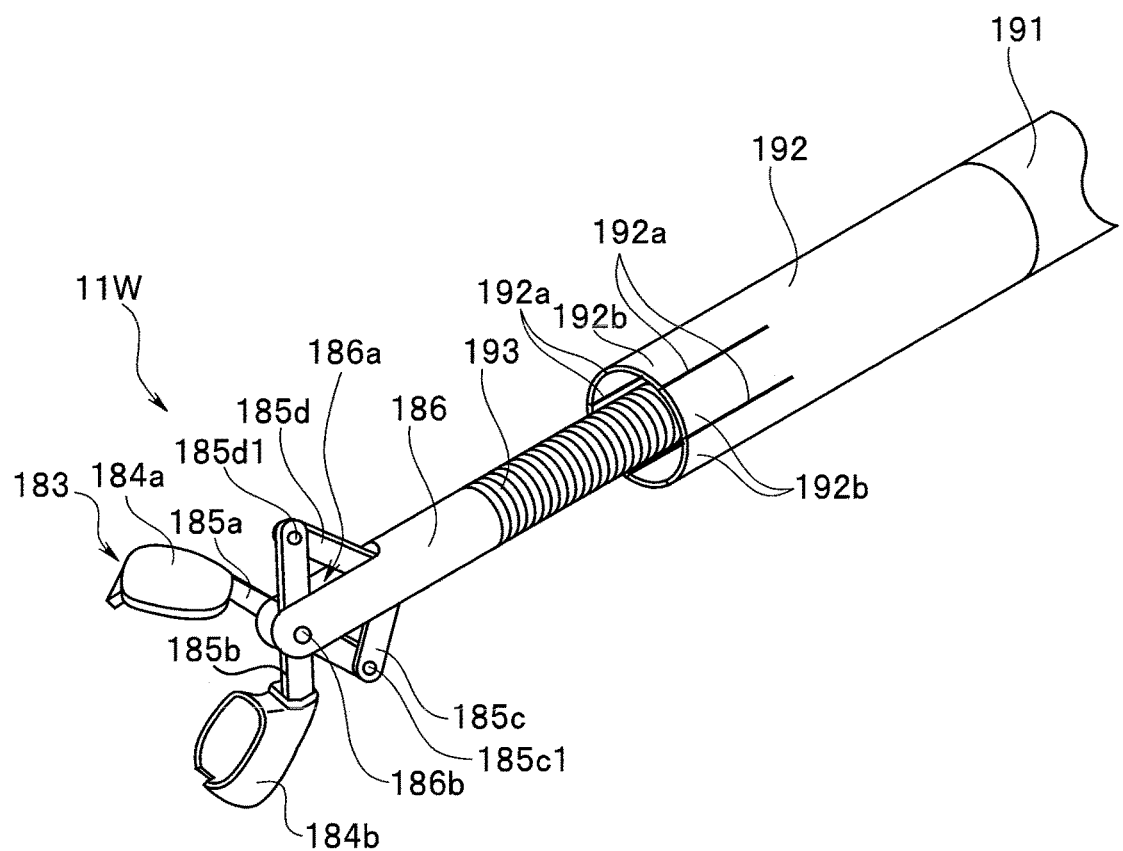
FIG. 111 is a perspective view of a distal end grasping portion of a treatment instrument of a twenty-fourth embodiment.

FIG. 111 is a perspective view of a distal end grasping portion 11W of the treatment instrument 7 according to the present embodiment. A fixation portion 192 is fixed on the distal end side of a sheath 191 by bonding or the like. A proximal end of the sheath 191 is connected to the operation portion 12. The sheath 191 is made of, for example, Teflon (registered trademark) or stainless steel.

The fixation portion 192 is an elastic member having a cylindrical shape. The fixation portion 192 is made of, for example, urethane resin. A plurality of straight slits 192a are provided on the distal end side of the fixation portion 192. In this example, the six slits 192a are provided at equal intervals in a circumferential direction of the fixation portion 192. The straight slits 192a are formed in parallel to a central axis of the fixation portion 192. The slits 192a are formed at a distal end side part of the fixation portion 192 in the longitudinal axial direction.

Accordingly, the fixation portion 192 is provided with a plurality (in this example, six) of strip-shaped portions 192b formed by the plurality (in this example, six) of slits 192a. The plurality of strip-shaped portions 192b are disposed in the circumferential direction of the fixation portion 192.

As illustrated in FIG. 111, the proximal end of the support body 186 of the forceps 183 is connected to a distal end of a coil sheath 193 by bonding or welding. A proximal end of the coil sheath 193 is connected to the wire 33 not illustrated. Accordingly, the coil sheath 193 can be moved forward and backward along the longitudinal axis by operating the handle 19 of the operation portion 12.

Note that the support body 186 of the present embodiment is not provided with the pins 186c as illustrated in FIG. 107.

(Operation)

Figure 112:
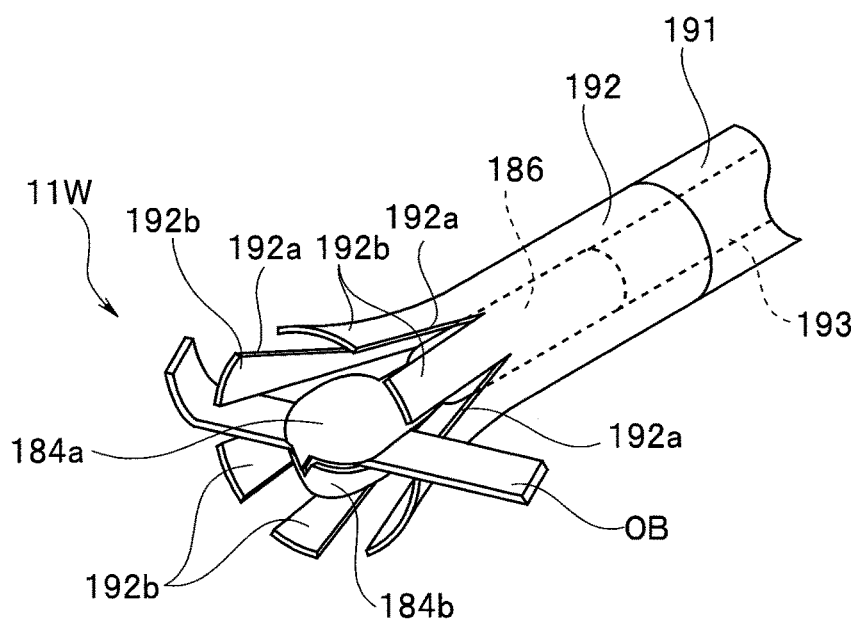
FIG. 112 is a perspective view of the distal end grasping portion of the twenty-fourth embodiment, illustrating a state in which a foreign object is housed in a fixation portion while the foreign object is grasped.

The examiner inserts the treatment instrument 7 into the channel 4a of the endoscope 2 or externally fixes the treatment instrument 7 to the endoscope 2, and then pulls the forceps wire toward the proximal end side to grasp the foreign object OB to be collected by using the forceps 183, when having found the foreign object OB while observing inside of an examination object through the endoscope. FIG. 112 is a perspective view of the distal end grasping portion 11W, illustrating a state in which the foreign object OB is housed in the fixation portion 192 while the foreign object OB is grasped. In FIG. 112, the foreign object OB is a plate member that is bent at one end.

As the examiner pulls the wire 33 in the proximal end direction in a state in which the foreign object OB is grasped by the forceps 183, the support body 186 slides in the fixation portion 192 and moves in the proximal end direction. The support body 186 is housed in the fixation portion 192, but the plurality of slits 192a are provided at a distal end of the fixation portion 192. Accordingly, as the forceps 183 grasping the foreign object OB is housed from the distal end side of the fixation portion 192, the plurality of strip-shaped portions 192b are pressed in a profile direction by the foreign object OB and each two adjacent strip-shaped portions 192b separate from each other. As a result, part of the fixation portion 192 on the distal end side opens.

In this case, the foreign object OB is sandwiched among the plurality of strip-shaped portions 192b having elasticity. In other words, a distal end side part of the fixation portion 192 radially spreads and the foreign object OB is housed in the fixation portion 192 while being sandwiched among the plurality of strip-shaped portions 192b.

In this manner, the foreign object OB is firmly grasped by the forceps 183 while being sandwiched among the plurality of strip-shaped portions 192b having elasticity, and thus is unlikely to be dropped at collection.

As described above, according to the above-described embodiments, it is possible to provide a treatment instrument and an endoscope apparatus with which it is easy to position a grasping portion relative to an object and collect the object.

Note that the treatment instrument of each above-described embodiment may be used together not only with an industrial endoscope but also with a medical endoscope.

Note that, in each above-described embodiment, a foreign object is grasped between a fixation portion of a distal end fixation member and a distal end portion of a distal end movable member as the distal end movable member moves in the distal end direction, but may be grasped between the distal end movable member and the fixation portion as the distal end movable member moves in the proximal end direction.

The present invention is not limited to the above-described embodiments but may include various kinds of changes, modifications, and the like without departing from the gist of the present invention.

What is claimed is:

1. A treatment instrument for use with an endoscope, the treatment instrument comprising
   an insertion portion; and
   a grasping portion disposed on a distal end of the insertion portion, wherein the grasping portion includes:
      a movable member including a first proximal end portion inserted in the insertion portion and a first distal end portion, the first distal end portion configured to move forward and backward along a longitudinal axis of the insertion portion, and
      a fixation member having a second proximal end portion fixed to the insertion portion, the fixation member including a second distal end portion provided on a distal end side along the longitudinal axis, the second distal end portion being fixed relative to the insertion portion and the first distal end portion of the movable member being movable relative to the second distal end portion,
   wherein the second distal end portion of the fixation member is located distally relative to the first distal end portion of the movable member throughout an entire movable range of the first distal end portion,
   the first distal end portion is provided on a distal end side of the movable member, the first distal end portion extends in a first direction offset relative to the longitudinal axis,
   the second distal end portion is provided on the distal end side of the fixation member, the second distal end portion extends in a second direction, different from the first direction, offset relative to the longitudinal axis, and
   the grasping portion is configured to grasp an object by sandwiching the object between a proximal surface of the second distal end portion and a distal surface of the first distal end portion as the first distal end portion moves in a distal end direction relative to the second distal end portion.

2. The treatment instrument according to claim 1, wherein the first distal end portion is offset at an angle smaller than 90° relative to the longitudinal axis.

3. The treatment instrument according to claim 1, wherein the second distal end portion is offset at an angle equal to or larger than 90° relative to the longitudinal axis.

4. The treatment instrument according to claim 1, wherein the second distal end portion is offset at two stages or more relative to the longitudinal axis.

5. The treatment instrument according to claim 1, wherein the fixation member is detachably connected to a distal end portion of the insertion portion.

6. The treatment instrument according to claim 1, wherein
the grasping portion includes a pipe sleeve,
the fixation member is fixed to the pipe sleeve,
the movable member is inserted into a hole formed at the pipe sleeve, and
a distal end portion of the endoscope is insertable into a lock hole formed at the pipe sleeve.

7. The treatment instrument according to claim 1, wherein
the grasping portion includes a pipe sleeve,
the fixation member is fixed to the pipe sleeve,
the movable member is inserted into a hole formed at the pipe sleeve,
a distal end portion of the endoscope is insertable into a lock hole formed at the pipe sleeve, and
the lock hole is formed between the fixation member and the movable member.

8. The treatment instrument according to claim 1, wherein
the grasping portion includes a pipe sleeve,
the pipe sleeve includes a fixation member insertion hole, and
the fixation member is rotatable about an axis of the fixation member in the fixation member insertion hole.

9. The treatment instrument according to claim 1, wherein one end of the fixation member is pivotally supported so that the fixation member is rotatable about a predetermined axis.

10. The treatment instrument according to claim 1, wherein
the fixation member includes a tubular portion provided with an opening portion, and
the movable member is insertable into the tubular portion.

11. The treatment instrument according to claim 1, wherein
the distal end grasping portion includes a pipe sleeve,
the pipe sleeve has a fixation member insertion hole, and
the movable member is movable forward and backward along the longitudinal axis in the fixation member insertion hole.

12. An endoscope apparatus comprising:
the treatment instrument according to claim 1; and
the endoscope.

* * * * *